(12) United States Patent
Suzuki

(10) Patent No.: US 7,584,356 B2
(45) Date of Patent: Sep. 1, 2009

(54) BROADCAST RECEIVING APPARATUS

(75) Inventor: Takaaki Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 1018 days.

(21) Appl. No.: 10/927,245

(22) Filed: Aug. 27, 2004

(65) Prior Publication Data

US 2005/0047596 A1 Mar. 3, 2005

Related U.S. Application Data

(60) Provisional application No. 60/499,004, filed on Sep. 2, 2003.

(30) Foreign Application Priority Data

Aug. 29, 2003 (JP) ............................ 2003-307847
Jul. 2, 2004 (JP) ............................ 2004-197338

(51) Int. Cl.
*G06F 9/00* (2006.01)
(52) U.S. Cl. .................. 713/168; 713/193; 380/37; 380/255; 380/270
(58) Field of Classification Search ............. 713/168, 713/193; 380/37, 255, 270
See application file for complete search history.

(56) References Cited

FOREIGN PATENT DOCUMENTS

| CN | 1281613 | 1/2001 |
|---|---|---|
| EP | 1339222 | 8/2003 |
| JP | 4-32392 | 2/1992 |
| WO | 99/18730 | 4/1999 |

OTHER PUBLICATIONS

Sedlmeyer, "Multimedia Home Platform-Standard 1.0.1," Fernseh und Kinotechnik, vol. 55, No. 10, (Oct. 2001).
Peng et al., "Digital Television Application Manager," IEEE International Conference on Multimedia and Expo, 2001, pp. 1207-1210 (Aug. 22, 2001).
Gosling et al., "The Java Language Specification," Java Language Specification, pp. 215-126 (Aug. 1, 1996).
English language Abstract of JP 4-32392.
Sedlmeyer, "Multimedia Home Platform-Standard 1.0.1," Fernseh und Kinotechnik, vol. 55, No. 10, (Oct. 2001) (English Version).
English language Abstract of CN 1281613.

*Primary Examiner*—Thomas R Peeso
(74) *Attorney, Agent, or Firm*—Greenblum & Bernstein, P.L.C.

(57) ABSTRACT

A broadcast receiving apparatus (2100) performs descrambling implicitly during the access of scrambled information within a broadcast signal by a program. The broadcast receiving apparatus (2100) in the present invention includes a descrambler (2104) operable to perform descrambling on a per-piece of information basis. Together with executing a service including one or more pieces of information, the broadcast receiving apparatus (2100) adds a service to be executed, cancels a service to be executed, and controls descrambling of one or more pieces of information using the descrambler (2104).

14 Claims, 62 Drawing Sheets

FIG. 2

| Frequency band | Application | Modulation scheme |
|---|---|---|
| 5~130MHz | Out Of Band (OOB) Data exchange between head-end and terminal | QPSK |
| 130~864MHz | In-Band Regular television broadcast including video/audio | QAM |

FIG. 3

| Frequency band | Application |
|---|---|
| 70~74MHz | Data transmission from head-end 101 to terminal apparatus |
| 10.0~10.1MHz | Data transmission from terminal apparatus A 111 to head-end 101 |
| 10.1~10.2MHz | Data transmission from terminal apparatus B 112 to head-end 101 |
| 10.2~10.3MHz | Data transmission from terminal apparatus C 113 to head-end 101 |

FIG. 4

| Frequency band | Application |
|---|---|
| 150~156MHz | Television channel 1 |
| 156~162MHz | Television channel 2 |
| ⋮ | ⋮ |
| 310~311MHz | Radio channel 1 |
| ⋮ | ⋮ |

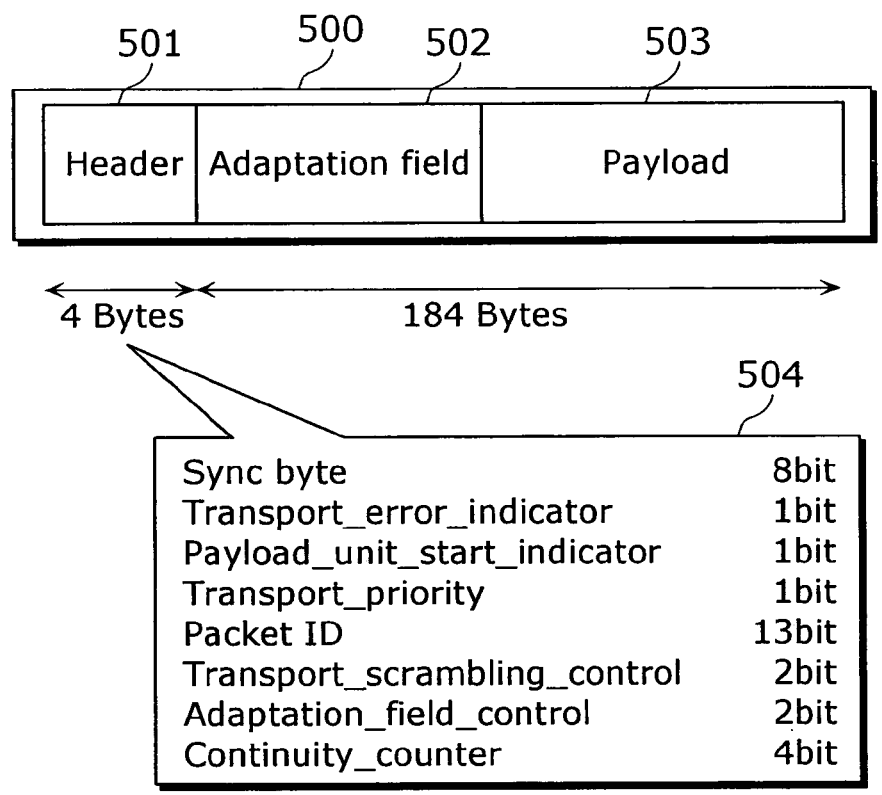
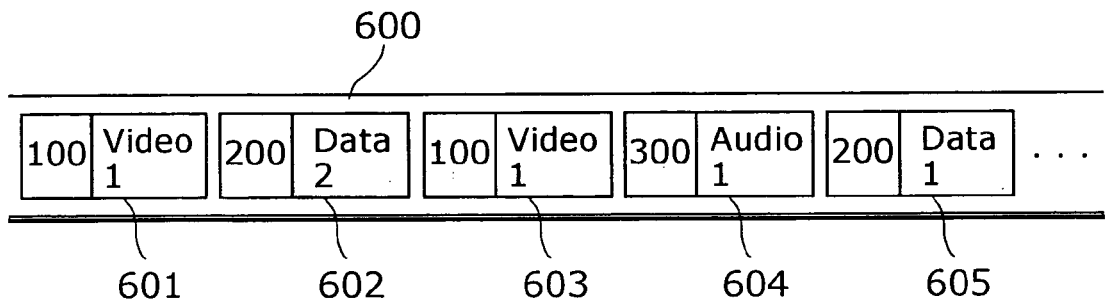

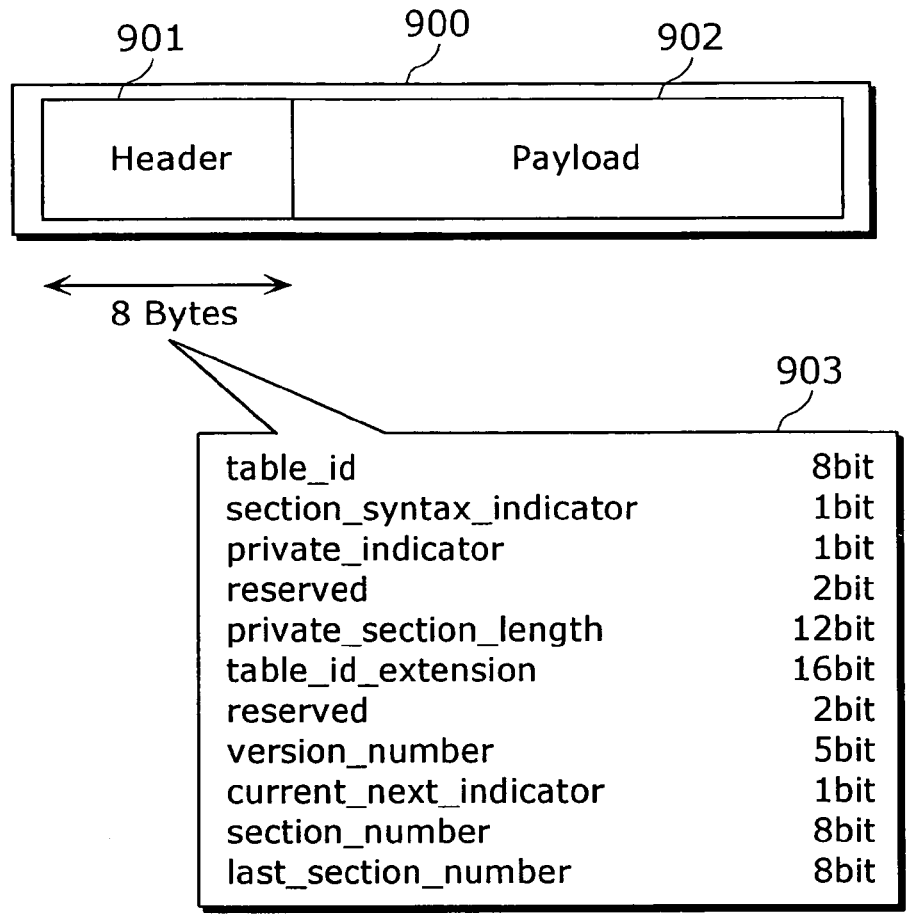

FIG. 11

| Program number | | | 101 |
|---|---|---|---|
| E S | Audio | 5011 | |
| | Video | 5012 | |
| | Data | 5013 | AIT |
| | Data | 5014 | DSMCC[1] |

| Transport_stream_id | | 1000 |
|---|---|---|
| Program | 101 | 501 |
| | 102 | 502 |
| | 103 | 503 |

1200, 1211, 1212, 1213, 1201, 1202

FIG. 23
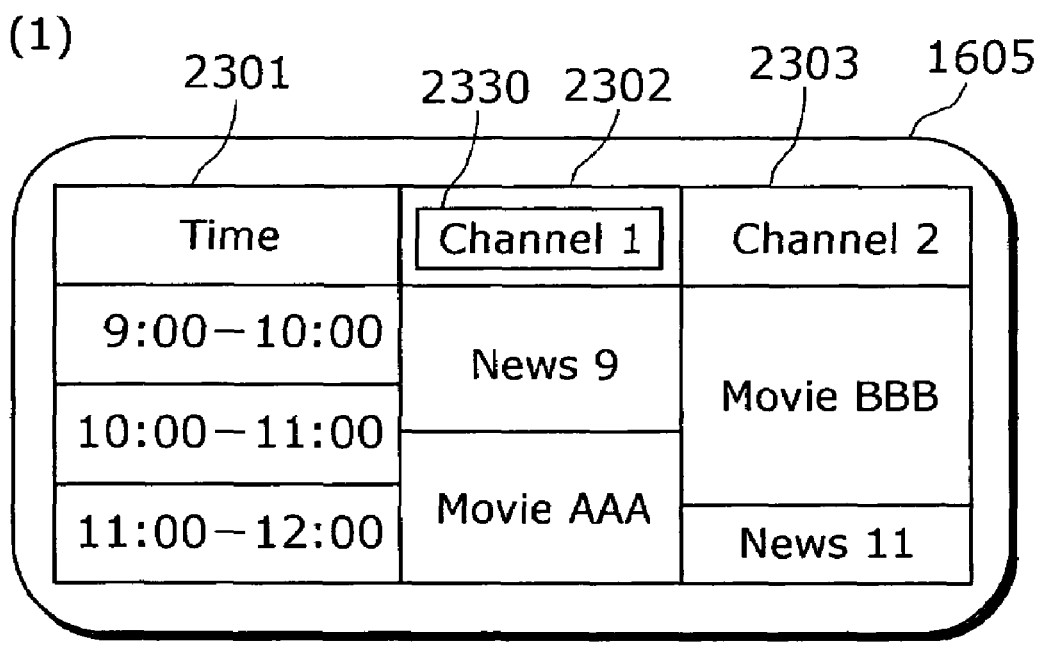
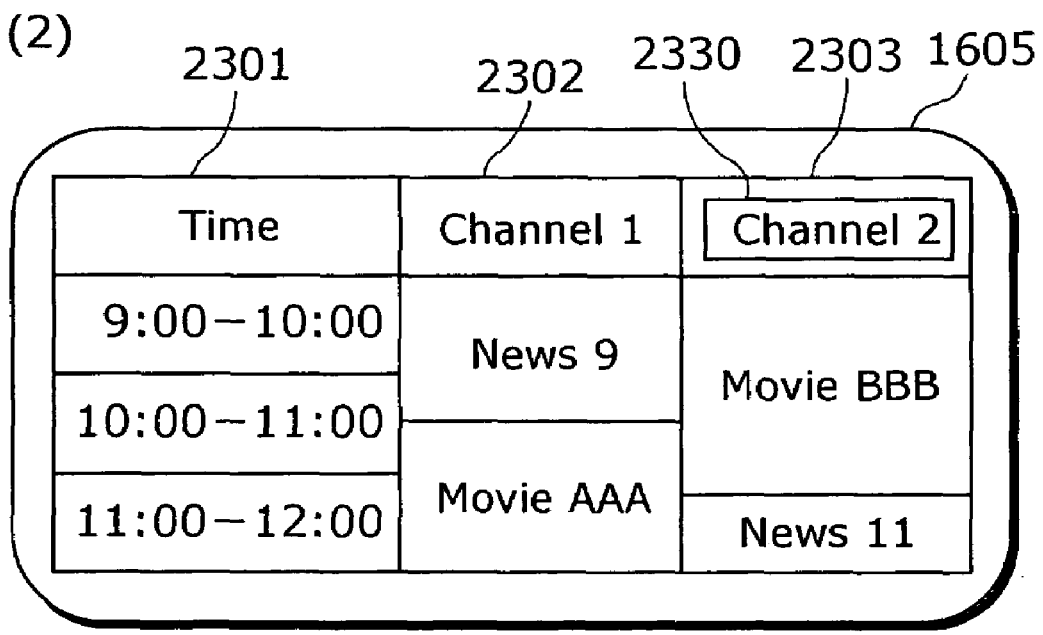

FIG. 29

| Descrambler name | Use status |
|---|---|
| Descrambler 1 | "In use" |
| Descrambler 2 | "In use" |
| Descrambler 3 | "In use" |
| Descrambler 4 | "Not in use" |

2901, 2902, 2911, 2912, 2913, 2914

| Program number | | | 102 | |
|---|---|---|---|---|
| E S | Audio | 5021 | | 3511 |
| | Video | 5022 | | 3512 |
| | Data | 5023 | AIT | 3513 |
| | Data | 5024 | DSMCC[1] | 3514 |
| | Data | 5025 | Data for data broadcast | 3515 |

| | 2901 | 2902 | 4103 |
|---|---|---|---|
| | Descrambler name | Use status | Program number |
| 2911 | Descrambler 1 | "In use" | 1 |
| 2912 | Descrambler 2 | "In use" | 1 |
| 2913 | Descrambler 3 | "In use" | 2 |
| 2914 | Descrambler 4 | "Not in use" | None |

FIG. 57
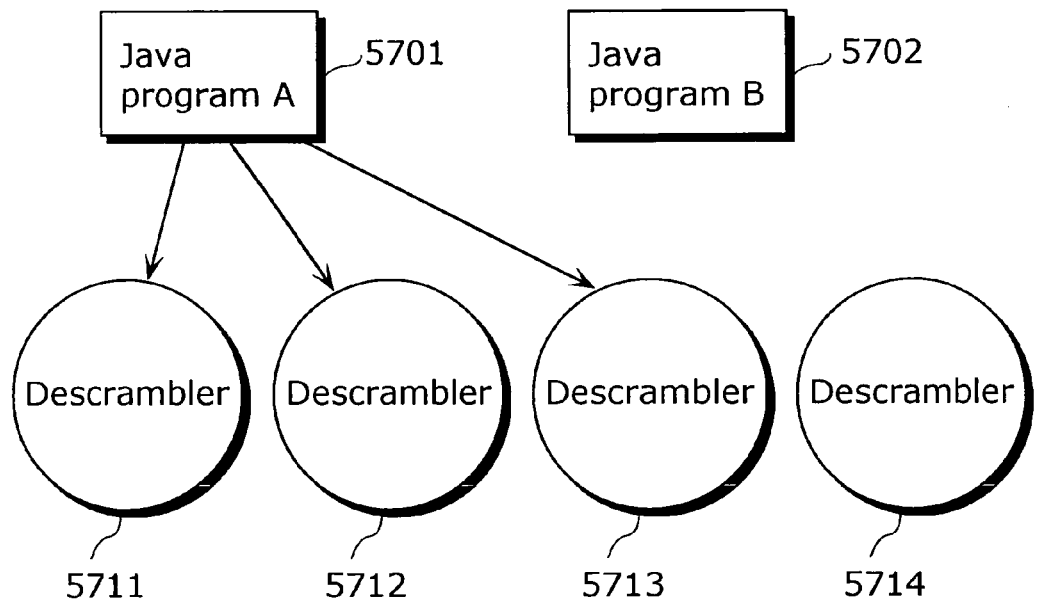
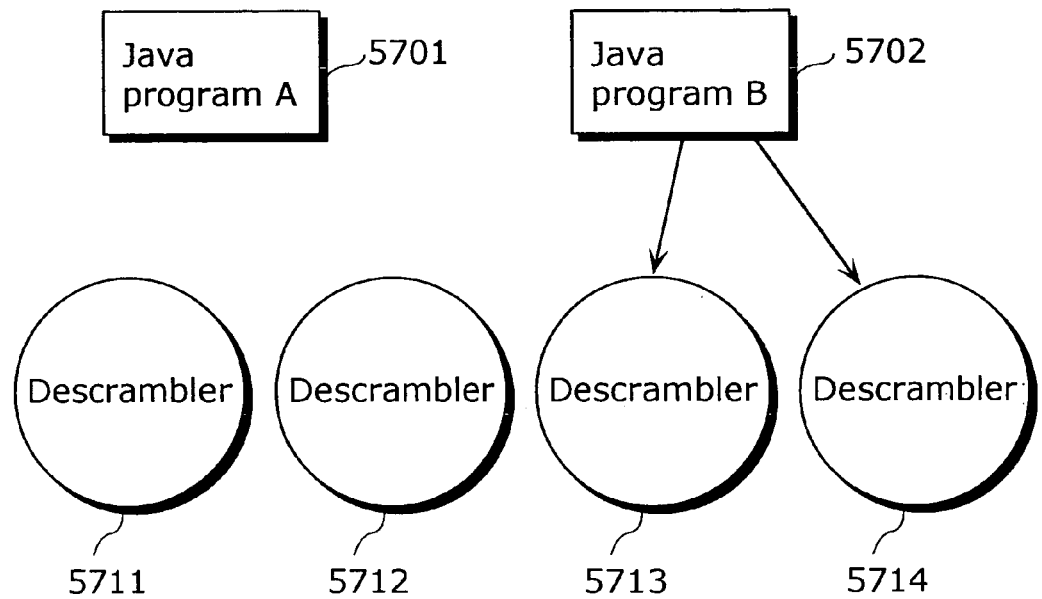

| Program number | Count | Priority level |
|---|---|---|
| 101 | 2 | Java program 1: 10<br>Java program 2: 20 |

FIG. 68

| Program number (6801) | Counter (6802) | Java program priority level (6803) | Call source distinguishing flag (6804) |
|---|---|---|---|
| 100 | 1 | 256 | Service manager |
| 200 | 1 | 128 | Stream information access library |
| 300 | 1 | 64 | Stream information access library |
| 400 | 1 | 32 | Stream information access library |

| Program number (6801) | Counter (6802) | Java program priority level (6803) | Call source distinguishing flag (6804) |
|---|---|---|---|
| 100 | 2 | 256 | Service manager |
| | | 128 | Stream information access library |
| 200 | 2 | 127 | Stream information access library |
| | | 64 | Stream information access library |

6911, 6912

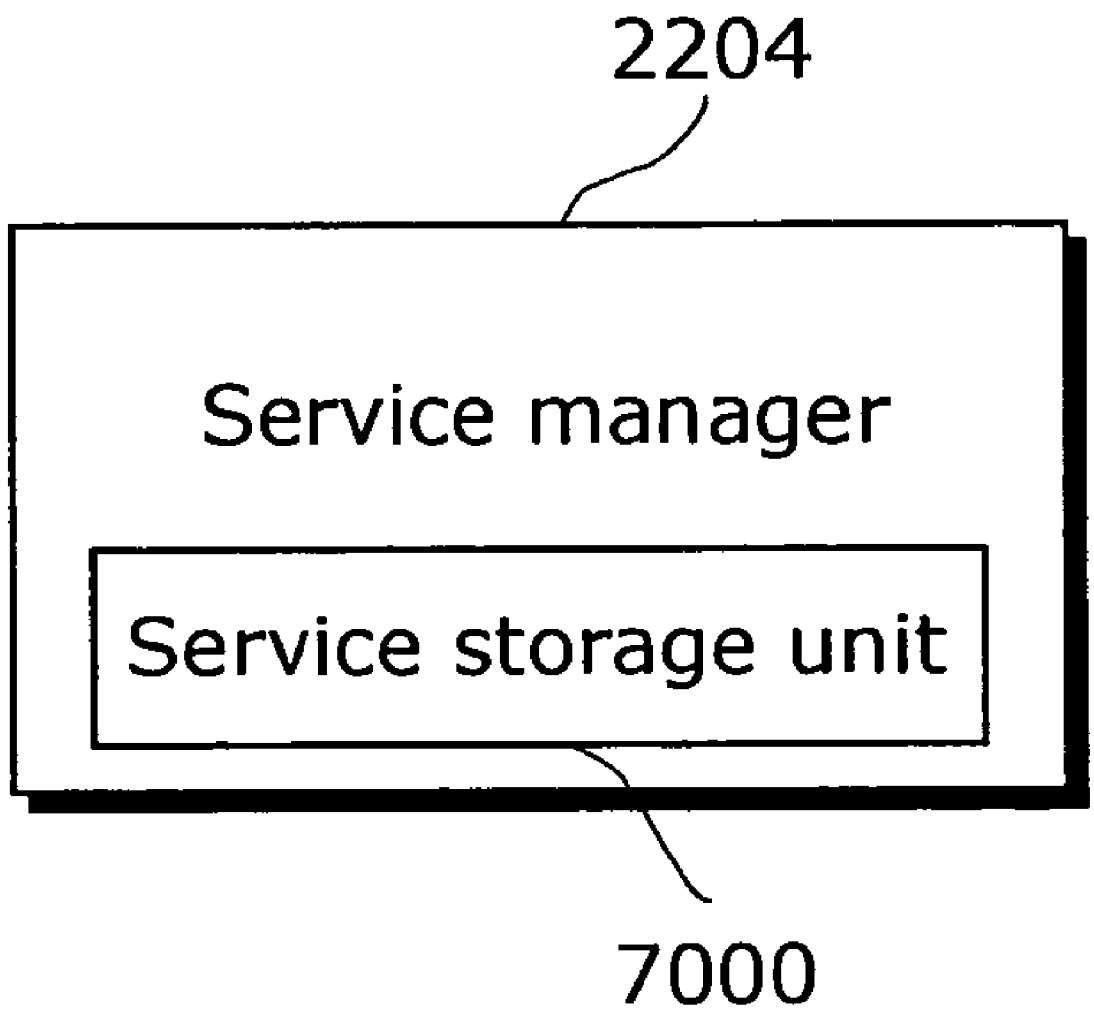

BROADCAST RECEIVING APPARATUS

CROSS REFERENCE TO RELATED APPLICATION

This application claims the benefit of U.S. Provisional Application No. 60/499,004, filed Sep. 2, 2003, the contents of which are herein incorporated by reference in its entirety.

BACKGROUND OF THE INVENTION (1) Field of the Invention

The present invention relates to a broadcast receiving apparatus for receiving a broadcast, and particularly to a system for executing a program that refers to a scrambled broadcast signal, in the broadcast receiving apparatus.

(2) Description of the Prior Art

Broadcast signals are sent from a broadcast station and include a wide variety of information. Among such information, there are those within which access authorization is set for each user. For example, video and audio information that can be viewed only by users who have signed contracts are transmitted in sports channels and movie channels.

The Conditional Access System (CAS) is introduced as a system for implementing such a format. A broadcast station performs scrambling on information that is accessible only to identified users, and such data is transmitted by being included in a broadcast signal. At the same time, a key necessary for descrambling, additional information such as contract information to be transmitted to specific users, and so on, are transmitted by the broadcast station together with the scrambled information.

When a user accesses scrambled information, the broadcast receiving apparatus judges whether the user holds an authorization for accessing such information. If access is possible, it performs descrambling using a device found in the broadcast receiving apparatus known as a descrambler, after which, it accesses the descrambled information.

In an environment such as this, there is a need for the broadcast receiving apparatus to judge the access authorization of a user. However, in addition, there is a need to judge "which information" is to be descrambled "at which timing".

In official publication of Japanese Laid-Open Patent Application No. 4-32392, a detailed description is made regarding a technique where a broadcast receiving apparatus retains a scrambled channel beforehand, and if the scrambled channel is selected during the channel selection by a user, it is automatically passed through an external descrambler connected outside the broadcast receiving apparatus. In this patent, descrambling is carried out on "the selected channel", "at the time of selection".

In addition, at present, specifications regarding environments for the execution of a program on a broadcast receiving apparatus are being developed and operated in many areas. For example, a specification known as Digital Video Broadcasting-Multimedia Home Platform (DVB-MHP) has been laid out in Europe, and operation conforming to such specifications is already being initiated. Furthermore, a specification associated with the cable broadcasting environment, known as Open Cable Application Platform (OCAP), is being laid out in the United States, with operations scheduled to start in 2005. In an environment such as this, a program executed on a broadcast receiving apparatus can freely access information within a broadcast signal, using devices existing in the broadcast receiving apparatus. For example, an MPEG-2 transport stream received by the broadcast receiving apparatus can be changed using a tuner device. For example, using an AV decoder device, video/audio information transmitted by an MPEG-2 transport stream received by the broadcast receiving apparatus can be decoded and outputted on a display/speaker. For example, data for data broadcasting, program information, or the like, transmitted by an MPEG-2 transport stream received by the broadcast receiving apparatus can be obtained using a section filter.

In an environment such as this, there instances in which the information which the program tries to access is scrambled and transmitted. In such a case, the devices in the broadcast receiving apparatus cannot use the information, scrambled as it is. As such, there is a need to descramble the scrambled information.

As one technique, there is a method where the broadcast receiving apparatus provides a program operating on the broadcast receiving apparatus with a library for the purpose of descrambling. Before accessing the scrambled information, the program starts descrambling by using the descrambling library. In this method, the program itself judges the timing of the descrambling.

However, this method requires the program itself to make considerations regarding the scrambling of the information to be accessed. Descrambling with regard to a channel with which a contract is previously entered into, is not the only pattern in descrambling. There is also a pattern where programs are purchased on the spot such as Pay-Per-View (PPV), where billing is done on a per program basis, so there are cases which require complex processing. As a result, there is the disadvantage of making the implementation of the program itself more complex.

SUMMARY OF THE INVENTION

In the present invention, a means is provided for the easier accessing of scrambled information within a broadcast signal by a program operating on a broadcast receiving apparatus.

One form for such means is the implicit performance of descrambling by the broadcast receiving apparatus during the accessing of scrambled information within a broadcast signal by a program.

Another form is the provision of a simple descrambling means to the program by the broadcast receiving apparatus.

In other words, the broadcast receiving apparatus in the present invention is a broadcast receiving apparatus comprising a service execution unit operable to execute a service including one or more pieces of information according to an execution request received, a descrambling unit operable to descramble a scrambled piece of information included in the service, and a descrambling control unit operable to instruct the descrambling unit to start descrambling of all the scrambled pieces of information included in the service, when an application downloaded from outside the broadcast receiving apparatus requests the service execution unit to execute said service. Therefore, it becomes possible for all the pieces of information included in the service to be descrambled when the service is executed, and from then onward, it is possible to access the pieces of information included in the service while the service is being executed.

In addition, the broadcast receiving apparatus further comprises an information accessing unit operable to access one or more pieces of information. Here, when a second application requests the information accessing unit to access a scrambled piece of information included in a second service in a situation where i) the service execution unit requested by a first application to execute a first service is in the process of executing the first service and ii) the descrambling unit is in the process of descrambling a piece of information included in the first service, the descrambling control unit notifies the second application that the piece of information included in the second service cannot be descrambled. Therefore, when the second application accesses the scrambled piece of information included in the service which has not been executed, the second application can find out about the impossibility of descrambling.

In addition, the broadcast receiving apparatus further comprises an information accessing unit operable to access one or more pieces of information. Here, when the application requests the information accessing unit to access a piece of information in a service which is not being executed by the service execution unit, the descrambling control unit notifies the application that said piece of information cannot be descrambled. Therefore, the application can find out that descrambling is not possible.

In addition, the descrambling unit can be detached and attached to the broadcast receiving apparatus, and in the case where the application requests the service execution unit to execute the service when broadcast receiving apparatus and the descrambling unit are connected, the descrambling control unit instructs the descrambling unit to descramble all the scrambled pieces of information included in said service. Therefore, descrambling of pieces of information is possible even using the descrambling unit which can be detached and attached.

In addition, the broadcast receiving apparatus is characterized by further comprising an information accessing unit operable to access one or more pieces of information. Here, when a second application requests the information accessing unit to access a scrambled piece of information included in a second service in a situation where i) the service execution unit requested by a first application to execute a first service is in the process of executing the first service and ii) the descrambling unit is in the process of descrambling a piece of information included in the first service, the descrambling control unit notifies the second application that the piece of information included in the second service cannot be descrambled. Therefore, the second application can find out that descrambling is not possible.

In addition, the broadcast receiving apparatus further comprises an information accessing unit operable to access one or more pieces of information. Here, when the application requests the information accessing unit to access a piece of information in a service which is not being executed by the service execution unit, the descrambling control unit notifies the application that said piece of information cannot be descrambled. Therefore, the application can find out that descrambling is not possible.

In addition, when the second application requests the service execution unit to execute a second service in a situation where i) the service execution unit requested by a first application to execute a first service is in the process of executing the first service and ii) the descrambling unit is in the process of descrambling a piece of information included in the first service, the descrambling control unit instructs the descrambling unit to i) terminate descrambling of the piece of information included in the first service, and ii) descramble all the scrambled pieces of information included in the second service. Therefore it is possible to start descrambling of the second service after descrambling of the first service is terminated.

In addition, after instructing the descrambling unit to terminate descrambling of the piece of information included in the first service, the descrambling control unit notifies the first application that descrambling of said piece of information included in the first service is terminated. Therefore, the first application can find out that descrambling of the first service is terminated.

In addition, when the descrambling control unit instructs the descrambling unit to descramble a piece of information included in a second service in a situation where the descrambling unit is in the process of descrambling a piece of information included in a first service as instructed by the descrambling control unit, the descrambling unit terminates descrambling of said piece of information included in the first service, and starts descrambling the piece of information included in the second service. Therefore, it is possible to start descrambling of the second service after descrambling of the first service is terminated.

In addition, another aspect of the present invention is a broadcast receiving apparatus comprising an information accessing unit operable to access one or more pieces of information, a descrambling unit operable to descramble a scrambled piece of information, and a descrambling control unit operable to instruct the descrambling unit to descramble the piece of information, when an application downloaded from outside the broadcast receiving apparatus requests the information accessing unit to access said piece of information. Therefore, it is possible to implicitly start descrambling of the piece of information even without being instructed by the application.

In addition, the descrambling unit can be detached and attached to the broadcast receiving apparatus, and in the case where the application requests the information accessing unit to access the piece of information when the broadcast receiving apparatus and the descrambling unit are connected, the descrambling control unit instructs the descrambler to descramble said piece of information. Therefore, it is possible to implicitly start descrambling of the piece of information without being instructed by the application, even using the descrambling unit which can be detached or attached.

In addition, when a second application requests the information accessing unit to access a second piece of information in a situation where a first application requests the information accessing unit to access a first piece of information and the descrambling unit is in the process of descrambling the first piece of information as requested by the information accessing unit, the descrambling control unit instructs the descrambling unit to descramble the second piece of information after instructing the descrambling unit to terminate descrambling of the first piece of information. Therefore, it is possible to start descrambling of the second piece of information after termination of descrambling of the first piece of information is explicitly instructed by the descrambling control unit.

In addition, after instructing the descrambling unit to terminate descrambling of the first piece of information, the descrambling control unit notifies the first application that descrambling of the first piece of information is terminated. Therefore, the first application can find out the timing of the termination of descrambling of the first service.

In addition, when the descrambling unit is instructed by the descrambling control unit to descramble a second piece of information in a situation where the descrambling unit is in the process of descrambling a first piece of information, the descrambling unit terminates descrambling of the first piece of information and starts descrambling the second piece of information. Therefore, it is possible to start descrambling of the second service after descrambling of the first service is terminated.

In addition, the broadcast receiving apparatus comprises an application priority level holding unit operable to hold a priority level of the application. Here, in the case where the second application requests the information accessing unit to perform information access in a situation where the first application is in the process of requesting the information accessing unit to perform information access, the descrambling control unit compares a priority level of the first application with a priority level of the second application which are both held by the application priority level holding unit, and instructs the descrambling unit to descramble the piece of information designated by the second application if the priority level of the second application is equal to or higher than the priority level of the first application. Therefore, the piece of information designated by the second application can be prioritized if the priority level of the second application is equal to or higher than the priority level of the first application.

In addition, before instructing the descrambling unit to descramble the piece of information designated by the second application, the descrambling control unit instructs the descrambling unit to terminate descrambling of the piece of information which the first application requests the information accessing unit to access. Therefore, it is possible to start descrambling of the piece of information designated by the second application after descrambling of the piece of information designated by the first application is terminated.

In addition, after terminating descrambling of the piece of information which the first application requests the information accessing unit to access, the descrambling control unit notifies the first application that descrambling of said piece of information is terminated. Therefore, the first application can find out that descrambling of said piece of information for which access is being requested, is terminated.

In addition, the broadcast receiving apparatus comprises an application priority level holding unit operable to hold a priority level of the application. Here, in the case where a second application requests the information accessing unit to perform information access in a situation where a first application is in the process of requesting the information accessing unit to perform information access, the descrambling control unit compares a priority level of the first application with a priority level of the second application which are both held by the application priority level holding unit, and instructs the descrambling unit to descramble the piece of information designated by the second application when the priority level of the second application is higher than the priority level of the first application. Therefore, descrambling of the piece of information designated by the second application can be prioritized when the priority level of the second application is higher than the priority level of the first application.

In addition, before instructing the descrambling unit to descramble the piece of information designated by the second application, the descrambling control unit instructs the descrambling unit to terminate descrambling of the piece of information which the first application requests the information accessing unit to access. Therefore, it is possible to start descrambling of the piece of information designated by the second application after descrambling of the piece of information designated by the first application is terminated.

In addition, after terminating descrambling of the piece of information which the first application requests the information accessing unit to access, the descrambling control unit notifies the first application that descrambling of said piece of information is terminated. Therefore, the first application can find out that descrambling of the piece of information which the information accessing unit is requested to access, is terminated.

In addition, the piece of information is an elementary stream. Therefore it is possible to descramble an elementary stream.

In addition, the information accessing unit is a means for video reproduction which accesses the piece of information in order to perform video reproduction. Therefore, it is possible to implicitly start descrambling of the piece of information during video reproduction.

In addition, the information accessing unit is a means for audio reproduction which accesses the piece of information in order to perform audio reproduction. Therefore, it is possible to implicitly start descrambling of the piece of information during audio reproduction.

In addition, the information accessing unit is a means for application downloading which accesses the piece of information in order to download the application. Therefore, it is possible to implicitly start descrambling of the piece of information upon the start of application downloading.

In addition, the information accessing unit is a means for data obtainment which accesses the piece of information in order to obtain data used by the application. Therefore, it is possible to implicitly start descrambling of the piece of information during data obtainment.

In addition, at least one of the pieces of information included in the service contains video information to be reproduced upon execution of said service. Therefore, upon the selection of the service, it is possible to implicitly start descrambling of the piece of information included in the service, which contains the video information.

In addition, at least one of the pieces of information included in the service contains audio information to be reproduced upon execution of said service. Therefore, upon the selection of the service, it is possible to implicitly start descrambling of the piece of information included in the service, which contains the audio information.

In addition, at least one of the pieces of information included in the service contains an application. Therefore, upon the selection of the service, it is possible to implicitly start descrambling of the piece of information included in the service, which contains the application.

In addition, at least one of the pieces of information included in the service contains data used by an application included in said service. Therefore, upon the selection of the service, it is possible to implicitly start descrambling of the piece of information included in the service, which contains said data.

FURTHER INFORMATION ABOUT TECHNICAL BACKGROUND TO THIS APPLICATION

The disclosure of Japanese Patent Application No. 2003-307847 filed on Aug. 29, 2003 and 2004-197338 filed on Jul. 2, 2004, including specifications, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the Drawings:

FIG. 2 shows an example of the use of frequency bands used in the communication between a broadcast station-side system and a terminal apparatus in the cable television system in the present invention.

FIG. 3 shows an example of the use of frequency bands used in the communication between a broadcast station-side system and a terminal apparatus in the cable television system in the present invention.

FIG. 4 shows an example of the use of frequency bands used in the communication between a broadcast station-side system and a terminal apparatus in the cable television system in the present invention.

FIG. 5 is a configuration diagram of a TS packet prescribed in the MPEG-2 specification.

FIG. 6 is a schematic diagram of an MPEG-2 transport stream.

FIG. 9 is a structure diagram of an MPEG-2 section prescribed in the MPEG-2 specification.

FIG. 10 shows an example of a usage of an MPEG-2 section prescribed in the MPEG-2 specification.

FIG. 11 shows an example of a usage of a PMT prescribed in the MPEG-2 specification.

FIG. 12 shows an example of a usage of a PAT prescribed in the MPEG-2 specification.

FIG. 23 shows an example of an EPG executed by the terminal apparatus 1600 in the present invention.

FIG. 29 shows an example of the information holding of the descrambler management unit in the present invention.

FIG. 41 shows an example of the information holding of the descrambler management unit in the third embodiment.

FIG. 57 is a schematic diagram of contention for a descrambler in the seventh embodiment.

FIG. 68 shows an example of the configuration of the descrambling status management unit in the fifteenth embodiment.

FIG. 69 shows an example of the configuration of the descrambling status management unit in the fifteenth embodiment.

FIG. 70 is a schematic diagram of the service storage unit managed by the service manager, in the eighteenth embodiment.

DESCRIPTION OF THE PREFERRED EMBODIMENT(S)

First Embodiment

The present invention assumes the three types of operational configurations, namely a satellite system, a terrestrial system, and a cable system, as its target broadcast systems. The satellite system is a configuration that uses a satellite to transmit broadcast signals to a broadcast receiving apparatus. The terrestrial system is a configuration that uses a terrestrial signal transmitter to transmit broadcast signals to a broadcast receiving apparatus. The cable system is a configuration that uses a cable head-end to transmit broadcast signals to a broadcast receiving apparatus. As the present invention does not bear a direct relation to the differences in each broadcast system, it is applicable, irrespective of the broadcast system.

Figure 1:
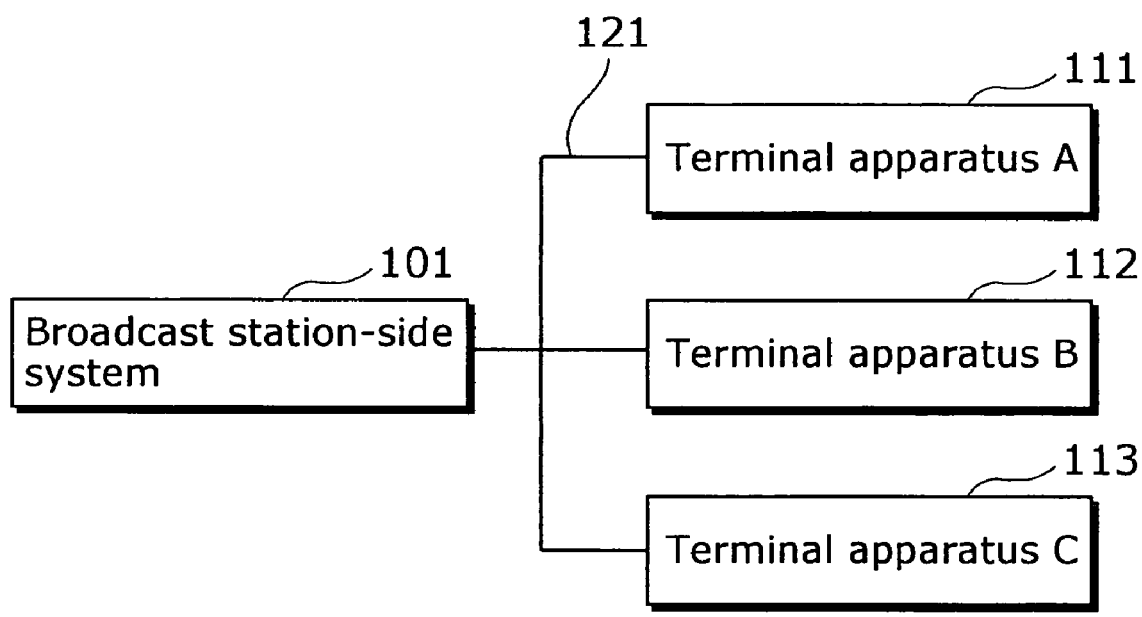
FIG. 1 is a configuration diagram of the broadcast system in the present invention.

The embodiments of the broadcast system concerning the present invention shall be explained with reference to the diagrams. FIG. 1 is a block diagram showing the relationship of devices making up a broadcast system, and is made up of a broadcast station-side system 101, and three terminal apparatuses, namely a terminal apparatus A 111, a terminal apparatus B 112, and a terminal apparatus C 113. There are wired and wireless cases for the link 121 between the broadcast station-side system and each terminal apparatus. For example, in a cable system, a broadcast station-side system and each terminal apparatus are linked by wire. On the other hand, between a broadcast station-side system and each terminal apparatus in a satellite/terrestrial system, there are no wire links for the downward direction (from the broadcast station-side system to each terminal apparatus), and a broadcast signal is transmitted using radio waves. For the upward direction (from each terminal apparatus to the broadcast-side system), both cases of wired links such as telephone lines and wired internet, and wireless links which use wireless communication, exist. Each terminal apparatus transmits information such as user inputs, to the broadcast station-side system. Although the broadcast station-side system is linked to three terminal apparatuses in the present embodiment, the present invention can be applied even when an arbitrary number of terminal apparatuses are linked to the broadcast station-side system.

The broadcast station-side system 101 includes data for video, audio and data broadcasting, and the like, into broadcast signals and transmits such signals to a plurality of terminal apparatuses. Broadcast signals are transmitted using a frequency within a frequency band set according to the prescribed operation of a broadcasting system, the laws of a region or country where a broadcast system operates, or the like.

An example of a prescribed broadcast signal transmission is given as an example. In the cable system shown in this example, the frequency band used for broadcast signal transmission is partitioned and used according to the content of the data and the direction of the transmission (upward, downward). FIG. 2 is a table showing an example of a frequency band partition. The frequency band is mainly partitioned into two types, namely Out Of Band (abbreviated as OOB) and In-Band. 5 to 130 MHz is allocated for OOB, and is mainly used for the exchange of data between the broadcast station-side system 101 and the terminal apparatus A 111, the terminal apparatus B 112, and the terminal apparatus C 113. 130 MHz to 864 MHz is allocated for In-Band, and is used mainly for broadcast channels which include video/audio. The Quadrature Phase Shift Keying (QPSK) modulation scheme is used in the OOB, and the Quadrature Amplitude Modulation (QAM) 64 or QAM256 modulation schemes are used in the In-Band frequencies. Detailed explanation regarding modulation scheme technology shall be omitted as it is public knowledge of limited concern in the present invention. FIG. 3 shows a more detailed example of the use of the OOB frequency band. 70 MHz to 74 MHz is used for data transmission from the broadcast station-side system 101, with all the terminal apparatus A 111, terminal apparatus B 112, and terminal apparatus C 113, receiving the same data from the broadcast station-side system 101. On the other hand, 10.0 MHz to 10.1 MHz is used for the data transmission from the terminal apparatus A 111 to the broadcast station-side system 101, 10.1 MHz to 10.2 MHz is used for the data transmission from the terminal apparatus B 112 to the broadcast station-side system 101, and 10.2 MHz to 10.3 MHz is used for the data transmission from the terminal apparatus C 113 to the broadcast station-side system 101. Through this, data specific to each terminal apparatus can be transmitted to the broadcast station-side system 201 from each of the terminal apparatus A 111, terminal apparatus B 112, and terminal apparatus C 113. FIG. 4 shows an example for the use of the In-Band frequency band. 150 to 156 MHz and 156 to 162 MHz are allotted to a television channel 1 and a television channel 2, respectively, with frequencies subsequently being allotted to television channels in 6 MHz intervals. 310 MHz onwards is allotted to radio channels in 1 MHz units. Each of the respective channels may be used for analog broadcast or digital broadcast. In the case of digital broadcast, data is transmitted in the TS Packet format based on the MPEG-2 standard, and in addition to audio and video data, various types of data for data broadcasting can also be transmitted.

In order to transmit the appropriate broadcast signal to a terminal apparatus using the respective frequency bands, the broadcast station-side system 101 has a QPSK modulation unit, a QAM modulation unit, and so on. In addition, in order to receive data from a terminal apparatus, it has a QPSK demodulation device. Moreover, the broadcast station-side system 101 is assumed to possess the various devices associated with the respective modulation units, as well as the demodulation unit. However, as the present invention is mainly concerned with a terminal apparatus, detailed explanation shall be omitted.

The terminal apparatus A 111, terminal apparatus B 112, and terminal apparatus C 113 receive and reproduce the broadcast signal from the broadcast station-side system 101. In addition, they transmit data which is specific to each terminal apparatus to the broadcast station-side system 101. The three terminal apparatuses adopt the same configuration in the present embodiment.

Moreover, although the details of an example regarding the operation of a cable system are introduced in the present example, the present invention can also be applied to configurations other than a satellite, a terrestrial system, as well as a cable system. In satellite and terrestrial systems, both wired and wireless cases exist in the links between the broadcast station-side system and each terminal apparatus, as previously mentioned. Moreover, the frequency bands, frequency interval, modulation scheme, broadcast station-side system configuration, and so on, are different depending on the type, operation, and so on, of the broadcast system. However, these bear no relevance to the present invention and the present invention can be applied regardless of how they are prescribed.

The broadcast station-side system 101 modulates an MPEG-2 transport stream and transmits it by including it in a broadcast signal. A broadcast receiving apparatus receives and demodulates the broadcast signal. It then replicates the MPEG-2 transport stream from within which it extracts and uses necessary information. In order to explain the functions and the structure of connections of the devices present in the digital broadcast receiving apparatus, first the structure of an MPEG-2 transport stream shall be described in brief.

FIG. 5 is a diagram showing the structure of a TS packet. A TS packet 500 has a length of 188 bytes, and is made up of a header 501, an adaptation field 502, and a payload 503. The header 501 holds the control information of the TS packet. It has a length of 4 bytes and adopts a structure as shown in 504. A field described as a "Packet ID (hereinafter as PID)" is carried within this, and the identification of a TS packet is performed using the value of the PID. The adaptation field 502 holds additional information such as time information, and so on. The existence of the adaptation field 502 is not essential and there are cases where it is not present. The payload 503 holds the information transmitted by the TS packet such as video/audio data, data for data broadcasting, and so on.

FIG. 6 is a schematic diagram of an MPEG-2 transport stream. A TS packet 601 and a TS packet 603 hold a PID 100 in the header, and hold information regarding video 1 in the payload. A TS packet 602 and A TS packet 605 hold a PID 200 in the header, and hold information regarding data 1 in the payload. A TS packet 604 holds a PID 300 in the header, and holds information regarding audio 1 in the payload.

The MPEG-2 transport stream 600 is made up of consecutive TS packets such as the TS packets 601 to 605. The TS packet holds, in its payload, a variety of information such as video and audio data, data for data broadcasting, and so on. The broadcast receiving apparatus receives a TS packet and, by extracting the information held by each TS packet, reproduces the video/audio, and uses data such as program information, and so on. At this point, TS packets holding the same PID hold the same type of information. So in FIG. 6, the TS packet 601 and the TS packet 603 both transmit information regarding the video 1, and the TS packet 602 and the TS packet 605 both transmit information regarding the data 1.

Figure 7:
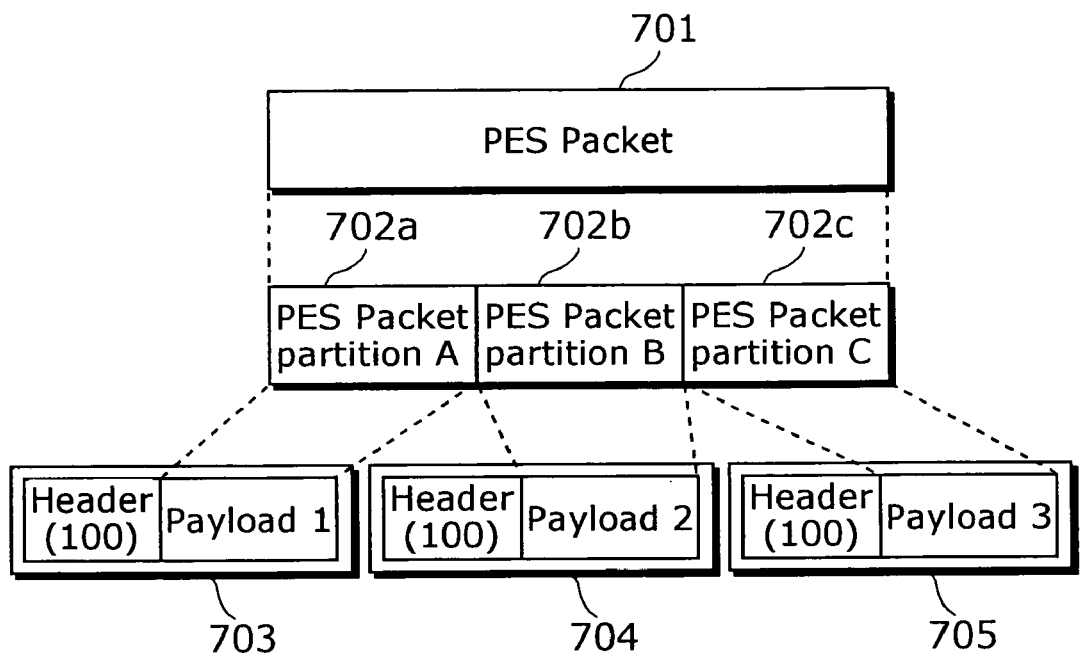
FIG. 7 shows an example of the partitioning of a PES packet prescribed in the MPEG-2 specification, during transmission using a TS packet.

Video and audio data are represented in a form referred to as a Packetized Elementary Stream (PES) packet. The PES packet includes video information or audio information for a certain time period, and the broadcast receiving apparatus is able to output the video/audio data that is contained by such PES packet to the display/speaker by receiving the PES packet. Through the uninterrupted transmission of PES packets by the broadcast station, the broadcast receiving apparatus is able to continuously reproduce video/audio without interruption. During actual transmission, in the case where the PES packet has a greater size than the payload of a single TS packet, it is partitioned and stored in the payload of a plurality of TS packets. FIG. 7 shows an example of the partitioning during a PES packet transmission. As a PES packet 701 is too large to be stored and transmitted in the payload inside a single TS packet, it is partitioned into a PES packet partition A 702a, a PES packet partition B 702b, and a PES packet partition C 702c, and transmitted by way of the three TS packets 703 to 705 having the same PID. Moreover, depending on the operation, a PES packet transmits not only video/audio data, but also data for captions referred to as subtitle.

Figure 8:
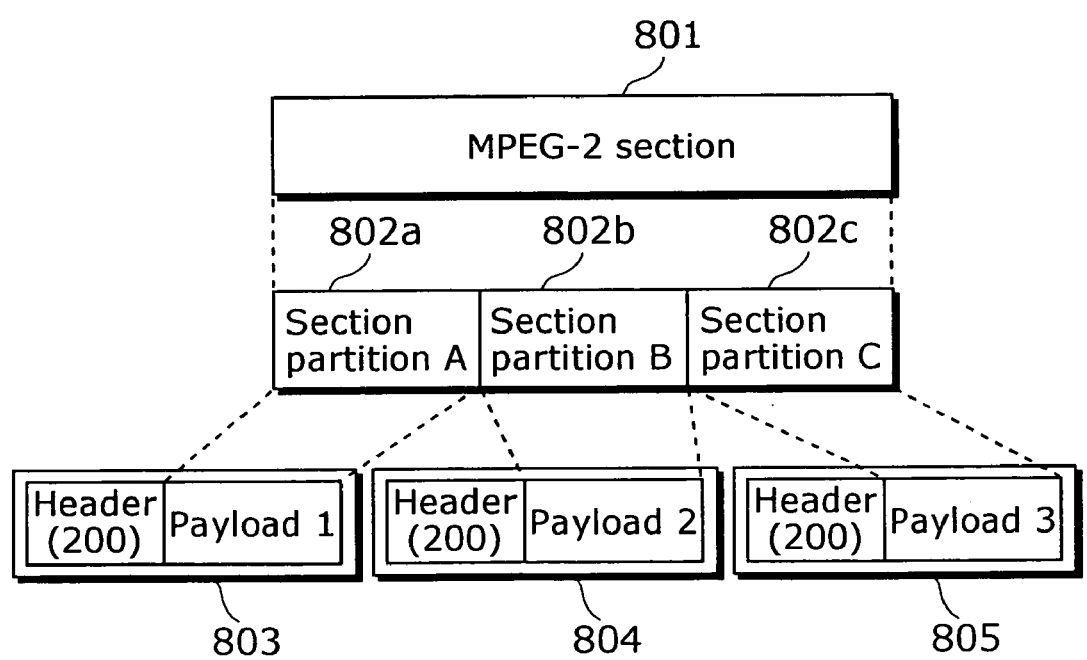
FIG. 8 shows an example of the partitioning of an MPEG-2 section prescribed in the MPEG-2 specification, during transmission using a TS packet.

Program information, data for data broadcasting, and the like, are represented using a format referred to as an MPEG-2 section. During actual transmission, in the case where the MPEG-2 section has a greater size than the payload of a single TS packet, it is partitioned and stored in the payload of a plurality of TS packets. FIG. 8 shows an example of the partitioning during the transmission of an MPEG-2 section. As an MPEG-2 section 801 is too large to be to be stored and transmitted in the payload inside a single TS packet, it is partitioned into a section partition A 802a, a section partition B 802b, and a section partition C 802c, and transmitted by way of the three TS packets 803 to 805 having the same PID.

FIG. 9 represents the structure of an MPEG-2 section. An MPEG-2 section 900 is made up of a header 901 and a payload 902. The header 901 holds the control information of the MPEG-2 section. Its structure is represented by the header structure 903. The payload 902 holds the data transmitted by the MPEG-2 section 900. A table_id found in the header structure 903 represents the type of the MPEG-2 section. In addition, table_id_extension is an extended identifier to be used in differentiating MPEG-2 sections having roughly the same table_id. FIG. 10 provides a case where program information is transmitted, as an example of the use of an MPEG-2 section. In this example, as described in row 1004, the information necessary for demodulating a broadcast signal is described in the MPEG-2 section having a table_id of 64 in the header structure 903. In addition such MPEG-2 section is transmitted by a TS packet assigned with a PID of 16.

A partial TS packet stream extracted from only those TS packets sorted out by the same PID within the TS packet stream existing inside the MPEG-2 transport stream, is known as an elementary stream (ES). For example, in FIG. 7, the TS packets 701 to 705 transmitting the partitioned PES packet 701 are all sorted out by the PID 100. It can be said that this is the ES transmitting the PES packet 701. In the same manner, in FIG. 8, the TS packets 803 to 805 transmitting the partitioned MPEG-2 section 801 are all sorted out by the PID 200. It can be said that this is the ES transmitting the MPEG-2 section 801.

In addition, a concept referred to as a program exists within the MPEG-2 transport stream. A program is described as a collection of ESs, and is used when the combined handling of a plurality of ESs is desired. Using a program enables video/audio data, their accompanying data for data broadcasting, and so on, to be handled as a group. For example, in the case of grouped handling for video/audio to be reproduced at the same time, by putting together the ES transmitting the PES packet including the video data and the ES transmitting the PES packet including the audio data, as a program, the broadcast receiving apparatus recognizes that the two ESs are to be reproduced at the same time.

In order to represent a program, two tables known as Program Map Table (PMT) and Program Association Table (PAT) are used in MPEG-2. ISO/IEC 13818-1, "MPEG-2 Systems" specification should be referred to for detailed explanation. Hereinafter, a brief explanation regarding PMT and PAT shall be made.

A PMT is a table included inside an MPEG-2 transport stream in the same number as there are programs. The PMT is structured as an MPEG-2 section, and has a table_id of 2. A program number used for the identification of a program, additional information of the program, and in addition, information regarding the ES belonging to the program are held in the PMT. FIG. 11 provides an example of a PMT. 1100 shows the program number. The program number is assigned uniquely to programs in the same transport stream, and is used in identifying PMTs. Rows 1111 to 1114 represent information regarding each ES. Column 1101 shows the type of the ES, where "audio", "video", "data", and so on, are designated. Column 1102 shows the PID of the TS packets making up the ES. Column 1103 shows added information regarding the ES. For example, the ES described in row 1111 is an ES transmitting a PES packet for audio, and is made up of the TS packets with a PID of 5011.

A PAT is a table that exists singly in an MPEG-2 transport stream. The PAT is structured as an MPEG-2 section, has a table_id of 0, and is transmitted by the TS packets with a PID of 0. The transport_stream_id used for identifying an MPEG-2 transport stream, and information regarding all the PMTs representing programs existing within the MPEG-2 transport stream are held in the PAT. FIG. 12 provides an example of a PAT. 1200 shows the transport_stream_id. The transport_stream_id is used in the identification of the MPEG-2 transport stream. Rows 1211 to 1213 represent information regarding the programs. Column 1201 shows the program number. Column 1202 shows the PID of the TS packet transmitting the PMT corresponding to the program. For example, the PMT of the program shown in the row 1211 has a program number of 101, and the corresponding PMT is transmitted by the TS packet having a PID of 501.

In the broadcast receiving apparatus, when a user gives an instruction for the reproduction of video/audio belonging to a program, the reproduction of the designated video/audio is carried out using the PAT and PMT. For example, with regard to the MPEG-2 transport stream transmitting the PAT in FIG. 12 and the PMT in FIG. 11, the following procedures are taken in the case where the reproduction of the video/audio belonging to the program with a program number of 101 is carried out. First, the PAT being transmitted as the MPEG-2 section with the table_id of "0" is obtained from the TS packet with a PID of "0". The program with a program number of "101" is searched for in the PAT, and the row 1211 is acquired. The TS packet with the PID "501" transmitting the PMT of the program with a program number of "101" is acquired from the row 1211. Next, the PMT being transmitted as the MPEG-2 section with the table_id of "2" is obtained from the TS packet with the PID of "501". The row 1111 which shows the ES information for audio, and the row 1112 which shows the ES information for video, are acquired from the PMT. The TS packets having a PID of "5011" making up the ES, transmitting the PES packet for audio is acquired from the row 1111. In addition, the TS packets having a PID "5012" making up the ES, transmitting the PES packet for video is acquired from the row 1112. Next, the PES packet for audio is obtained from the TS packet with the PID "5011", and the PES packet for video is obtained from the TS packet with the PID "5012". With this, the PES packets of the video/audio targeted for reproduction can be identified, and the video and audio they transmit can be reproduced.

The present invention relates to the access control for scrambled information transmitted by an MPEG-2 transport stream. The format for the scrambling of information included in the MPEG-2 transport stream shall be discussed at this point.

In general, scrambling is referred to when certain data is put through a reversible transformation using a scrambling algorithm, and the contents of the original data are concealed. The scrambled data can be returned to the original data by using a descrambling algorithm. A scrambling/descrambling algorithm using a bit stream known as a "key" is used in broadcasts. A broadcast station performs reversible transformation on the data to be scrambled, according to an algorithm which uses a certain "scrambling key", and transmits a "descrambling key" corresponding to such "scrambling key" together with the scrambled data. A broadcast receiving apparatus restores the scrambled data using a descrambling algorithm which uses the "descrambling key" and acquires the original data. The present invention bears no relation to scrambling/descrambling algorithms, per se, and the present invention can be applied irrespective of the algorithm used.

As previously discussed, information transmitted through an MPEG-2 transport stream adopts the format of a PES packet or an MPEG-2 section, and these are partitioned and transmitted through TS packets. During such time, the scrambling process performed at the broadcast station is carried out in units of PES packets and MPEG-2 sections, and the scrambled PES packet and scrambled MPEG-2 section are partitioned and transmitted through TS packets. For example, in the case where access limitation is imposed on certain video/audio information, scrambling is carried out on the PES packets transmitting such video/audio.

Figure 13:
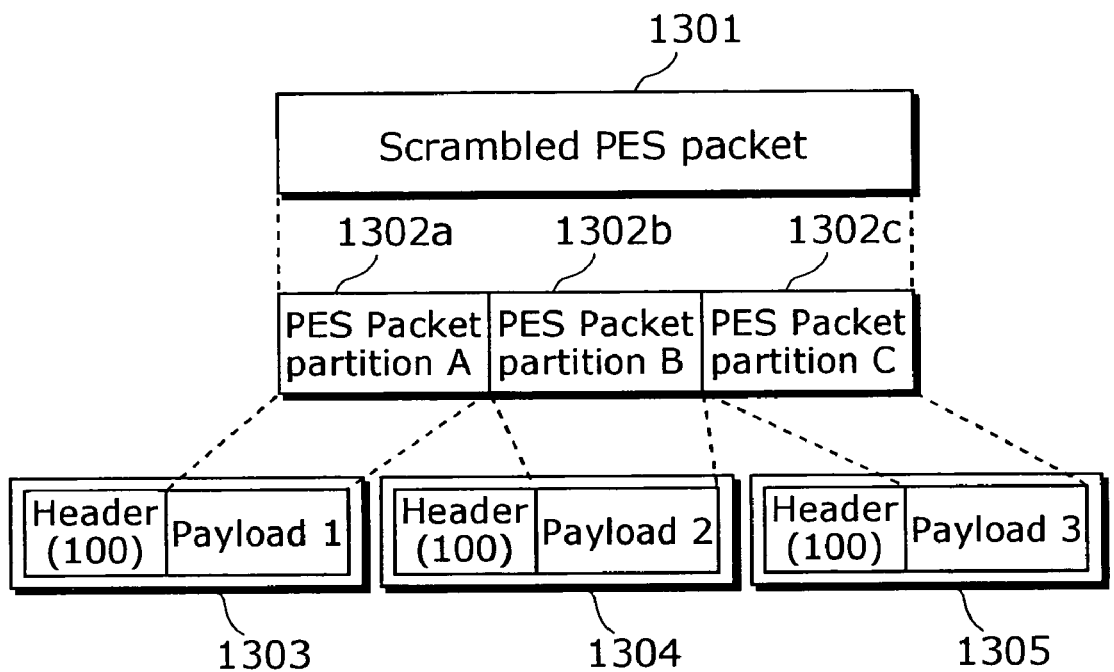
FIG. 13 shows an example of the case where a PES packet prescribed in the MPEG-2 specification is scrambled.

FIG. 13 shows the state of a PES packet being transmitted. A PES packet 1301 is scrambled, and in addition, as it is too large to be stored and transmitted in the payload inside a single TS packet, it is partitioned into a PES packet partition A 1302a, a PES packet partition B 1302b, and a PES packet partition C 1302c, and transmitted by way of the three TS packets 1303 to 1305 having the same PID. Consequently, the payload segments of the TS packets 1303 to 1305 assume a scrambled form.

Figure 14:
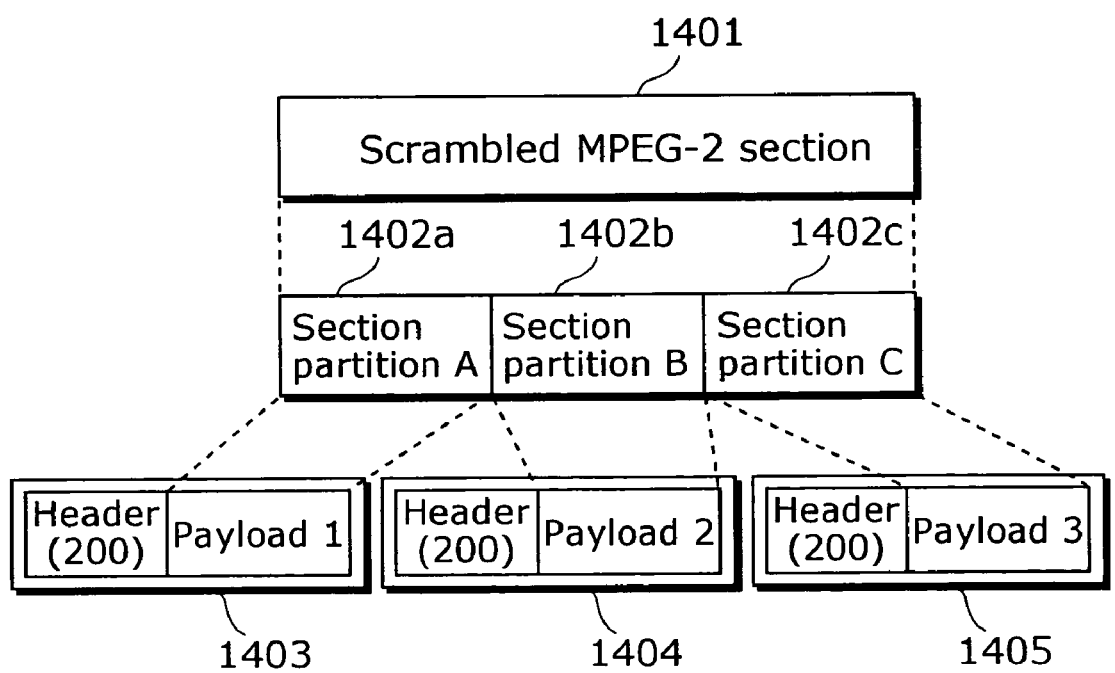
FIG. 14 shows an example of the case where an MPEG-2 section prescribed in the MPEG-2 specification is scrambled.

FIG. 14 shows the state of an MPEG-2 section being transmitted. An MPEG-2 section 1401 is scrambled, and in addition, as it is too large to be stored and transmitted in the payload inside a single TS packet, it is partitioned into a section partition A 1402*a*, a section partition B 1402*b*, and a section partition C 1402*c*, and transmitted by way of the three TS packets 1403 to 1405 having the same PID. Consequently, the payload segments of the TS packets 1403 to 1405 assume a scrambled form.

In order to use the scrambled information, the broadcast receiving apparatus performs descrambling using a device known as a descrambler. A single descrambler can carry out the descrambling for a single ES. By using the value which is set in the transport_scrambling_control held in the TS packet head structure 504 of a TS packet, the broadcast receiving apparatus can recognize whether or not the PES packet or MPEG-2 section included and transmitted in the payload of such TS packet is scrambled. If scrambled, the PES packet or MPEG-2 section transmitted in each payload is forwarded to the descrambler, and descrambling is carried out.

There are two types of information necessary for the performance of descrambling by the broadcast receiving apparatus. These are "descrambling information such as the descrambling key" and "contract information of each contracting party". Generally, they are transmitted by being included in an MPEG-2 transport stream, with the former being in a format known as Entitlement Control Message (ECM), and the latter being in a format known as Entitlement Management Message (EMM). The ECM transmits keys necessary for descrambling, and descrambling is carried out by setting these in the descrambler. The EMM transmits the contract information of each contracting party which is used in the judgment of whether or not the descrambling of information being targeted for descrambling is permitted under the contract. Both can be transmitted in the PES packet or MPEG-2 section formats, and the decision as to which one is to be used, as well as how they will be transmitted, is made according to operational regulations. In order for the broadcast receiving apparatus to obtain the ECM and EMM, the PID of the TS packets transmitting each one is required. In order to represent this, a Conditional Access (CA) descriptor and a Conditional Access Table (CAT) are prescribed in the MPEG-2 specification. The CA descriptor holds the PID of the TS packets transmitting the ECM, as well as the EMM. The CAT is a table which transmits information regarding descrambling. It is structured as the MPEG-2 section having a table_id of "1", and is transmitted by a TS packet with a PID of "1". The CAT holds the CA descriptor, and the TS packet identified by the PID held by such CA descriptor transmits the EMM. In addition, a PMT can also hold a CA descriptor, and the TS packet identified by the PID held by the CA descriptor existing in the PMT transmits the ECM.

The EMM transmits contract information, and is information associated with the broadcast receiving apparatus itself. In the case where the broadcast receiving apparatus receives the EMM, first the CAT having a table_id of "1" is obtained from a TS packet having a PID of "1", and the PID of the TS packet transmitting the EMM is obtained from the CA descriptor described in the CAT. The EMM is obtained from the TS packet identified according to such PID. It is used during the accessing of scrambled information by the broadcast receiving apparatus to judge whether or not such access is permitted under the contract.

The ECM transmits keys for descrambling information to be accessed, and is information that depends on a program, ES, or the like. In the case where the broadcast receiving apparatus accesses scrambled information, first the ES transmitting the scrambled information is identified using the PAT, as well as the PMT. Within the PMT describing the information regarding such ES, a CA descriptor is definitely described, to coincide with such ES. The TS packet identified by the PID described in such CA descriptor transmits the ECM which includes a descrambling key necessary for descrambling the information transmitted by such ES. The descrambling key described in the ECM is set in the descrambler, and used in descrambling.

Figure 15:
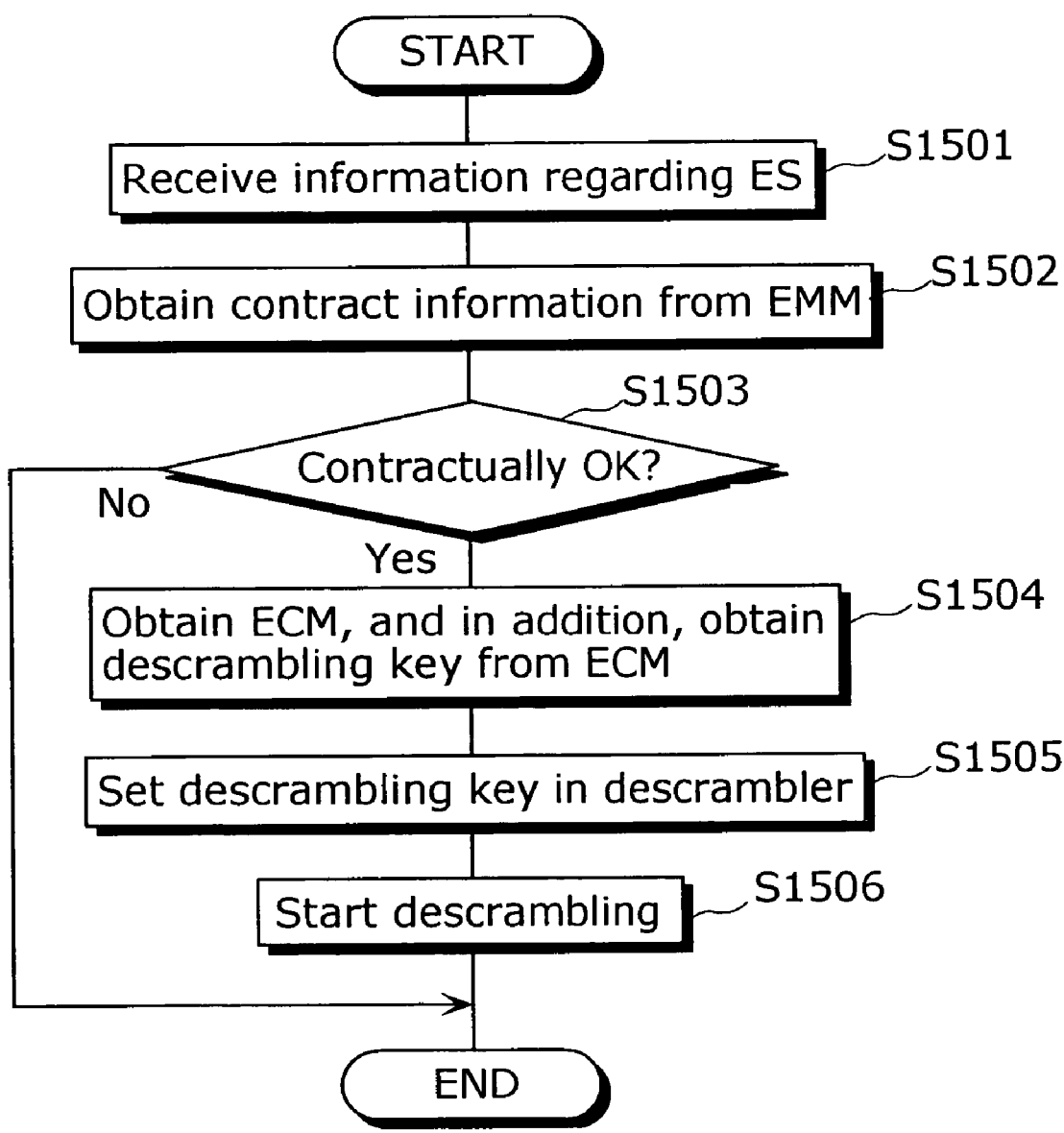
FIG. 15 shows a descrambling judgment sequence using EMM and ECM.

FIG. 15 shows the operational sequence involving the EMM and ECM in a descrambling. First, the broadcast receiving apparatus obtains the PMT from the designated identifier, and identifies the ES to be descrambled (S1501). This identifier is basically one for designating a program or an ES, and the decision on which identifier is to be used, is made depending on the operation. The simplest examples are a program number, a PID of the TS packet making up an ES, or the like. Next, contract information is obtained from the EMM (S1502). Whether or not descrambling of the information transmitted by the ES identified in S1501 is permitted under the contract is determined from the obtained contract information (S1503). If descrambling is permitted, the ECM is obtained (S1504), and the descrambling key described in the ECM is set in the descrambler (S1505), then descrambling is started (S1506).

Moreover, details and usage patterns are not prescribed in the MPEG-2 specification, and these are determined based on operational regulations conforming to respective environments. To be specific, information such as the form of the ECM and EMM (PES packet or MPEG-2 section), the format of the ECM and EMM, the length and number of descrambling keys described in the ECM, the length of time of the descrambling key update interval, the contents of the contract information described in the EMM, the ECM and EMM transmission intervals, for each environment is not prescribed in the MPEG-2 specification, and is determined to conform with the operation. In each environment, the ECM and EMM transmit information necessary for descrambling, and are naturally associated with descrambling. However, the present invention relates to an algorithm that determines "the timing of the start of descrambling" and "the object to be descrambled", and it relates to the pre-processing carried out ahead of the actual descrambling process. The present invention has limited association with the descrambling process itself, and the present invention can be applied irrespective of how an ECM and EMM are operated. Even with regard to the sequence in FIG. 15, although it is associated with the start of descrambling in the present invention, the present invention can be applied regardless of how the sequence in FIG. 15 is implemented as it is not affected by how FIG. 15 is implemented.

A brief explanation regarding the MPEG-2 specification has been carried out up to this point. However, at this point, a detailed definition of terms shall be carried out. The term "program" has two types with regard to the present invention. One is the "program" appearing in the MPEG-2 specification, and the other is the "program" referred to as the collection of codes executed by a CPU. With regard to the former, since it is synonymous with the term "service" used in operational regulations, the former shall be hereinafter referred to as "service", to prevent confusion, and the latter shall be referred to simply as "program". In addition, with regard to the latter, a "program" written in the Java (registered trademark) language shall be referred to as a "Java program".

Explanation regarding some information determined in the MPEG-2 specification, associated with the present invention has been carried out above. Hereinafter, explanation shall be carried out regarding the hardware configuration which is the premise of the present embodiment.

Figure 16:
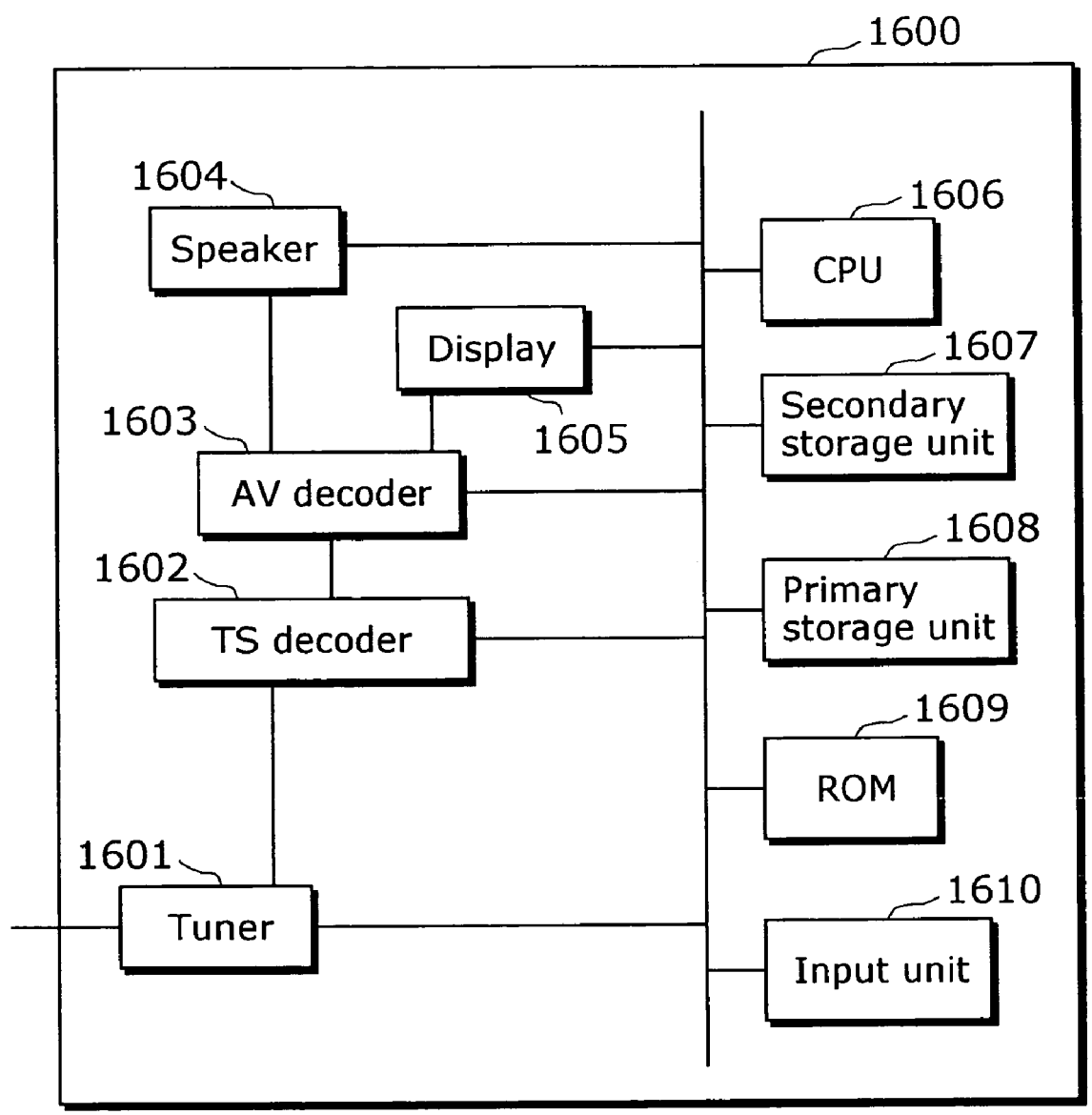
FIG. 16 shows a configuration example of the hardware configuration of the broadcast receiving apparatus in the present invention.

FIG. 16 is a block diagram showing a typical hardware configuration of a digital broadcast receiving apparatus. 1600 is a terminal apparatus made up of a tuner 1601, a TS decoder 1602, an AV decoder 1603, a speaker 1604, a display 1605, a CPU 1606, a secondary storage unit 1607, a primary storage unit 1608, a ROM 1609, and an input unit 1610.

The tuner 1601 is a device that demodulates, according to tuning information which includes the frequency designated by the CPU 1606, a broadcast signal modulated and transmitted from the broadcast station-side system 101. The MPEG-2 transport stream obtained from the demodulation by the tuner 1601 is transmitted to the TS decoder 1602.

The TS decoder 1602 is a device equipped with the function to sort out, from an MPEG-2 transport stream, the PES packet, MPEG-2 section, or the like, that matches designated conditions, based on the designation of the PID and the section sorting condition, and so on, designated by the CPU 1606. The PES packet sorted out by the TS decoder 1602 is transmitted to the AV decoder 1603. In addition, the MPEG-2 section sorted out by the TS decoder 1602 undergoes a Direct Memory Access (DMA) transfer to the primary storage unit 1608, to be used by a program executed by the CPU 1606. In addition, a descrambler exists within the TS decoder 1602, and descrambling of a scrambled PES packet and MPEG-2 section is carried out.

The AV decoder 1603 is a device which possesses the function for decoding encoded video and audio. The AV signal obtained from the decoding by the AV decoder 1603 is transmitted to the speaker 1604, and the display 1605. Moreover, there are also cases where the AV decoder 1603 cannot always decode video and audio simultaneously. It is also possible to have a video decoder and an audio decoder existing as separate units. In addition, in some circumstances, there are cases where the AV decoder 1603 also possesses a function for decoding subtitle data. Furthermore, the AV decoder 1603 cannot decode audio/video information transmitted by a scrambled PES packet. For that reason, in the case where the descrambling of the PES packet cannot be carried out in the descrambler within the TS decoder 1602, a user cannot view the video/audio transmitted by such PES packet.

The speaker 1604 and the display 1605 are devices possessing the function for respectively outputting the audio and video transmitted from the AV decoder 1603.

The CPU 1606 executes a program operating on a broadcast receiving apparatus. There are cases where the program executed by the CPU 1606 is included in the ROM 1609, cases where it is downloaded from a broadcast signal, network, or the like, and held in the primary storage unit 1608, cases where it is downloaded from a broadcast signal, network, or the like, and stored in the secondary storage unit 1607, and so on. The tuner 1601, the TS decoder 1602, the AV decoder 1603 the speaker 1604, the display 1605, the secondary storage unit 1607, the primary storage unit 1608, the ROM 1609, and the input unit 1610, are controlled following instructions of the executed program.

The secondary storage unit 1607 is configured from devices in which information is not erased even during a cut-off of power in the terminal apparatus 1600 such as a non-volatile memory such as a FLASH-ROM, a Hard Disk Drive (HDD), and rewritable media such as CD-R, DVD-R, or the like. The secondary storage unit 1607 performs the storage of information according to the instructions of the CPU 1606. It is used for the storage of data, which if lost due to a power cut-off in the terminal apparatus 1600, would cause problems.

The primary storage unit 1608 is configured from a RAM, or the like, and is a device with a function for temporarily storing information according to the instructions of the CPU 1606, DMA transfer-capable devices, or the like. The information held in the primary storage unit 1608 is erased by a power cut-off in the terminal apparatus 1600.

The ROM 1609 is a non-rewritable memory device, and is specifically configured from of a ROM, CD-ROM, DVD, or the like. The program executed by the CPU 1606 is stored in the ROM 1609.

Figure 17:
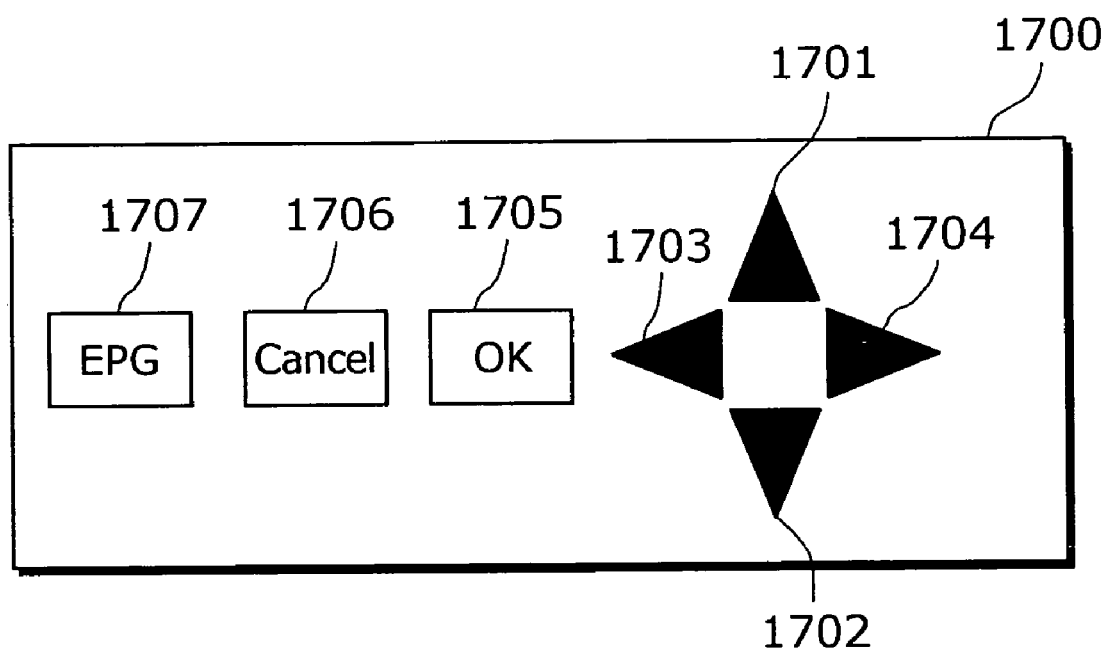
FIG. 17 shows a front panel example of the input unit 1610 in the hardware configuration of the terminal apparatus 1200 in the present invention.

The input unit 1610 is specifically made up of a front panel, remote control, or the like, and accepts input from a user. FIG. 17 is an example of the case where the input unit 1610 is made up of a front panel. A front panel 1700 includes seven buttons, namely an up cursor button 1701, a down cursor button 1702, a left cursor button 1703, a right cursor button 1704, an OK button 1705, a cancel button 1706, and an EPG button 1707. When a user presses a button, the identifier of the button pressed is relayed to the CPU 1606.

Furthermore, in FIG. 16 the display 1605 and the speaker 1604 are represented as being in a form included inside the broadcast receiving apparatus. However a type also exists in which the display 1605 and the speaker 1604 are not contained in the broadcast receiving apparatus, and the only external output is an AV signal. The location of the display 1605 and the speaker 1604 is not relevant to the present invention, and the present invention can be applied to either type. In addition, although in FIG. 16 only one each of the tuner 1601 and the AV decoder 1603 exist inside the terminal apparatus 1600, there are also hardware configurations in which pluralities of these devices exist, and the present invention can be applied even in such cases.

Figure 18:
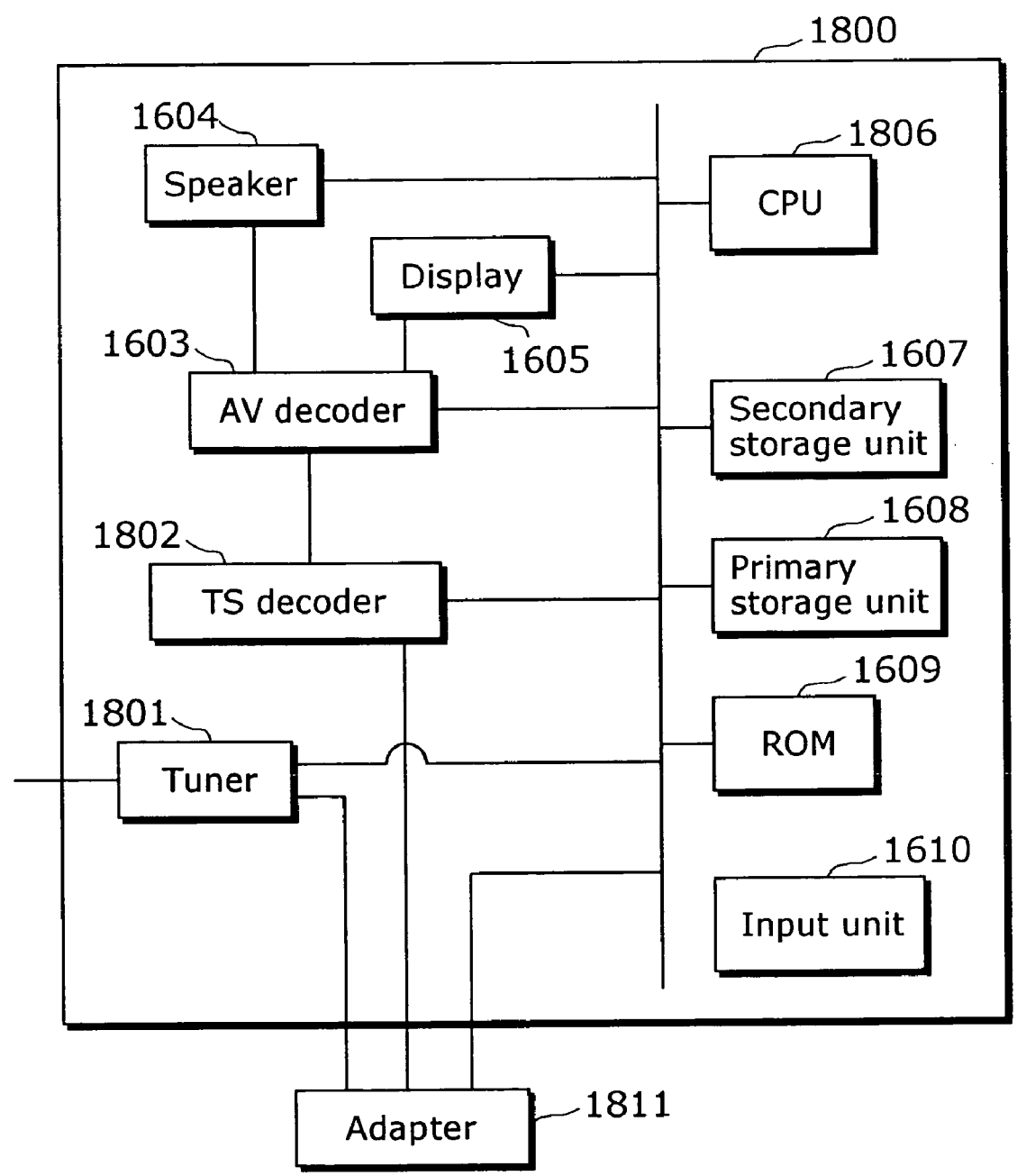
FIG. 18 shows a configuration example of the hardware configuration of the broadcast receiving apparatus in the present invention.

In the hardware configuration shown in FIG. 16, the descrambler is mounted by default inside the TS decoder 1602 of the terminal apparatus 1600 prior to shipment. However, there are also terminal apparatuses which adopt a hardware configuration in which the terminal apparatus and an external adapter that includes the descrambler are connected, and descrambling is performed using the descrambler within the external adapter. FIG. 18 is provided as an example of such a hardware configuration. 1800 is a terminal apparatus, and is made up of a tuner 1801, a TS decoder 1802, an AV decoder 1603, a speaker 1604, a display 1605, a CPU 1806, a secondary storage unit 1607, a primary storage unit 1608, a ROM 1609, and an input unit 1610. As the devices included in the terminal apparatus 1800 identified by the same numbering as in FIG. 16 possess the same functions as in FIG. 16, their explanations shall be omitted. An adapter 1811 is provided in the terminal apparatus 1800.

The adapter 1811 is equipped with a descrambler. The adapter 1811 appearing in the hardware configuration example in FIG. 18 holds one or more descramblers which receive MPEG-2 transport streams, and with regard to the TS packets included in the inputted MPEG-2 transport stream, carries out descrambling on the PES packet or MPEG-2 section transmitted by a TS packet having the PID designated by the CPU 1806. In order for the descrambler held by the adapter 1811 to operate, it is necessary for it to input the MPEG-2 transport stream demodulated by the tuner 1801 to the adapter 1811. For that reason, the tuner 1801 inputs the demodulated MPEG-2 transport stream to the adapter 1811. After descrambling the PES packet or the MPEG-2 section transmitted by the TS packet designated by the CPU 1806, within the inputted MPEG-2 transport stream, the adapter 1811 transmits such MPEG-2 transport stream to the TS decoder 1802. In the same way that the TS decoder 1602 in FIG. 16 can perform processing on the MPEG-2 transport stream inputted from the tuner 1601, it is also possible for the TS decoder 1802 to perform processing for the MPEG-2 transport stream inputted from the adapter 1811. The CPU 1806 can communicate with or control, not only the devices found in the terminal apparatus 1800, but also the devices within the adapter 1811.

Moreover, the adapter 1811 is realized in a variety of forms such as being implemented as a card-type device used by being connected to a card connection terminal of the terminal apparatus 1800, or being implemented as a box-type device used by being connected to a connection terminal of the terminal apparatus 1800 such as a Universal Serial Bus (USB) terminal, an Institute of Electrical and Electronics Engineers (IEEE) 1394 terminal, or the like. However, the present invention can be applied irrespective of the device forms of the adapter 1811 or the methods of connection with the terminal, such as those mentioned above. In addition, as it is also not dependent on the number of adapters which can be simultaneously physically connected to the terminal apparatus 1800, it can be applied even if a plurality of adapters 1811 can be physically connected. Furthermore, in the hardware configuration example in FIG. 18, a configuration is taken where the MPEG-2 transport stream is inputted from the tuner 1801 directly to the adapter 1811. However, it is also possible to have a hardware configuration where the MPEG-2 transport stream outputted from the tuner 1801 goes through the TS decoder 1802 once, after which it is inputted to the adapter 1811. In this case, the TS decoder 1802 holds a function for relaying the MPEG-2 transport stream to the adapter 1811, and using this function, the MPEG-2 transport stream received from the tuner 1801 is outputted to the adapter 1811. In addition, although only one each of the tuner 1801 and the AV decoder 1603 exist in the hardware configuration example in FIG. 18, there are also hardware configurations where they exist in pluralities. The present invention can be applied even in such a case.

As the first example of an adapter, an explanation shall be made regarding the DVB-CI (Common Interface) card. The specification of DVB-CI is pointed out in "ETSI EN50221". Here, a brief explanation shall be made regarding the DVB-CI specification. The DVB-CI specification is an interface specification for adding an adapter to a terminal apparatus, where the terminal apparatus and adapter are connected using a Personal Computer Memory Card International Association (PCMCIA) interface. The DVB-CI card contains a descrambler internally and is used in a configuration like the hardware configuration example in FIG. 18. In the hardware configuration example in FIG. 16, it is necessary for the terminal apparatus 1600 to carry out the entirety of the sequence in FIG. 15. However, in DVB-CI, the sequence in FIG. 15 is performed by the CPU mounted in the DVB-CI card. Through the binary transmission of the PMT describing the CA descriptor (CA-PMT) to the DVB-CI card by the CPU 1806 inside the terminal apparatus 1800, the DVB-CI manipulates the EMM and ECM, and automatically begins descrambling.

Figure 19:
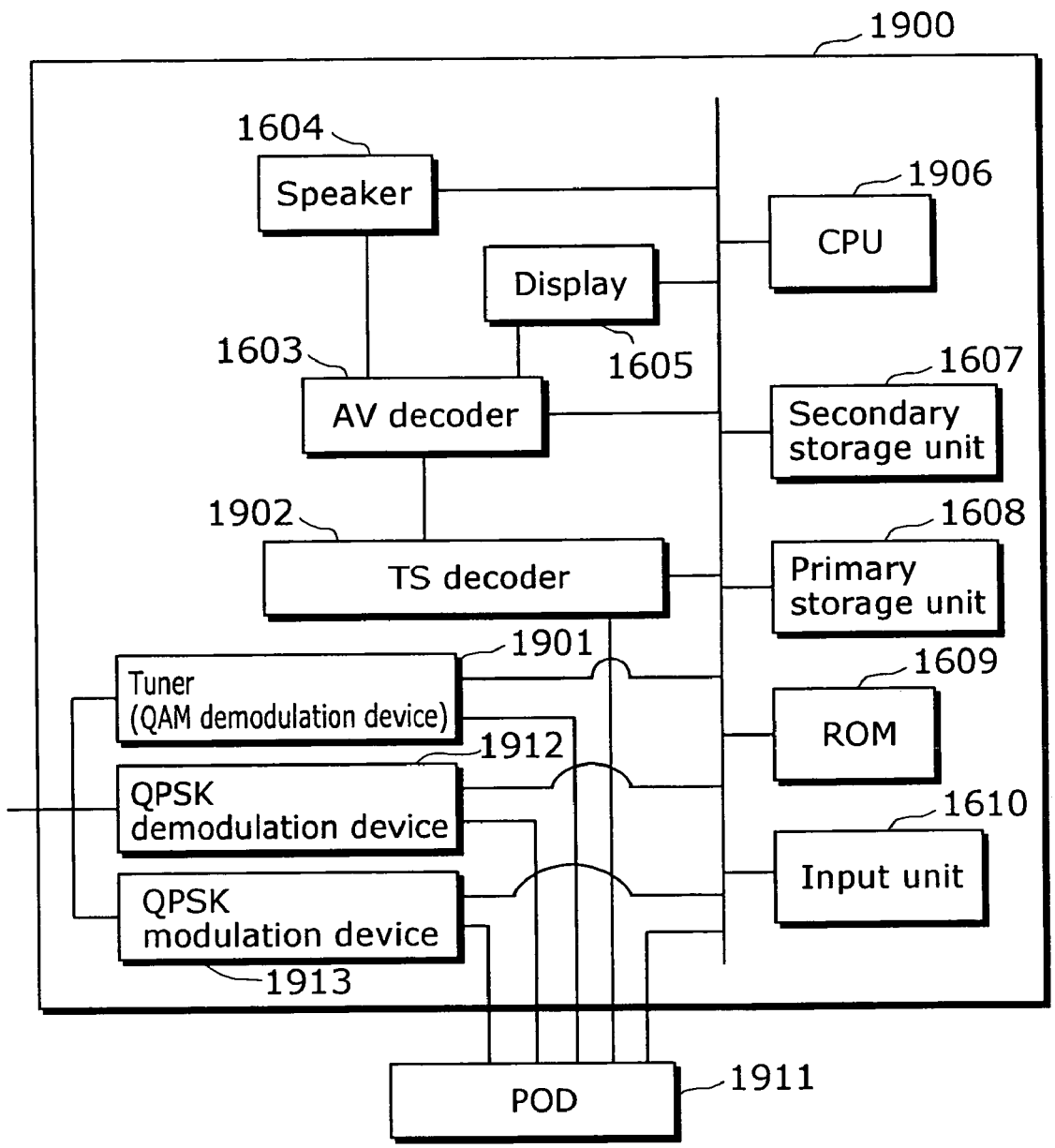
FIG. 19 shows a hardware configuration example of the broadcast receiving apparatus using a POD, in the present invention.

As the second example of an adapter, explanation will be made regarding Point Of Deployment (POD) used in the American cable system. The specification of POD is pointed out in the "OC-SP-HOSTPOD-IF" specification. Here, a brief explanation shall be made regarding POD. Like the DVB-CI, POD also adopts a card-type form, and is connected to a terminal apparatus using a PCMCIA interface. FIG. 19 shows the hardware configuration of a terminal apparatus provided with a POD 1911. The devices existing inside the terminal apparatus 1900 that are identified by the same numbering as in FIG. 16 or FIG. 18 have the same functions as in FIG. 16 or FIG. 18. The POD 1911 is equipped with a descrambler, and like the adapter 1811 in FIG. 18, it receives an MPEG-2 transport stream from the tuner 1901, and outputs a descrambled MPEG-2 transport stream to the TS decoder 1902. In addition, in the American cable system, a variety of information is transmitted in the upward and downward directions using the so-called OOB frequency band, as shown in FIG. 2 and FIG. 3. At this point, as the format of information to be sent out by the broadcast station-side system 101, and the information format that can be interpreted by the terminal apparatus 1900 are different, the exchange of information, as it is, is not possible. The POD 1911 includes a device for performing format conversion for the respective upward and downward information transmitted through the OOB. The information transmitted through the OOB is modulated in the QPSK modulation scheme. As the present modulation scheme is publicly known technology, detailed explanation shall be omitted. The terminal apparatus includes a QPSK demodulation device 1912 and a QPSK modulation device 1913. The CPU 1906 can control not only the devices within the terminal apparatus 1900, but also the devices within the POD 1911.

With regard to the downward direction information reception of the terminal apparatus 1900, first, the QPSK demodulation device 1912 demodulates the downward signal transmitted from the broadcast station-side system 101 through the OOB, and inputs the generated bit stream to the POD 1911. The POD 1911 extracts the information designated by the CPU 1906 from among the variety of information included in the bit stream. It then converts the extracted information into a format that can be interpreted by the program operating on the CPU 1906, and provides such converted information to the CPU 1906.

With regard to the upward direction information transmission of the terminal apparatus 1900, first the CPU 1906 transmits, to the POD 1911, the information to be transmitted to the broadcast station-side system 101. The POD 1911 converts the information inputted from the CPU 1906 to a format that can be interpreted by the broadcast station-side system 101, and transmits this to the QPSK modulation device 1913. The QPSK modulation device 1913 performs QPSK modulation on the information inputted from the POD 1911, and transmits this to the broadcast station-side system 101.

Moreover, like the DVB-CI, the POD 1911 is also equipped with a CPU, and the sequence in FIG. 15 is carried out by the CPU within the POD 1911. Through the binary transmission of the PMT describing the CA descriptor (CA-PMT) to the POD 1911 by the CPU 1906 inside the terminal apparatus 1900, the POD 1911 manipulates the EMM and ECM, and automatically begins descrambling. In addition, in an environment using the POD 1911, there are instances where the EMM and ECM are transmitted through In-Band and there are instances where they are transmitted through OOB. However, the obtainment method of the EMM and ECM bears no relation to the present invention, and the present invention can be applied regardless of how they are transmitted. In addition, as in FIG. 18, even with regard to FIG. 19, a configuration is taken where the MPEG-2 transport stream is inputted from the tuner 1901 directly to the adapter 1911. However, it is also possible to have a hardware configuration where the MPEG-2 transport stream outputted from the tuner 1901 goes through the TS decoder 1902 once, then is inputted to the adapter 1911. In this case, the TS decoder 1902 holds a function for relaying the MPEG-2 transport stream to the adapter 1911. In addition, although the terminal apparatus 1900 holds only one each of devices such as the tuner and AV decoder, as the present invention is not dependent on the number of the respective devices, it can be applied even if each exists in a plurality. However, if the tuner exists in a plurality and the MPEG-2 transport streams received by each is descrambled using the descrambler within the POD 1911, the POD 1911 needs to adopt a configuration which allows the input of a plurality of MPEG-2 transport streams. In addition, as the terminal apparatus 1900 inputs a plurality of MPEG-2 transport streams to the POD 1911, it needs to have a function for accepting a plurality of MPEG-2 transport streams from the POD 1911.

At this point, the differences in the descrambling process with regard to the case where the descrambler exists inside the terminal apparatus 1600 and the case where the descrambler exists within an external adapter shall be explained briefly.

In the hardware configuration shown in FIG. 16, a descrambler within the terminal apparatus 1600 is present. In order to perform descrambling, it is necessary to designate a descrambling key and a PID to the descrambler. For that purpose, in such a hardware configuration, the terminal apparatus 1600 itself obtains the ECM from which the descrambling key is further obtained, and these values are set in the descrambler.

In the hardware configuration shown in FIG. 18, the descrambler exists outside the terminal apparatus 1800. As previously described, the DVB-CI and POD are typical examples. In the case where the descrambler exists outside the terminal apparatus 1800 like the external adapter 1811, it is necessary for the terminal apparatus 1800 to convey to the external adapter 1811 the ES information for which descrambling is to be started or concluded. In the case of the DVB-CI and POD, a message known as CA-PMT is used. The CA-PMT adopts the same form as the PMT and internally contains information of the ES. The CA-PMT deletes "information except information regarding descrambling" from the PMT. In addition, it is added with a descrambling control flag which indicates whether descrambling is to be started or concluded. When DVB-CI and POD receive a CA-PMT with a descrambling control flag of "start" from the terminal apparatus 1800, the descrambling of the ES described in that CA-PMT is started. The DVB-CI and POD internally holds not only a descrambler, but also a CPU, a ROM where the descrambling program is recorded, a primary memory, and a device for obtaining an EMM/ECM. Operations such as obtaining the EMM and ECM, contractually judging based on EMM information, setting the descrambling key described in the ECM in the descrambler, and the setting of the PID in the descrambler, are carried out by the program in the DVB-CI and POD. Furthermore, when DVB-CI and POD receive a CA-PMT with a descrambling control flag of "stop" from the terminal apparatus 1800, the descrambling of the ES described in that CA-PMT is concluded. By configuring and forwarding the CA-PMT to the DVB-CI and POD, the terminal apparatus 1800 is able to impart descrambling start/termination instructions, information regarding the ES, or the like, to the DVB-CI and POD, and the control of descrambling is made possible.

Figure 20:
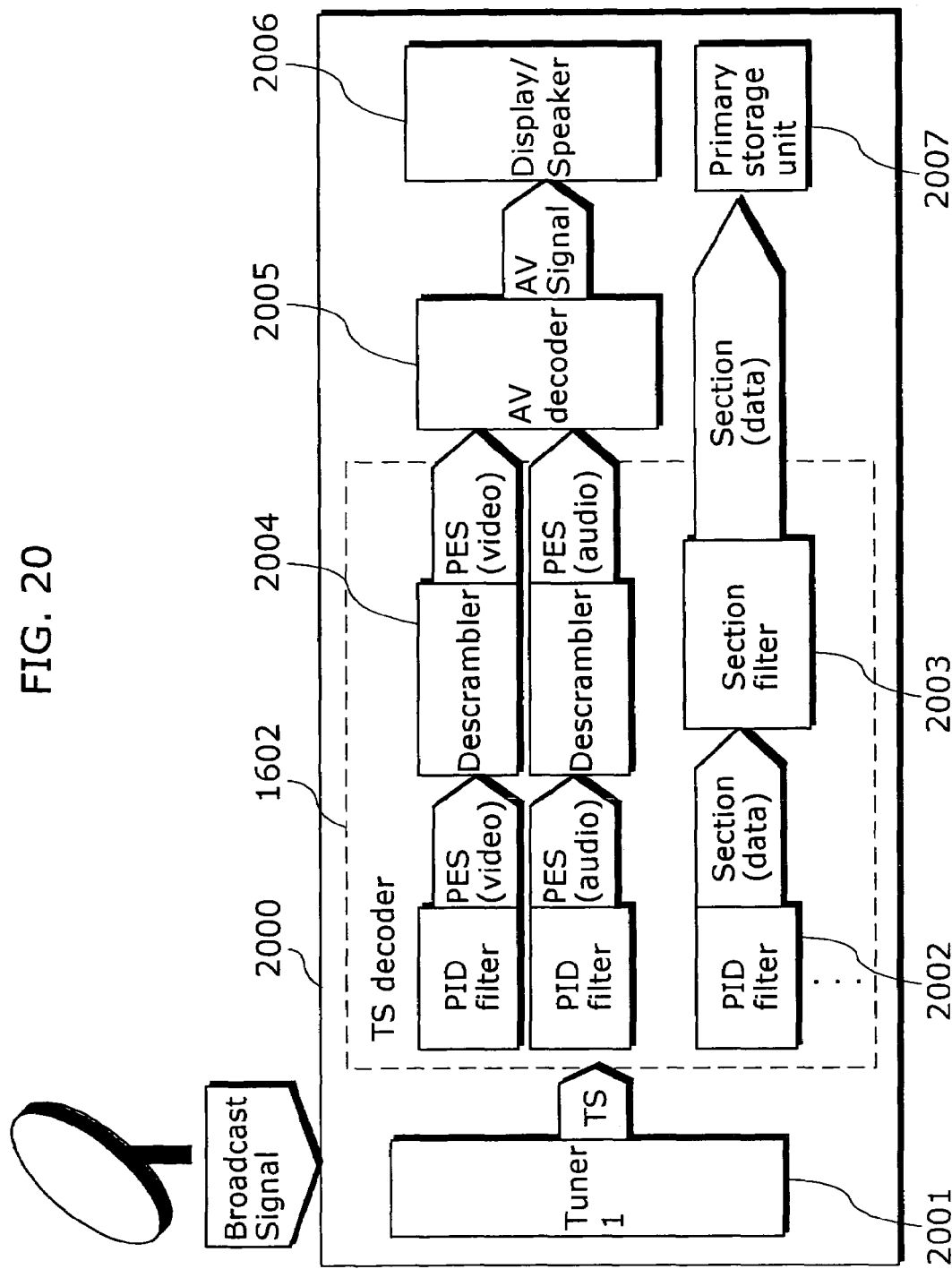
FIG. 20 shows a device connection example of the broadcast receiving apparatus in the present invention.

Using the respective devices appearing in FIG. 16 to FIG. 19, the broadcast receiving apparatus implements the function of outputting the transmitted video/audio data included in a broadcast signal onto a screen, the function of extracting data such as program information from a broadcast signal and providing such data to a user, and so on. FIG. 20 shows a conceptual diagram illustrating the physical connection sequence, processing details, and input/output data format, of the individual devices. 2000 is a terminal apparatus, and includes a tuner 2001, a PID filter 2002, a section filter 2003, a descrambler 2004, an AV decoder 2005, a display/speaker 2006, and a primary storage unit 2007. The devices appearing in FIG. 20 are on a one-to-one or one-to-many correspondence, with the devices appearing in FIG. 16.

The tuner 2001 corresponds to the tuner 1601. It has broadcast signals as an input and outputs an MPEG-2 transport stream.

There are three devices within the TS decoder 1602 for processing an MPEG-2 transport stream, namely the PID filter 2002, the section filter 2003, and the descrambler 2004. The functions of such devices shall now be described in detail.

The PID filter 2002 extracts the TS packet bearing the PID designated by the CPU 1606 from the inputted MPEG-2 transport stream, and further extracts the PES packet, MPEG-2 section, and so on, found in the payload of such TS packet. For instance, the case where the PES packet 701 is extracted under the circumstances shown in FIG. 7, is taken as an example. First, the CPU 1606 sets the PID 100 on the PID filter 2002, and then sends out a request for the extraction of the PES packet. At which point, the PID filter 2002 extracts the TS packets 703 to 705 having the PID of 100 from among the TS packets flowing in the MPEG-2 transport stream. It then further draws out the PES packet partition A 702*a*, the PES packet partition B 702*b*, and the PES packet partition C 702*c*, contained in the payload of the extracted TS packets 703 to 705, and connects such partitions to form the PES packet 701. One or more of the PID filter 2002 is found within the TS decoder 1602.

The descrambler 2004 performs descrambling on the PES packet and the MPEG-2 section outputted by the PID filter 2002. Even in the case where the PES packet and the MPEG-2 section are scrambled, they are still transmitted by being partitioned, as in FIG. 7 and FIG. 8. The descrambler 2004 is able to identify the TS packet transmitting the scrambled PES packet and MPEG-2 section, according to the PID designation of the CPU 1606, and in addition, performs descrambling using the descrambling key designated by the CPU 1606. The descrambler 2004 outputs the descrambled PES packet to the AV decoder 2005, and the descrambled MPEG-2 section to the section filter 2003, respectively. Descrambling is a process which is applied only to scrambled PES packets and MPEG-2 sections. The descrambler 2004 only receives the PES packet and MPEG-2 section from the PID filter and performs descrambling when necessary, according to the instructions of the CPU 1606. PES packets and MPEG-2 sections that are not scrambled are outputted directly from the PID filter to the AV decoder 2005 and section filter 2003, respectively. One or more of the descrambler 2004 is found within the TS decoder 1602.

The section filter 2003 extracts, from among the inputted MPEG-2 sections, the MPEG-2 section matching the section filter condition designated by the CPU 1606, and places it in the primary storage unit 2007 by DMA transfer. The MPEG-2 section held in the primary storage unit 2007 is read and used by the CPU 1606. For instance, the case of the obtainment of an MPEG-2 section holding the tuning information in FIG. 10 is taken as an example. The CPU 1606 first sets the PID 16 on the PID filter 2002, then requests for the obtainment of the section. The PID filter 2002 extracts the section from the TS packet having the PID 16, and provides this to the section filter 2003. Next the CPU 1606 requests the section filter 2003 to extract the section having a table_id of 64. The section filter 2003 extracts the section having the table_id of 64 from among the MPEG-2 sections inputted from the PID filter 2002, and performs a DMA transfer of such extracted section, to the primary storage unit 2007. One or more of the section filter 2003 is found within the TS decoder 1602.

The AV decoder 2005, corresponding to the AV decoder 1603, has a PES packet as an input and outputs an AV signal to the display/speaker 2006. The display/speaker 2006 corresponds to the display 1605 and speaker 1604. It has an AV signal as an input and outputs video data to the display 1605, and audio data to the speaker 1604.

The primary storage unit 2007 corresponds to the primary storage unit 1608. It receives an MPEG-2 section, and enables the referencing of such MPEG-2 section's contents, by the program executed by the CPU 1606.

The procedure for outputting video and audio to a display and a speaker, respectively, is exemplified using the representation in FIG. 20. The broadcast signal inputted to the broadcast receiving apparatus, is first demodulated to an MPEG-2 transport stream by the tuner 2001. Next, the PES packet, transmitted by the TS packet having the PID designated by the CPU 1606, which contains video and audio information is extracted by the PID filter 2002. If necessary, the PES packet is transmitted to the descrambler 2004 and descrambling is carried out. After this, the PES packet is inputted to the AV decoder 2005 where it is decoded, and an AV signal is outputted. After this, the AV signal is inputted to the display and speaker 2006, enabling the reproduction of video and audio data.

The procedure for extracting data, such as program information, from a broadcast signal is exemplified using the representation in FIG. 20. The broadcast signal inputted to the broadcast receiving apparatus, is first demodulated to an MPEG-2 transport stream by the tuner 2001. Next, the MPEG-2 section, transmitted by the TS packet having the PID designated by the CPU 1606, which contains the data is extracted by the PID filter 2002. If necessary, the MPEG-2 section is transmitted to the descrambler 2004 and descrambling is carried out. In addition, the MPEG-2 sections are inputted to the section filter 2003, and only the MPEG-2 section that matches the section filter condition designated by the CPU 1606 is outputted. After this, the MPEG-2 section is inputted to the primary storage unit 2007, and provided to the CPU 1606.

Furthermore, in FIG. 20, as is in FIG. 16, a broadcast receiving apparatus possessing its own display/speaker 2006 is conceptually rendered. However, there are types in which the display/speaker 2006 is not contained within the broadcast receiving apparatus, but found externally, instead. The present invention can be applied for either type. In addition, although in the schematic diagram shown in FIG. 20, the descrambler 2004 is found within the TS decoder 1602, it can also be found outside a TS decoder, depending on the hardware configuration. The present invention can still be applied, even in such a case.

Figure 21:
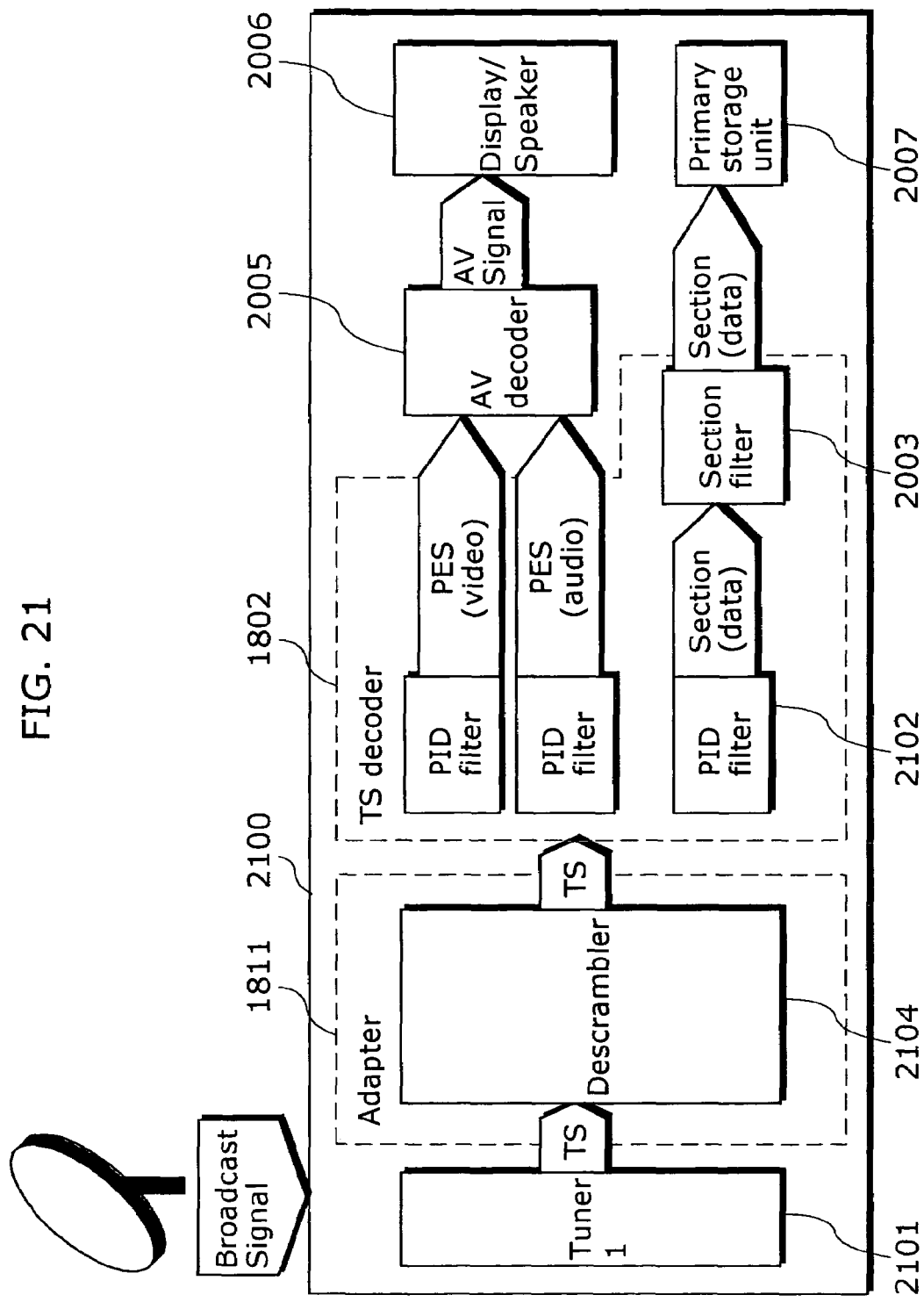
FIG. 21 shows a device connection example of the broadcast receiving apparatus in the present invention.

Next, FIG. 21 shows a schematic diagram corresponding to the hardware configuration where the adapter is physically connected, shown in FIG. 18. 2100 is a terminal apparatus in which a tuner 2101, a PID filter 2102, a section filter 2003, an AV decoder 2005, a display/speaker 2006, and a primary storage unit 2007, exist. In addition, an adaptor 1811 and a descrambler 2104 also exist. As the devices identified with the same numbering as in the case of FIG. 20, possess the same functions as in the case of FIG. 20, their explanation shall be omitted. It is different from the terminal in FIG. 20 as to connection point and function of the descrambler. In FIG. 20, the descrambler is located within the TS decoder 1602, and performs descrambling on the PES packet and the MPEG-2 section outputted by the PID filter 2002, using the descrambling key designated by the CPU 1606. In contrast, in FIG. 21, the descrambler 2104 is connected to the tuner 2101, and receives the MPEG-2 transport stream demodulated by the tuner 2101. The descrambler 2104 extracts the TS packet bearing the PID designated by the CPU 1806, and performs descrambling by extracting, on its own, the key required for descrambling, from within the MPEG-2 transport stream. The MPEG-2 transport stream that was descrambled by the descrambler 2104 is inputted to the TS decoder 1802, and from there, undergoes the same process flow as in FIG. 20. The PID filter 2102 can extract the TS packet from the MPEG-2 transport stream inputted from the descrambler 2104, as well as form the PES packet and MPEG-2 section.

With regard to the hardware configuration having a POD shown in FIG. 19, explanation shall be omitted as the process regarding the transmission of a signal through the In-Band frequency band is the same as in FIG. 21.

Figure 22:
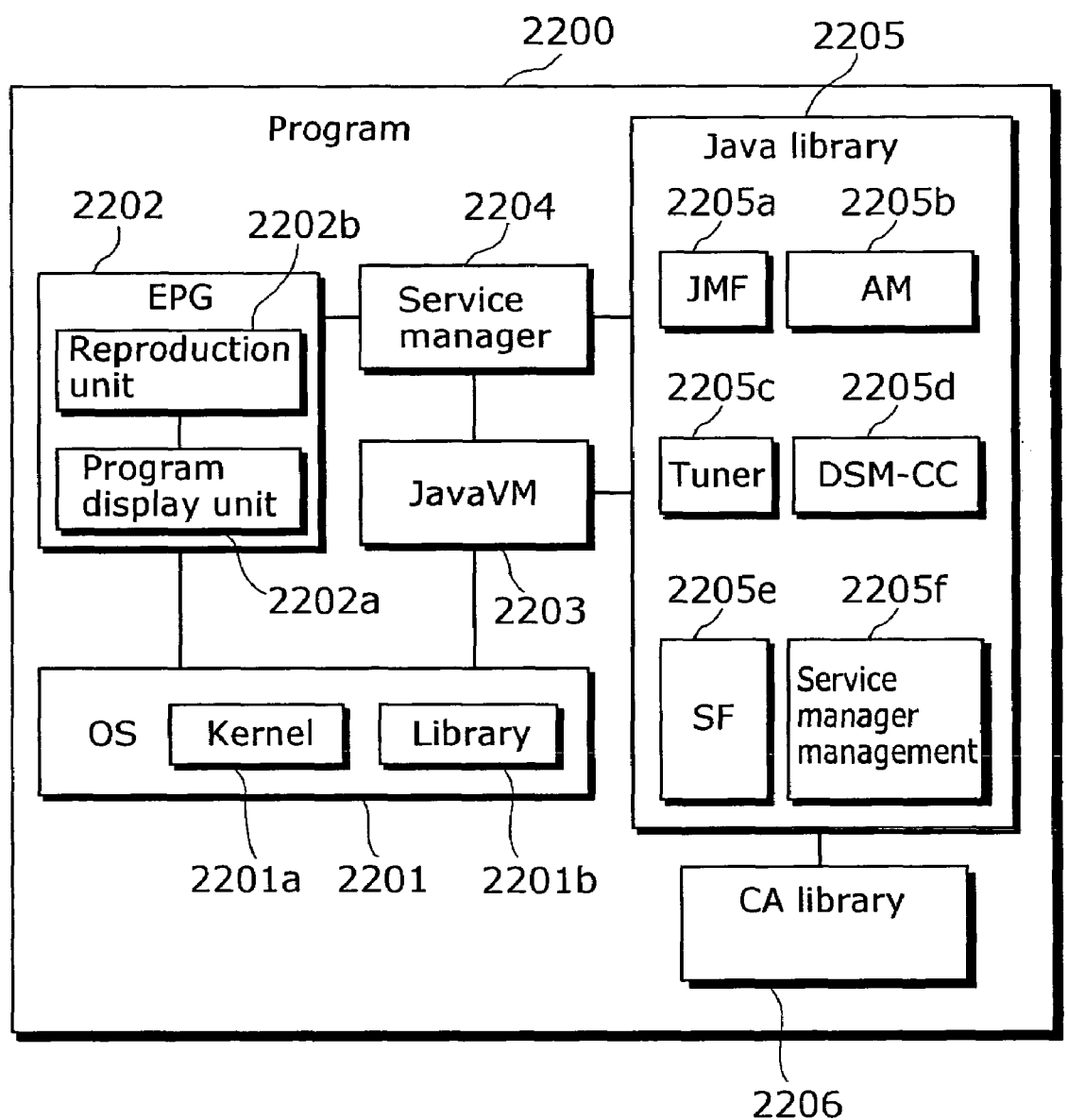
FIG. 22 shows a configuration example of the program configuration stored by the terminal apparatus 1600 in the present invention.

Up to this point, a hardware configuration example regarding the present invention has been described. Hereinafter, program operation procedures on a terminal apparatus shall be explained. FIG. 22 is an example of a configuration diagram of a program stored in the ROM 1609, and executed by the CPU 1606.

A program 2200 is made up of a plurality of subprograms, specifically, an OS 2201, an EPG 2202, a Java VM 2203, a service manager 2204, and a Java library 2205.

The OS 2201 is the subprogram initiated by the CPU 1606 when the power source of the terminal apparatus 1600 is turned on. OS 2201 stands for Operating System, and examples of these are Linux, Windows, and so on. As the OS 2201, made up of a kernel 2201a and a library 2201b that are executed in parallel with other subprograms, is a generic term for publicly known technology, explanation shall be omitted. In the present embodiment, the kernel 2201a of the OS 2201, executes the EPG 2202 and the Java VM 2203 as subprograms. In addition, the library 2201b provides these subprograms with a plurality of functions for controlling the components held by the terminal apparatus 1200.

The tuning function is introduced as an example of a function. The tuning function receives tuning information including frequency from another subprogram, and forwards this to the tuner 1601. The tuner 1601 performs demodulation based on the tuning information provided, and can forward the demodulated MPEG-2 transport stream to the TS decoder 1602. As a result, another subprogram is able to control the tuner 1601 through the library 2201b.

EPG 2202 is made up of a program display unit 2202a for displaying a program list to, and accepting inputs from a user, and a reproduction unit 2202b for performing channel selection. Here, EPG stands for Electric Program Guide. The EPG 2202 is initiated by the kernel 2201a when the power source of the terminal apparatus 1600 is turned on. Within the initiated EPG 2202, the program display unit 2202a awaits inputs from a user, through the input unit 1610 of the terminal apparatus 1600. At this point, in the case where the input unit 1610 is made up of a front panel as shown in FIG. 17, when the EPG button 1707 of the input unit 1610 is pressed, the identifier of the EPG button is relayed to the CPU 1606. The program display unit 2202a of the EPG 2202 which is a subprogram operating on the CPU 1606, receives such identifier and displays program information onto the display 1605. FIG. 23(1) and (2) show an example of a program list displayed on the display 1605. Referring to FIG. 23(1), program information is displayed in a grid pattern, on the display 1605. In a column 2301, time information is displayed. In a column 2302, a channel name "channel 1", and programs to be aired on the time slots corresponding to the time in the column 2301 are displayed. In "channel 1", it is shown that at 9:00 to 10:30, a program "News 9" is to be aired, and at 13:30 to 12:00, "Movie AAA" is to be aired. As in the column 2302, in a column 2303, a channel name "channel 2", and programs to be aired on the time slots corresponding to the time in the column 2301 are displayed. At 9:00 to 11:00, a program "Movie BBB" is to be aired, and at 11:00 to 12:00, "News 11" is to be aired. 2330 is a cursor. The cursor 2330 moves when the left cursor 1703 and the right cursor 1704 of the front panel 1700 are pressed. In the state in FIG. 23(1), when the right cursor 1704 is pressed, the cursor 2330 moves to the right as shown in FIG. 23(2). Furthermore, in the state in FIG. 23(2), when the left cursor 1703 is pressed, the cursor 2330 moves to the left as shown in FIG. 23(1).

In the state in FIG. 23(1), when the OK button 1705 of the front panel 1700 is pressed, the program display unit 2202a relays the identifier for "channel 1" to the reproduction unit 2202b. In the state in FIG. 23(2), when the OK button 1705 of the front panel 1300 is pressed, the program display unit 2202a relays the identifier for "channel 2" to the reproduction unit 2202b.

Furthermore, the program display unit 2202a periodically stores, in advance, program information to be displayed from the broadcast station-side system 101, into the primary storage unit 1608 or the secondary storage unit 1607. In general, obtaining program information from a broadcast station-side system is time consuming. A program list can be displayed rapidly by displaying the program information pre-stored in the primary storage unit 1608 or the secondary storage unit 1607 when the EPG button 1707 of the input unit 1710 is pressed.

Figure 24:
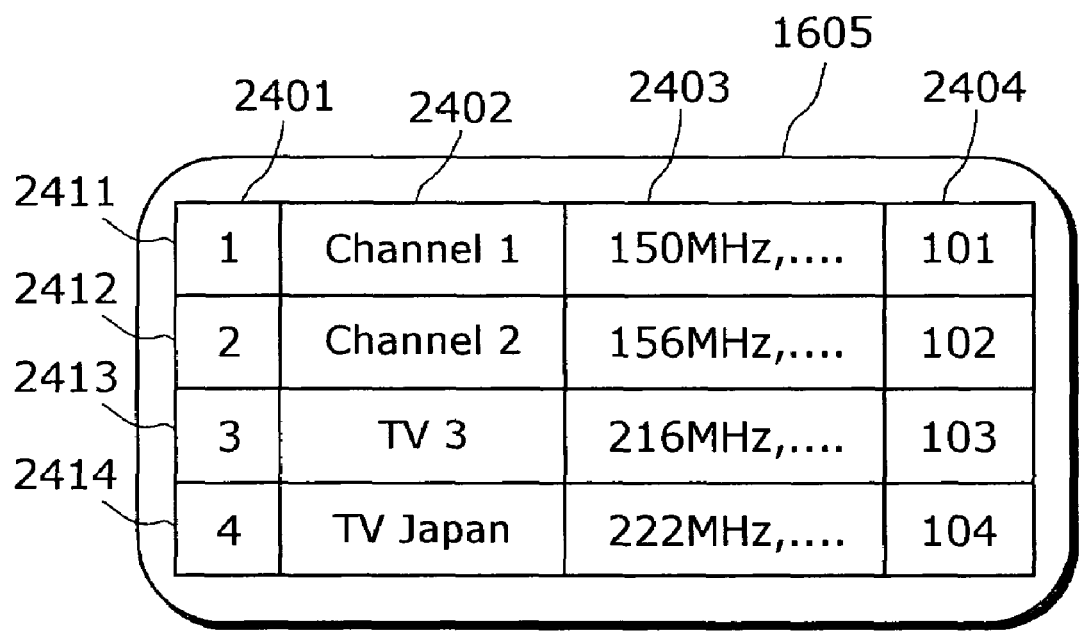
FIG. 24 shows an example of information stored by the secondary storage unit 1607 in the present invention.

The reproduction unit 2202b reproduces a channel using the channel identifier received. The relation between the channel and the identifier is stored, in advance, in the secondary storage unit 1607, as channel information. FIG. 24 is an example of channel information stored in the secondary storage unit 1607. Channel information is stored in tabular-form. A column 2401 shows channel identifiers. A column 2402 shows channel names. A column 2403 shows tuning information. Here, tuning information includes frequency, transmission rate, encoding rate, and so on, which are values provided to the tuner 1601. A column 2404 shows program numbers. Each row in rows 2411 to 2414 forms the set for each channel's identifier, channel name, tuning information, and program number. The row 2411 is the set which includes an identifier "1", a channel name "channel 1", tuning information as the frequency "150 MHz", and a program number "101". In order to reproduce a channel, the reproduction unit 2202b forwards the channel identifier received, as it is, to the service manager.

Figure 25:
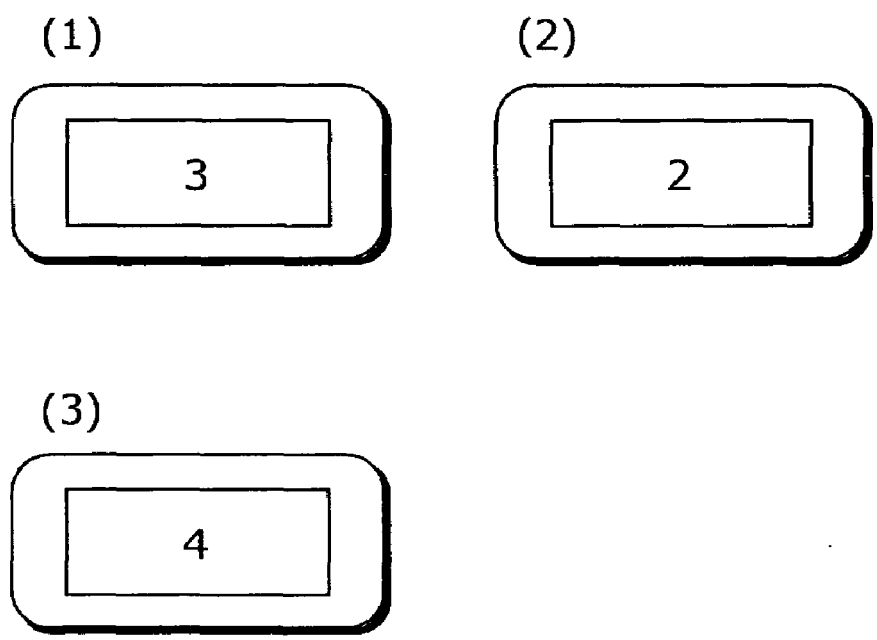
FIG. 25 shows an example of information stored by the primary storage unit 1608 in the present invention.

Furthermore, when a user presses the up cursor 1701 and down cursor 1702 on the front panel 1700 during reproduction, the reproduction unit 2202b receives the pressed notification from the input unit 1610 through the CPU 1606, and switches the channel being reproduced. First, the reproduction unit 2202b stores the identifier of the channel currently being reproduced, into the primary storage unit 1608. FIG. 25(1), (2), and (3), are examples of channel identifiers stored in the primary storage unit 1608. In FIG. 25(1), an identifier "3" is stored, indicating, with reference to FIG. 24, that the channel having a channel name "TV 3" is currently being reproduced. In the state in FIG. 25(1), when a user presses the up cursor 1701, the reproduction unit 2202b refers to the channel information in FIG. 24, and in order to switch the reproduction to the previous channel on the list having the channel name "channel 2", it forwards the identifier "2" of the channel name "channel 2", to the service manager. At the same time, it rewrites "2" as the channel identifier stored in the primary storage unit 1608. FIG. 25(2) shows the state after the channel identifier is rewritten. In addition, in the state in FIG. 25(1), when a user presses the down cursor 1702, the reproduction unit 2202b refers to the channel information in FIG. 24, and in order to switch the reproduction to the next channel on the list having the channel name "TV Japan", it forwards the identifier "4" of the channel name "TV Japan", to the service manager. At the same time, it rewrites "4" as the channel identifier stored in the primary storage unit 1608. FIG. 25(3) shows the state after the channel identifier is overwritten.

The Java VM 2203 is a Java virtual machine for sequentially analyzing and performing a program written in the Java™ language. A program written in the Java language is compiled into an intermediate code, referred to as a bytecode, which is not dependent on hardware. The Java virtual machine is an interpreter for executing such bytecode. In addition, some Java virtual machines forward a bytecode to the CPU 1606 after translating it to an execution format understandable to the CPU 1606, and execution is also carried out. Java VM 2203 is initiated by the designation of a Java program to be executed by kernel 2201a. In the present embodiment, the kernel 2201a designates the service manager as the Java program to execute. The details of the Java language are explained in many publications, such as "Java Language Specification (ISBN 0-201-63451-1)" and so on. Here, such details shall be omitted. In addition, the detailed operation, and so on, of the Java VM itself are explained in many publications, such as "Java Virtual Machine Specification (ISBN 0-201-63451-X)", and so on. Here, such details shall be omitted.

The service manager 2204 is a program written in the Java language, and is sequentially executed by the Java VM 2203. Through a Java Native Interface (JNI), it is possible for the service manager 2204 to call, or be called, by another program that is not written in the Java language. Likewise, with regard to JNI, explanations are provided in many publications, such as "Java Native Interface", and so on. Here, such details shall be omitted.

The service manager 2204 receives a channel identifier from the reproduction unit 2202b, by way of a JNI.

The service manager 2204, first forwards the channel identifier to a tuner 2205c located within the Java library 2205, and requests for tuning. The tuner 2205c refers to the channel information stored in the secondary storage unit 1607, and obtains tuning information. Now, when the service manager 2204 forwards a channel identifier "1" to the tuner 2205c, the tuner 2205c refers to the row 2412 in FIG. 24, and obtains the corresponding tuning information which is "150 MHz". The tuner 2205c forwards the tuning information to the tuner 1601 through the library 2201b of the OS 2201. The tuner 1601 demodulates a signal transmitted from the broadcast station-side system 101 according to the tuning information provided, and forwards this to the TS decoder 1602.

Next, the service manager 2204 makes a request to a CA library 2206 for descrambling. The CA library 2206 provides information required for descrambling to the descrambler 2004 within the TS decoder 1602, through the library 2201b of the OS 2201. Details regarding this shall be discussed later.

Next, the service manager 2204 provides the channel identifier to a JMF 2205a located within the Java library 2205, and requests video and audio reproduction.

First, the JMF 2205a obtains the PID for identifying the video and audio to be reproduced, from a PAT and a PMT. In order to obtain the PAT, the JMF 2205a specifies the PID "0" and the CPU 1606, to the TS decoder 1602, through the library 2201b of the OS 2201. The TS decoder 1602 performs filtering with the PID "0" and the table_id "0", and by forwarding results to the CPU 1606, through the primary storage unit 1608, the JMF 2205a acquires the PAT. At this point, FIG. 12 is provided as an example of a PAT. Now, assuming that "1" is the channel identifier provided to the JMF 2205a, the JMF 2205*a* refers to the row 2412 in FIG. 24 and obtains the corresponding program number "101". Next, it refers to the row 1211 of the PAT in FIG. 12 and obtains the corresponding PID "501" which corresponds with the program number "101". In order to obtain a PMT, the JMF 2205*a* specifies the PID obtained from the PAT and the table_id "2" to the TS decoder 1602, through the library 2201*b* of the OS 2201. At this point, it is assumed that the specified PID is "501". The TS decoder 1602 performs filtering with the PID "501" and the table_id "2", and by forwarding results to the CPU 1606, through the primary storage unit 1608, the JMF 2205*a* acquires the PMT. At this point, FIG. 11 is provided as an example of a PMT. The JMF 2205*a* acquires the PID of the video and audio to be reproduced from the PMT. Referring to FIG. 11, JMF 2205*a* obtains the audio PID "5011" from the row 1111, and the video PID "5012" from the row 1112.

Next, the JMF 2205*a* specifies the obtained video/audio PID, and the AV decoder 1603 as the destination, to the TS decoder 1602, through the library 2201*b* of the OS 2201. The TS decoder 1602 performs filtering based on the PID provided. Here the TS Packets of PID "5011" and "5012" are forwarded to the AV decoder 1603. The AV decoder 1603 decodes the PES packets provided, and reproduces the video/audio through the display 1605 and the speaker 1604.

Finally, the service manager 2204 relays the channel identifier to the AM 2205*b* located within the Java library 2205 and requests data broadcast reproduction. Here, data broadcast reproduction refers to the extraction of a Java program included in an MPEG-2 transport stream, and the execution of such Java program by the Java VM 2203. A format, known as DSMCC, described in the MPEG Specification ISO/IEC 13818-6 is used as the method for embedding a Java program in an MPEG-2 transport stream. Here, the detailed explanation for DSMCC shall be omitted. The DSMCC format prescribes a method for encoding a file system using an MPEG-2 section. Such file system is found within the TS packet of an MPEG-2 transport stream, and is made up of a directory, a file, and so on, to be used in a computer. In addition, the information of the Java program to be executed is the format known as AIT. It is embedded in the TS packet of an MPEG-2 transport stream, and is transmitted as the MPEG-2 section having a table_id of "0×74". The AIT stands for Application Information Table, and is defined in chapter 10 of the DVB-MHP Specification (formally, ETSI TS 101 812 DVB-MHP specification V1.0.2).

In order to obtain the AIT, the AM 2205*b* first obtains the PAT and PMT in the same manner as the JMF 2205*a*, and acquires the PID of the TS packet where the AIT is stored. Now, when the identifier of the channel provided is "1", and the PAT in FIG. 12 and the PMT in FIG. 11 is being transmitted, the PMT in FIG. 11 is obtained, in the same procedure as with the JMF 2205*a*. The AM 2205*b* extracts the PID from the elementary stream having "data" as stream type and "AIT" as supplementary information, from the PMT. Referring to FIG. 11, the elementary stream of row 1113 falls under this description, thus the PID "5013" is acquired.

Figure 26:
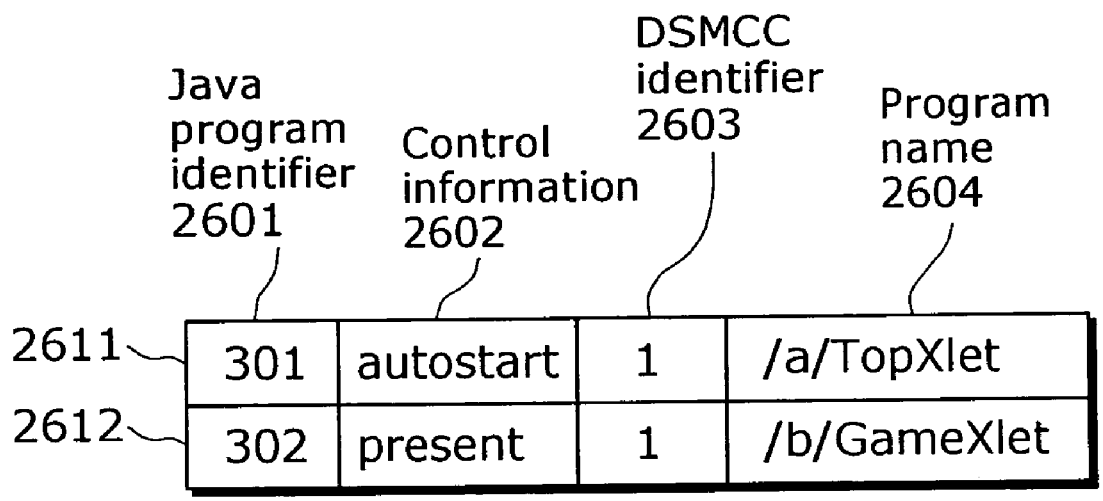
FIG. 26 is a schematic diagram showing the contents of an AIT prescribed in the DVB-MHP specification in the present invention.

The AM 2205*b* provides the PID of the AIT and the table_id "0×74" to the TS decoder 1602, through the library 2201*b* of the OS 2201. The TS decoder 1602 performs filtering with the PID and table_id provided, and forwards the result to the CPU 1606, through the primary storage unit 1608. As a result, the AM 2205*b* is able to acquire the AIT. FIG. 26 is a chart showing, schematically, an example of information of the acquired AIT. A column 2601 shows the Java program identifiers. A column 2602 shows Java program control information. "Autostart", "present", "kill", and so on, are found in the control information. "Autostart" means that the terminal 1600 automatically executes this Java program immediately, "present" means that an automatic execution is not performed, and "Kill" means the termination of a Java program. A column 2603 shows the DSMCC identifiers for extracting the PID which includes the Java program, in the DSMCC format. A column 2604 shows the program names of the Java program. Rows 2611 to 2612 show sets of Java program information. A Java program defined in the row 2611 is the set with an identifier "301", control information "autostart", a DSMCC identifier "1", and a program name "a/TopXlet". A Java program defined by the row 2612 is the set with an identifier "302", control information "present", a DSMCC identifier "1", and a program name "b/GameXlet". Here, two Java programs have the same DSMCC identifier. This indicates that two Java programs are included within a file system encoded in a single DSMCC format. Here, although only four items of information are prescribed for the Java programs, in actuality, more items of information are defined. Refer to the DVB-MHP Specification for details.

The AM 2205*b* finds the Java program of "autostart" within the AIT, and extracts the corresponding DSMCC identifier and program name. Referring to FIG. 26, the AM 2205*b* extracts the Java program of the row 2611, and acquires the DSMCC identifier "1" and the Java program name "a/TopXlet".

Next, the AM 2205*b* acquires the PID of the TS packet storing a file system in a DSMCC format, from the PMT, using the DSMCC identifier obtained from the AIT. To be specific, the PID of an elementary stream within the PMT, with a stream type as "data", and supplementary information of a matching DSMCC identifier, is obtained.

Now, assuming that the DSMCC identifier is "1", and the PMT is the one shown in FIG. 11, the elementary stream of the row 1114 conforms, and a PID "5014" is obtained.

The AM 2205*b* specifies, to the TS decoder 1602, the PID of the TS packet transmitting the MPEG-2 section where data is embedded in the DSMCC format, as well as the section filter condition, through the library 2201*b* of the OS 2201. Here, PID "5014" is provided. The TS decoder 1602 performs filtering with the MPEG-2 section for the DSMCC using the PID provided, and forwards the result to the CPU 1606 through the primary storage unit 1608. As a result, the AM 2205*b* is able to acquire the necessary MPEG-2 section for the DSMCC. The AM 2205*b* restores the file system from the acquired MPEG-2 section, according to the DSMCC format, and stores it in the primary storage unit 1608. The obtainment of data such as a file system from a TS packet within an MPEG-2 transport stream, for storage in a means for storage such as the primary storage unit 1608 and the secondary storage unit 1607 shall be referred to, hereinafter, as a download.

Figure 27:
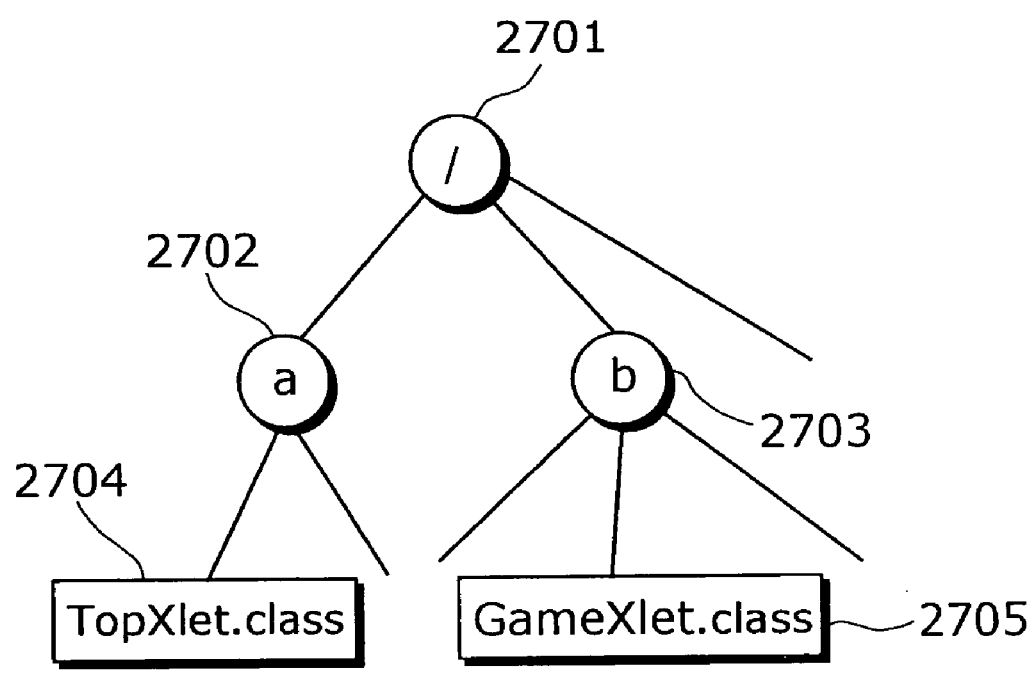
FIG. 27 is a schematic diagram showing a file system transmitted through the DSMCC method, in the present invention.

FIG. 27 shows an example of a downloaded file system. In the illustration, a circle indicates a directory and a square indicates a file. 2701 is a route directory, 2702 is a directory "a", 2703 is a directory "b", 2704 is a file "TopXlet.class", and 2705 is a file "GameXlet.class".

Next, the AM 2205*b* forwards the Java program to be executed from within the file system downloaded in the primary storage unit 1608, to the Java VM 2203. Assuming that "a/TopXlet" is the Java program name to be executed now, the file adding ".class" at the end of the program name, namely "a/TopXlet.class", becomes the file to be executed. "/" is a delimiter for a directory, a file name, and the like, and referring to FIG. 27, the file 2704 is the lava program to be executed. Next, the AM 2205*b* forwards the file 2704 to the Java VM 2203.

Moreover, AIT is not the only method of reference for the Java program to be executed by the AM 2205*b*. In OCAP which is being considered for use in the American cable system, XAIT which lists the reference information of applications in the OOB shown in FIG. 3, is used. Aside from this, other methods such as one where a program recorded, in advance, in the ROM 1609 is initiated, one where a program downloaded and stored in the secondary storage unit 1607 is initiated, and so on, are also assumed.

The Java VM 2203 executes the forwarded Java program.

Through procedures as the one above, the service manager 2204 receives the channel identifier and performs tuning, video/audio reproduction, and Java program launching. This series of procedures is referred to as "selection of service". "Perform selection of a service" can be defined as "the visualizing information carried by an ES belonging to a service for a user". When the selection of a service is carried out, following the above-mentioned procedure, the "video/audio data transmitted by the ES belonging to the ES is reproduced" and the "Java program transmitted by the ES belonging to the ES is launched". The video/audio reproduced by the selection of a service can be described as belonging to such service. In the same manner, the Java program launched by the selection of a service can be described as belonging to such service.

When the service manager 2204 receives the identifier of another channel, it carries out the selection of a service again using the libraries found in the Java library 2205. In the present embodiment, the number of services that can be selected by the service manager 2204 is one.

In general, a channel identifier indicates a single service. In the present embodiment, channel information as that shown in FIG. 24, is used during the obtainment of a program number from a channel identifier. The method which makes use of Service Information (SI) is typical as a method of determining a program number from a channel identifier. SI is program information used for EPG and the like, and is prescribed and transmitted by respective broadcasting environments. As a typical example, DVB-SI, which is prescribed in EN400-368, is being used in the European broadcasting environment. In addition, an SI which is prescribed in ANSI/SCTE65 is being used in the American cable broadcasting environment. In such SIs, an identifier of some kind for identifying a service is already prescribed, and a mechanism for determining a program number from such identifier is already taken into consideration. The channel identifier makes use of an identifier prescribed by such SIs. In such a case, the broadcast receiving apparatus carries out the determination of a program number to be used in the obtainment of a PMT from a channel identifier, using an SI. In such a case, as the present invention is not dependent on the form of such SI, it can be applied regardless of what form of SI is used. The channel information in FIG. 24 can also be obtained using an SI.

The Java library 2205 is the aggregate of the plurality of Java libraries stored in the ROM 1609. In the present embodiment, the Java library 2205 includes the JMF 2205*a*, the AM 2205*b*, the tuner 2205*c*, the DSM-CC 2205*d*, a section filter (SF) 2205*e*, a service manager management library 2205*f*. The Java program implements the functions of the Java program while using these libraries.

Among the libraries included in the Java library 2205, the three types, namely the JMF 2205*a*, the DSM-CC 2205*d*, and the SF 2205*e*, in particular, are libraries for accessing information within an MPEG-2 transport stream. Libraries such as these are referred to as a stream information access library. The JMF 2205*a* is a library having a video/audio reproduction function, the DSM-CC 2205*d* is a library having a function for obtaining a file transmitted within an MPEG-2 transport stream, and the SF 2205*e* is a library for obtaining an MPEG-2 section within an MPEG-2 transport stream. Using these libraries, the Java program is able to access information within the MPEG-2 transport stream. In addition, the stream information access libraries each have one or more execution units, and the Java program can access stream information with each of such execution units. For example, the JMF 2205*d* holds a "player" capable of reproducing video and audio, as an execution unit. The Java program can reproduce video and audio by issuing a reproduction command for the video and audio, to the "player". In addition, in the case of a terminal apparatus capable of outputting a plurality of videos by screen partitioning, a plurality of "players" exists, and by issuing a reproduction command to each, the Java program is also able to display separate videos on the screen. For example, the SF 2205*e* holds a "section filter" as an execution unit. The "section filter" corresponds to the section filter 2003 in FIG. 20, and MPEG-2 sections can be obtained by that unit. In a hardware configuration where the section filter 2003 exists in a plurality, the "section filter" held by the SF 2205*e* also exists in a plurality, and by issuing a section obtainment command to each "section filter", the Java program is able to obtain different MPEG-2 sections simultaneously.

In addition, the Java program is able to carry out the selection of a service through the service manager 2204 by using the service manager management library 2205*f*. To be specific, when the Java program forwards the channel identifier to the service manager management library 2205*f*, the service manager management library 2205*f* forwards the channel identifier received. Subsequently, the selection of a service by the service manager 2204 is carried out in the same manner as the channel selection using the EPG 2202, and the video/audio belonging to such service is reproduced and the Java program belonging to such program is launched, based on the information described in the PMT identified by the program number corresponding to the channel identifier. Furthermore, like the stream information access libraries, the service manager 2204 also has one or more execution units. In the case of the service manager 2204, the execution unit is referred to as "service context", and a selection of a service is carried out with each "service context" execution unit. For one "service context", a single service can be selected. In the case where the service manager 2204 can simultaneously select a plurality of services, there are the same number of "service context" execution units held as such plurality. The EPG 2202 and the service manager management library 2205*f* issue a service selection command to a "service context" execution unit, and the service manager 2204 sets information regarding the newly selected service, to the designated "service context" execution unit.

The Java program can designate a service or an ES to a stream information access library as the access unit for information. In the case where a service is designated, this means that the Java program accesses the information transmitted by all the ESs described in the PMT corresponding to the service. In the case where an ES is designated, this means that the Java program accesses the information transmitted by the designated ES. The use of either designation depends upon the type of the library. Moreover, although the method for designating a service to a library is wide-ranging, a method using a channel identifier is typical. In addition, although the method for designating an ES to a library is wide-ranging, a method using a PID is typical. As the present invention is not dependent on such designation form, it can be applied regardless of what the designation form is.

For example, the Java program can designate a service to the JMF 2205*a*. In this case, the JMF 2205*a* can start reproduction by obtaining the PID of the ES transmitting the video/audio data from the PMT of the designated service.

For example, the Java program can designate an ES to the SF 2205e. In this case, the SF 2205e can obtain the MPEG-2 section transmitted by the designated ES in the binary form, as it is. In addition, an ES can also be designated to the JMF 2205a. In this case, the JMF 2205a reproduces the video and audio found inside a PES packet transmitted by the designated ES.

In this manner, the Java program is able to access information within a broadcast signal by using the libraries existing inside the Java library 2205. However, if the object to be accessed is scrambled, information cannot be obtained without performing descrambling. For that reason, it is necessary for the broadcast receiving apparatus to provide the Java program with a means for descrambling.

In the present embodiment, in the case where the service manager 2204 selects a new service in accordance to "the channel selection by a user, using the EPG 2202" or "the use of the service manager management library 2205f by the Java program", the broadcast receiving apparatus implicitly starts the descrambling of the ES within the service. To be specific, it starts descrambling upon the conclusion of the tuning by the service manager 2204, with all the ESs belonging to the PMT obtained by the service manager 2204 being the objects for descrambling. Furthermore, in the present embodiment, the number of services that can be simultaneously selected by the service manager 2204 is one. In other words, the service manager 2204 holds one "service context" execution unit at all times. In the same manner, only one service can be descrambled simultaneously, and the descrambling of two or more services is not possible.

Figure 28:
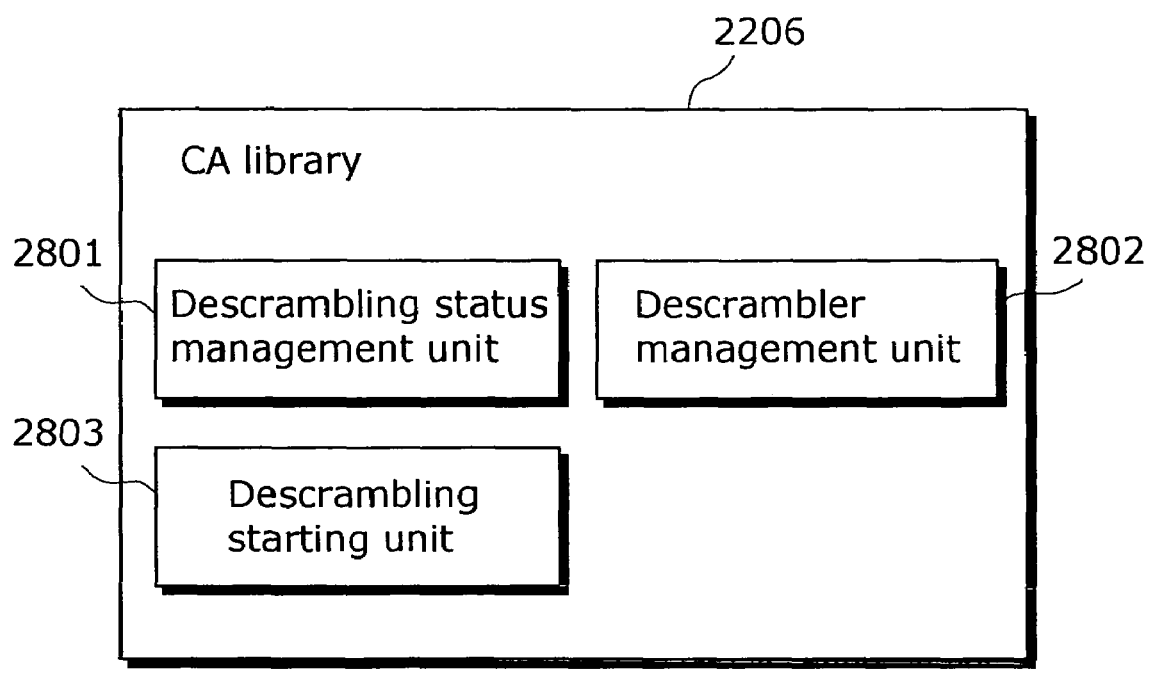
FIG. 28 shows the internal configuration of a CA library in the present invention.

In the present embodiment, a descrambling status management unit, a descrambler management unit, and a descrambling starting unit, are introduced in order to implement the abovementioned points. FIG. 28 shows a schematic diagram for this. A descrambling status management unit 2801, a descrambler management unit 2802, and a descrambling starting unit 2803, are introduced inside the CA library 2206.

The descrambling status management unit 2801 holds the target information which is being descrambled. The descrambling status management unit 2801 is implemented in the primary storage unit 1608. The descrambling status management unit 2801 has a function for holding only one program number of a service which is being descrambled by the descrambler. The program number held is referred to by the descrambling starting unit 2803.

The descrambler management unit 2802 manages the use status of descramblers existing in terms of hardware. One of either two states, namely "not in use" or "in use", is taken as the use status of a descrambler. FIG. 29 shows an example of an implementation of the descrambler management unit 2802. The rows 2911 to 2914 show information of respective descramblers. The column 2901 shows the descrambler name, and the column 2902 indicates the use status. The number of descramblers that are being used and the number of the descramblers that are not in use can be obtained by inquiring to the descrambler management unit 2802. As in FIG. 16, in the case where the descrambler exists within the terminal apparatus 1600, the descrambler management unit 2802 is implemented in the primary storage unit 1608 and is referred to by the descrambling starting unit 2803. In addition, even otherwise, it is also possible to have an implementation where during the actual inquiry regarding the status of the descramblers, the status of the descramblers is checked at that point and the use status is returned. In the case where the descrambler is not found within the terminal apparatus 1800 but exists inside the adapter 1811, as in FIG. 18, implementation is carried out in the primary memory unit inside the adapter 1811, and the descrambler use status is returned for the inquiry by the CPU 1806.

Figure 30:
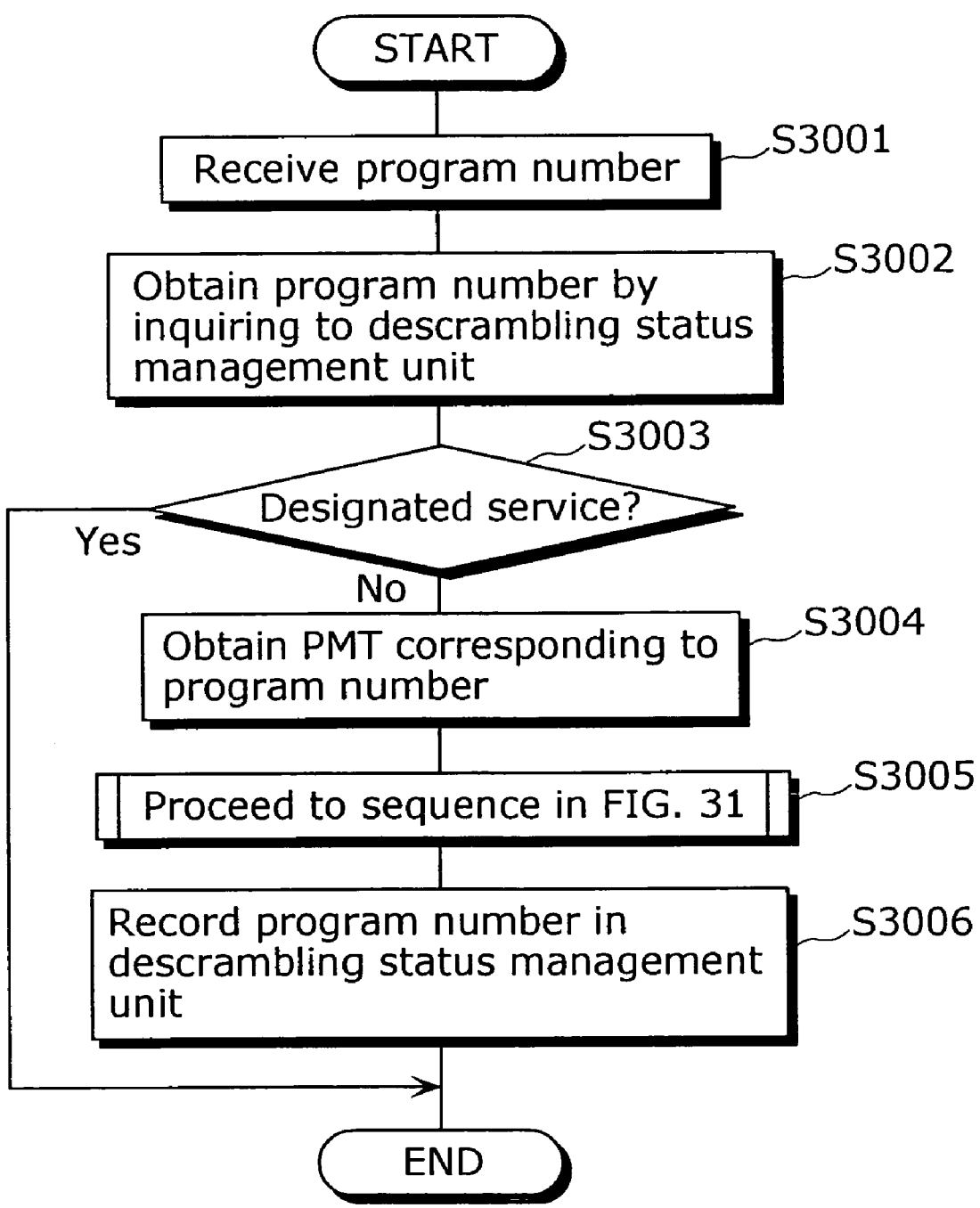
FIG. 30 shows a sequence in the first embodiment for the descrambling starting unit in the present invention.
Figure 31:
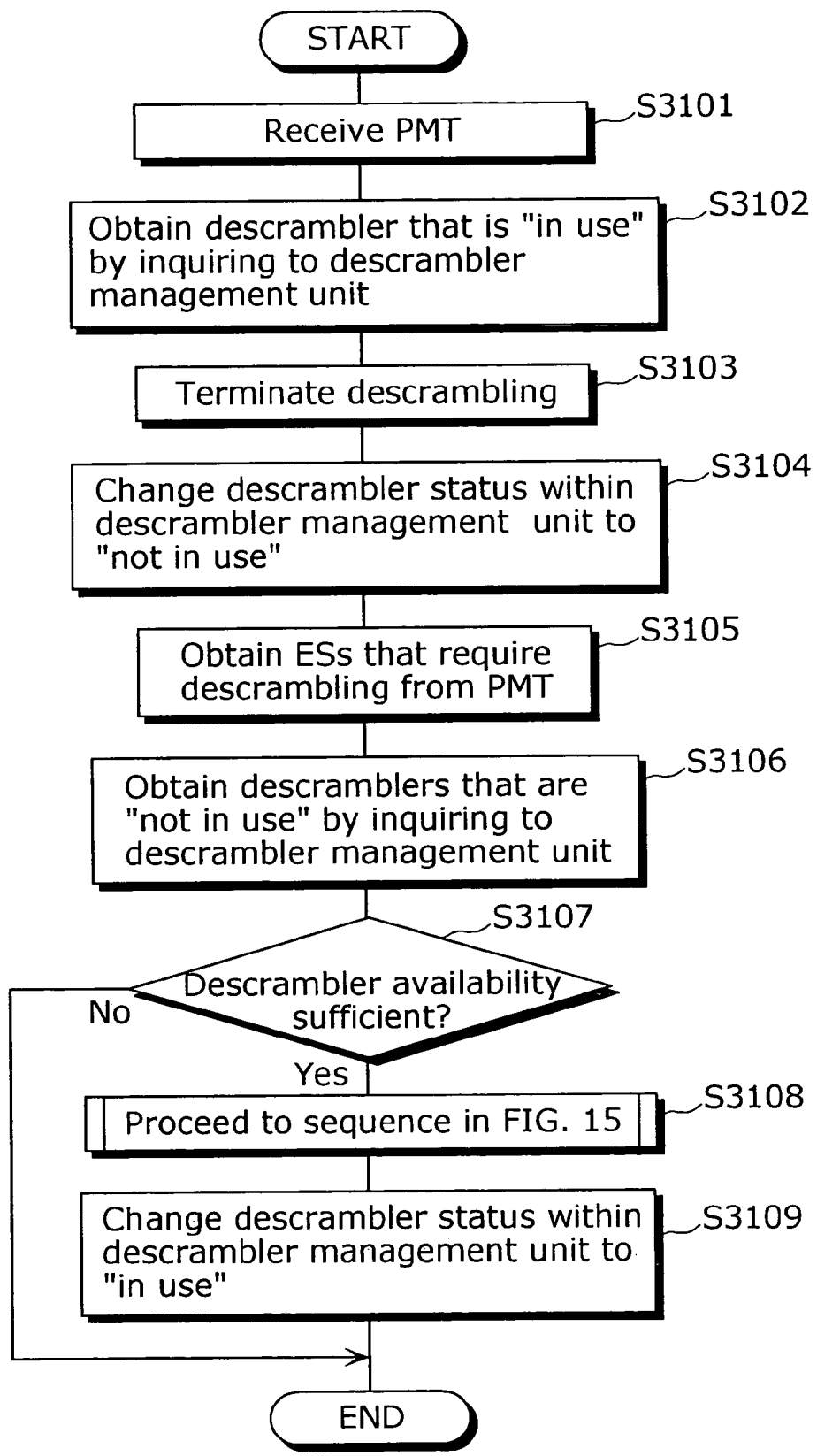
FIG. 31 shows a sequence in the first embodiment for the descrambling starting unit in the present invention.

The descrambling starting unit 2803 is implemented as a library for starting a descrambling. The descrambling starting unit 2803 in the present embodiment possesses the function for starting the descrambling of a service identified by a designated program number. In the case where the service for which descrambling is to be started is already descrambled, nothing is done. In the case where another service is being descrambled, such descrambling is halted, and a new descrambling for the designated service is started. FIG. 30 and FIG. 31 show the operating sequence for the descrambling starting unit 2803. When the descrambling starting unit 2803 receives a program number (S3001), first it obtains the program number of the service being descrambled at that point by inquiring to the descrambling status management unit 2801 (S3002). It compares the program number received in S3001 to the program number obtained in S3002 and judges whether or not the service which is already being descrambled is the program designated in S3001 (S3003). If the service identified by the program number designated in S3001 is already being descrambled, the sequence concludes. If another service is being descrambled, or descrambling, per se, is not being carried out, the PMT identified by the program number acquired in S3001 is obtained (S3004), and the sequence proceeds to that in FIG. 31 (S3005). In FIG. 31, first the PMT is received (S3101) and the descrambling of the other service being carried out at that point is terminated (S3102 to S3104). Next, ESs requiring descrambling are obtained from the PMT (S3105) and descramblers with a status of "not in use" are obtained from the descrambler management unit 2802 (S3106). If there are enough scramblers to descramble all the ESs obtained in S3105 (S3107), the descrambling is started by carrying out the processes regarding the EMM and ECM through the sequence in FIG. 15 (S3108). The status within the descrambler management unit 2801, with regard to the descramblers used in the present descrambling, is changed to "in use" (S3109). Returning to the sequence in FIG. 30, the program number is recorded in the descrambling status management unit 2801 and the process is concluded (S3006).

Figure 33:
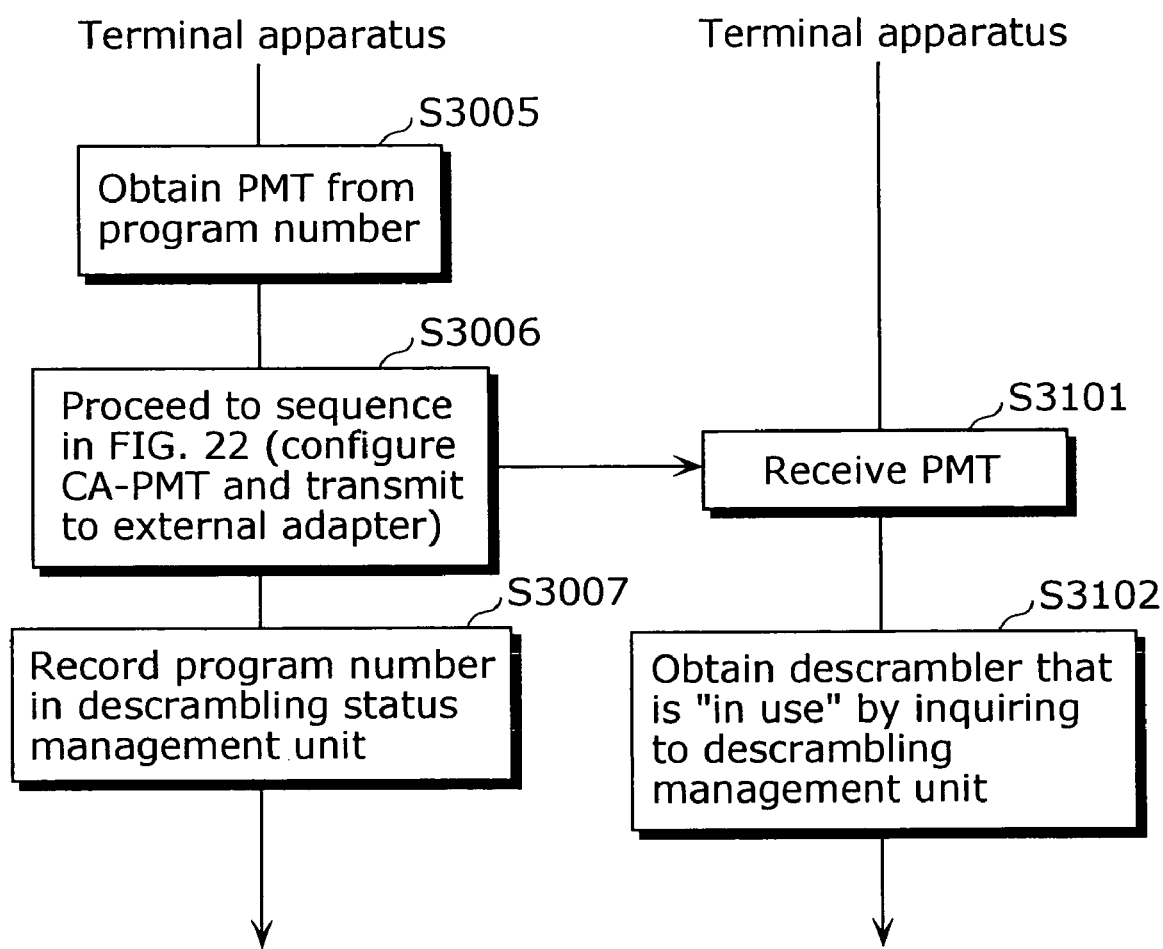
FIG. 33 shows a sequence example in the case where a part of a sequence for the descrambling starting unit in the present invention is executed by an external adapter.

As in the hardware configuration example in FIG. 16, in the case where the descrambler is located inside the terminal apparatus 1600, the descrambling starting unit 2803 is stored as a library in the ROM 1609, and is executed by the CPU 1606. As in the hardware configuration example in FIG. 18, in the case where the descrambler is located outside the terminal apparatus 1800, the function is partitioned and recorded in the ROM 1609 and in the ROM within the external adapter 1811. With regard to the sequence shown in FIG. 30, it is stored as a library in the ROM 1609 within the terminal apparatus, and is executed by the CPU 1806. In that case, in S3004, the CA-PMT is configured from the obtained PMT and transmitted to the external adapter 1811. The program carrying out the sequence in FIG. 31 is recorded in a ROM of the external adapter 1811 such as a DVB-CI, POD, or the like, and in S3006 in FIG. 30, when the terminal apparatus 1800 transmits the CA-PMT to the CPU within the external adapter 1811, it is launched by the CPU within the external adapter 1811. In addition, although the descrambling starting unit 2803 is represented as performing operations in synchronous sequences in FIG. 30 and FIG. 31, the processes after the transmission of the CA-PMT to the external adapter 1811 by the terminal apparatus 1800 in S3006 in FIG. 30, can also be carried out in parallel by the CPU 1806 as well as the CPU within the external adapter 1811. To be specific, when the CPU 1806 forwards the CA-PMT to the external adapter 1811 in S3005, the CPU within the external adapter 1811 starts with the sequence shown in FIG. 31. In parallel with that, the CPU 1806 carries out the operation indicated in S3006, and it is possible to have an implementation where the sequence in FIG. 30 concludes prior to the sequence in FIG. 31. FIG. 33 shows a simple diagram explaining this condition. When the terminal apparatus 1800 forwards the CA-PMT to the external adapter 1811 in S3004, the terminal apparatus 1800 proceeds with the process in S3006 without waiting for the conclusion of the sequence in FIG. 31 taking place within the external adapter 1811. There are instances where implementations such as this are carried out.

In the present embodiment, when the reproduction of video/audio as well as the launching of a Java program are to be started due to the launching of the service manager 2204 through the usage of the service manager management library 2205*f* by the Java program and the forwarding of a channel identifier from the EPG 2202, descrambling is carried out using the descrambling starting unit 2803 prior to these operations.

Figure 32:
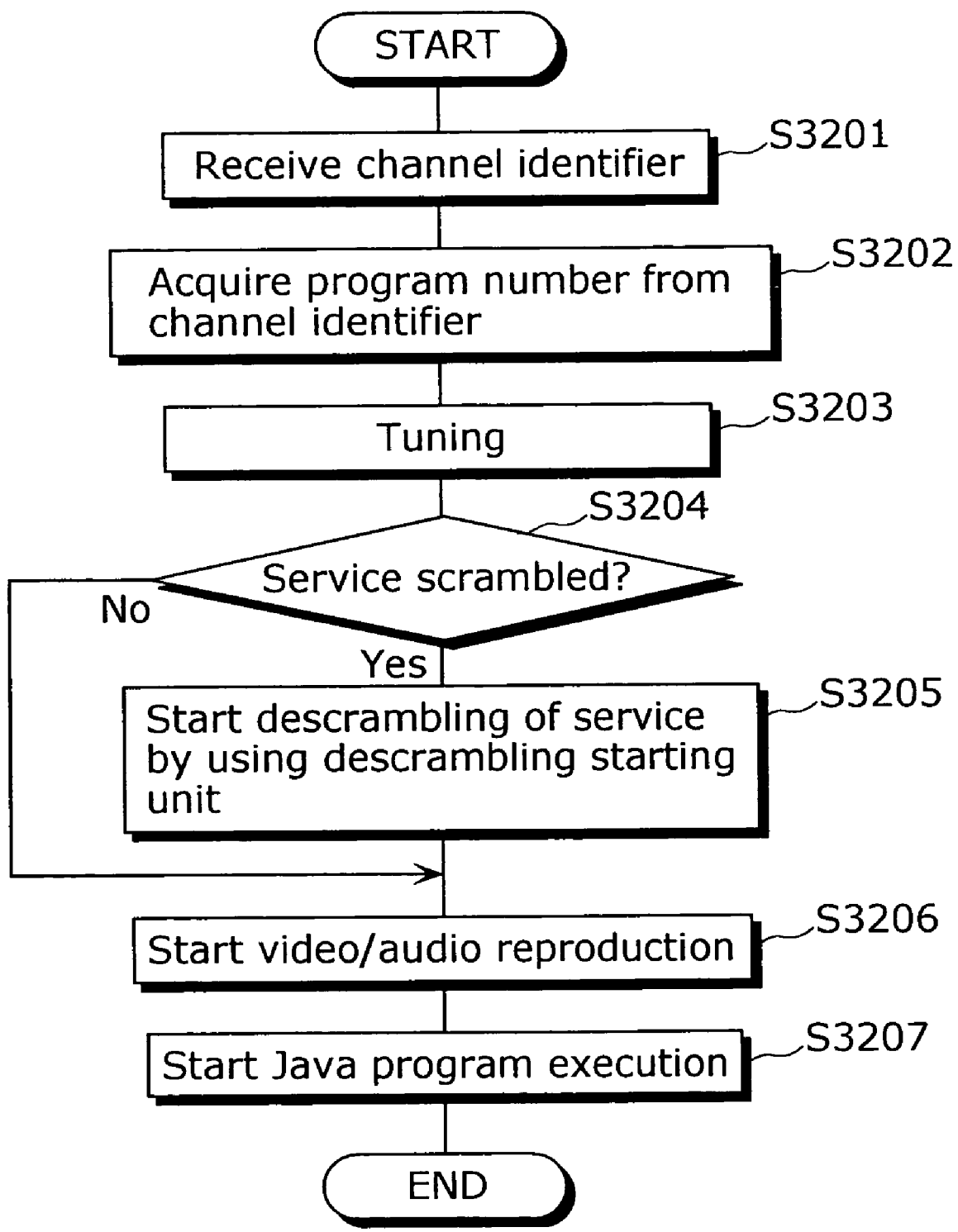
FIG. 32 shows a sequence in the first embodiment for the service manager in the present invention.

In the present embodiment, descrambling is started upon the service selection by the service manager 2204. FIG. 32 shows this sequence. Upon receiving the channel identifier (S3201), the service manager 2204 first obtains the program number from the channel identifier (S3202). At this point, the channel identifier is converted to a program number using channel information structured from an SI such as the one in FIG. 24, as previously discussed. Next, tuning is carried out using the tuner 2205*c* (S3203). Subsequently, judgment is made as to whether or not the service is scrambled (3204), and if it is scrambled, descrambling of the service is started using the descrambling starting unit 2803 (S3205). The judgment in S3204 of whether or not the service is scrambled, is carried out based on the criterion that, it is scrambled when the CA is described in the PMT of the service, and not scrambled when not described. Subsequently, the video/audio reproduction (S3206) and the execution of the Java program (S3207) are carried out. Moreover, there are instances where S3206 and S3207 are carried out in parallel. Furthermore, in the present embodiment, as the descrambling starting unit 2803 itself, does not judge whether or not the designated service is scrambled, such judgment is performed by the service manager 2204. However, it is possible to carry out a judgment with the descrambling starting unit 2803 itself, performing such judgment and where descrambling is not performed if a result of not scrambled is shown. The side using the descrambling starting unit 2803 need not be concerned as to whether the information designated to the descrambling starting unit 2803 is descrambled or not, and the present invention can be applied even in such a case.

In the present embodiment, although descrambling is started upon the service selection by the service manager 2204, descrambling is not started in the case where a stream information access library is used by the Java program. As such, when the information for descrambling belongs to the service selected by the service manager 2204, access is possible without having to descramble again as descrambling is already being performed upon the operation of the Java program. For example, in the case where the service represented by the PMT shown in FIG. 11 is selected, the four ESs indicated by the rows 1111 to 1114 are implicitly descrambled upon the service selection by the service manager 2204. As such, there is no need to descramble again in the case where the Java program launched based on the file included in ES 1114, for example, accesses the PES packet transmitting the video indicated by the row 1111, using the JMF 2205*a*. However, if the object for accessing belongs to another service, the Java program cannot access such target and readout information properly as the implicit descrambling by the stream information access library is not started.

Figures 34, 35:
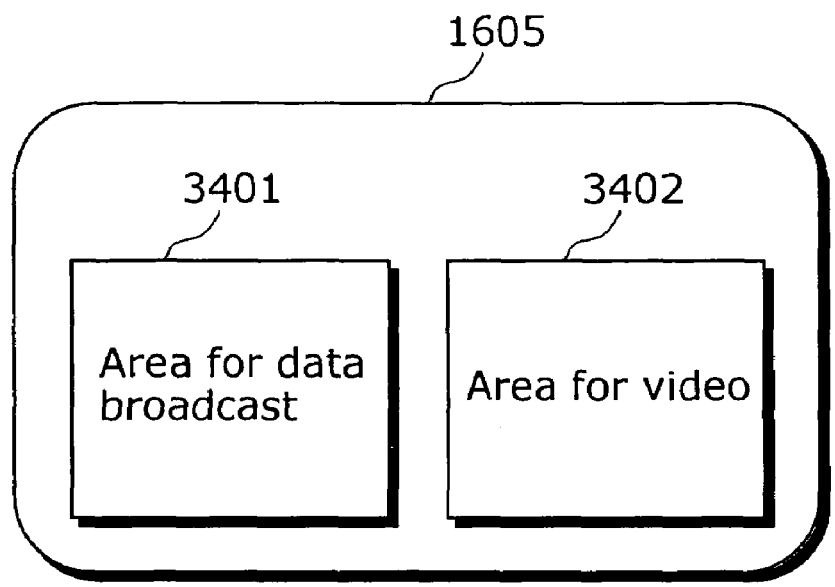
FIG. 34 shows an example of a screen display of a Java program exemplified in the first embodiment.
FIG. 35 shows an example of a PMT of a service to which a Java program exemplified in the first embodiment belongs.

FIG. 34 shows an example of a Java program that can be implemented according to the present embodiment. Furthermore, FIG. 35 shows an example of the PMT for that time. The Java program displays data for data broadcasting onto 3401 and video onto 3402, in the display 1605. This Java program is included in the ES indicated by the row 3514 of the PMT in FIG. 35 and is launched when the service manager 2204 selects the service represented by such PMT. During such service selection, the descrambling of all the ESs included in the PMT is started. The Java program uses the JMF 2205*a* to display the video transmitted by the TS packet having a PID of 5022, onto 3402. In addition, the Java program uses the SF 2205*a* to obtain the data for data broadcasting transmitted by the TS packet having a PID of 5025, and displays it onto 3401. In this manner, the Java program can access information without concern for descrambling as long as this regards ESs included in the service to which it belongs.

According to the present embodiment, the Java program can access information without concern for whether or not it is scrambled, if it is information transmitted by ESs included in the service to which the Java program belongs.

Moreover, although in the present embodiment, the JMF 2205*a*, the DSM-CC 2205*d*, and the SF 2205*e* are provided as stream information access libraries, the stream information access libraries include all libraries that are for accessing information transmitted by an MPEG-2 transport stream. These are not limited to the three types mentioned above, and in addition, do not have to include all of the abovementioned three types. Such types are determined based on the specification of program execution environments such as DVB-MHP, OCAP, or the like.

Furthermore, in the present embodiment, the deletion of the ROM 1609 can be carried out by storing the contents stored in the ROM 1609 in the secondary storage unit 1607. In addition, the secondary storage unit 1607 is made up of a plurality of sub-secondary storage units, and the storage of different information in individual sub-secondary storage units can be carried out. For example, it is possible to have detailed partitions such as storing only tuning information in one sub-secondary storage unit, storing the library 2201*b* of the OS 2201 in another sub-secondary storage unit, and storing the downloaded Java program in yet another sub-secondary storage unit, and so on.

Furthermore, although in the present embodiment the downloaded Java program is stored in the secondary storage unit 1607, storage in the primary storage unit 1608 can also be carried out. In the case of storage in the primary storage unit 1608, all information stored shall be lost upon the turning OFF of the power source.

Furthermore, although in the present embodiment FIG. 16 is assumed as the reference hardware configuration example for the unspecified segments, naturally the present invention can be applied even in a hardware configuration using an adapter as that in FIG. 18. In such case, the explanation for FIG. 18 is assumed by using a representation where identification numbers are interchanged for the same device having different identification numbers for FIG. 16 and FIG. 18. For example, the CPU 1606 is interpreted as the CPU 1806. It is the same for FIG. 20 and FIG. 21. Although FIG. 20 is used as the basic reference hardware configuration, naturally the present invention can be applied even for FIG. 21.

Second Embodiment

Figure 36:
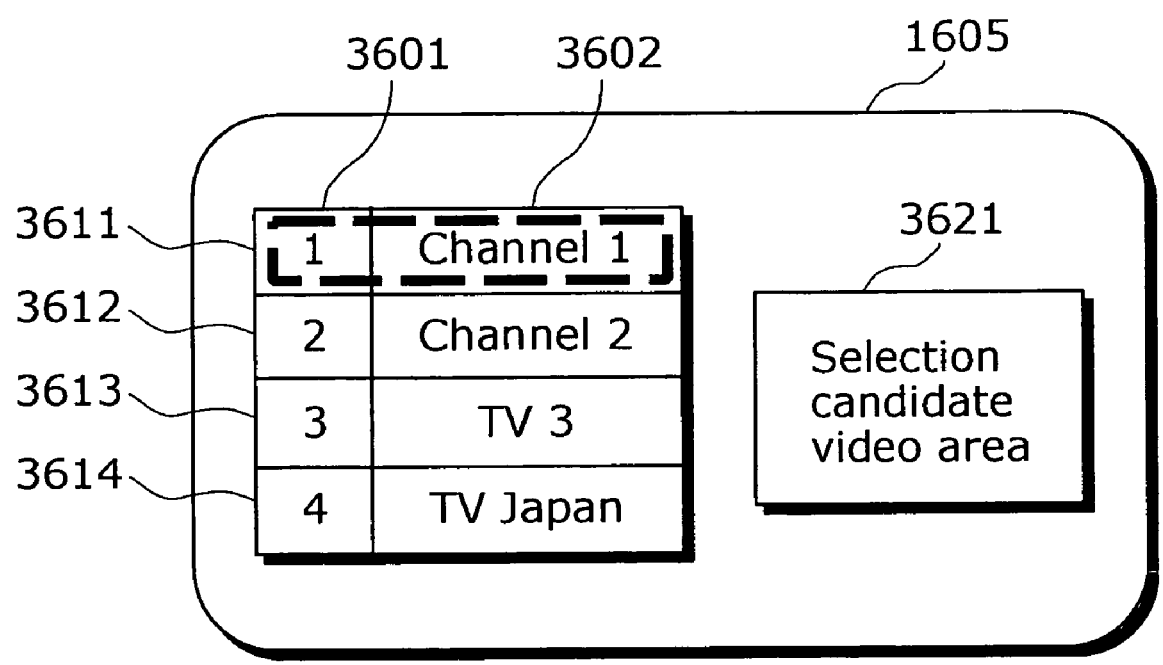
FIG. 36 shows an example of a screen display of a Java program exemplified in the second embodiment.

In the first embodiment, descrambling is started on a per service basis during the selection of a service by the service manager 2204. In such a case, the Java program cannot access scrambled information belonging to services apart from the service to which it belongs. However, there are instances where the reproduction of video/audio belonging to services other than the service to which it belongs to is desired. For example, in the case where a Java program for realizing an EPG is present, the EPG generally has a function for reproducing the video/audio currently selected by a user onto one segment of the screen. However, in the first embodiment, such an EPG cannot be realized as it is not possible to access scrambled information not belonging to the service it belongs to. FIG. 36 shows an example of a screen display of a Java program for realizing such EPG, as an example. A program list is displayed on the left half of the display 1605. Rows 3611 to 3614 show channels of selection candidates. A column 3601 shows channel identifiers, and a column 3602 shows channel names. In addition, the video of the channel in the program list on which the cursor is placed is displayed on 3621. In the case of FIG. 36, as the cursor is placed on channel 1, the video of channel 1 is displayed on 3621. At this time, each video and audio of the four channels shown in the rows 3611 to 3614 are normally transmitted by individual services. In the first embodiment, an EPG such as this cannot be realized as the Java program only performs descrambling with regard to the service it belongs to.

In the second embodiment, although there is no difference with the first embodiment in terms of the implicit descrambling on a per service basis by the broadcast receiving apparatus, the timing for the start of descrambling is changed. Descrambling is not started upon the performance of a service selection by the service manager 2204, and the services to be performed of descrambling are changed every time the Java program uses a stream information access library. To be specific, for example, in the case where a service is designated to the JMF 2205a, the JMF 2205a performs descrambling on the information transmitted by the ES described in the PMT of the designated service using the descrambling starting unit 2803, before reproducing the video/audio. In addition, even for stream information access libraries, like the SF2205e, to which the designation of an ES is possible, descrambling is carried out on all the ESs within the service to which such ES belongs. At that time, first all the PMTs within the MPEG-2 transport stream is checked, and the one which includes the PID of the designated ES is used.

Figure 37:
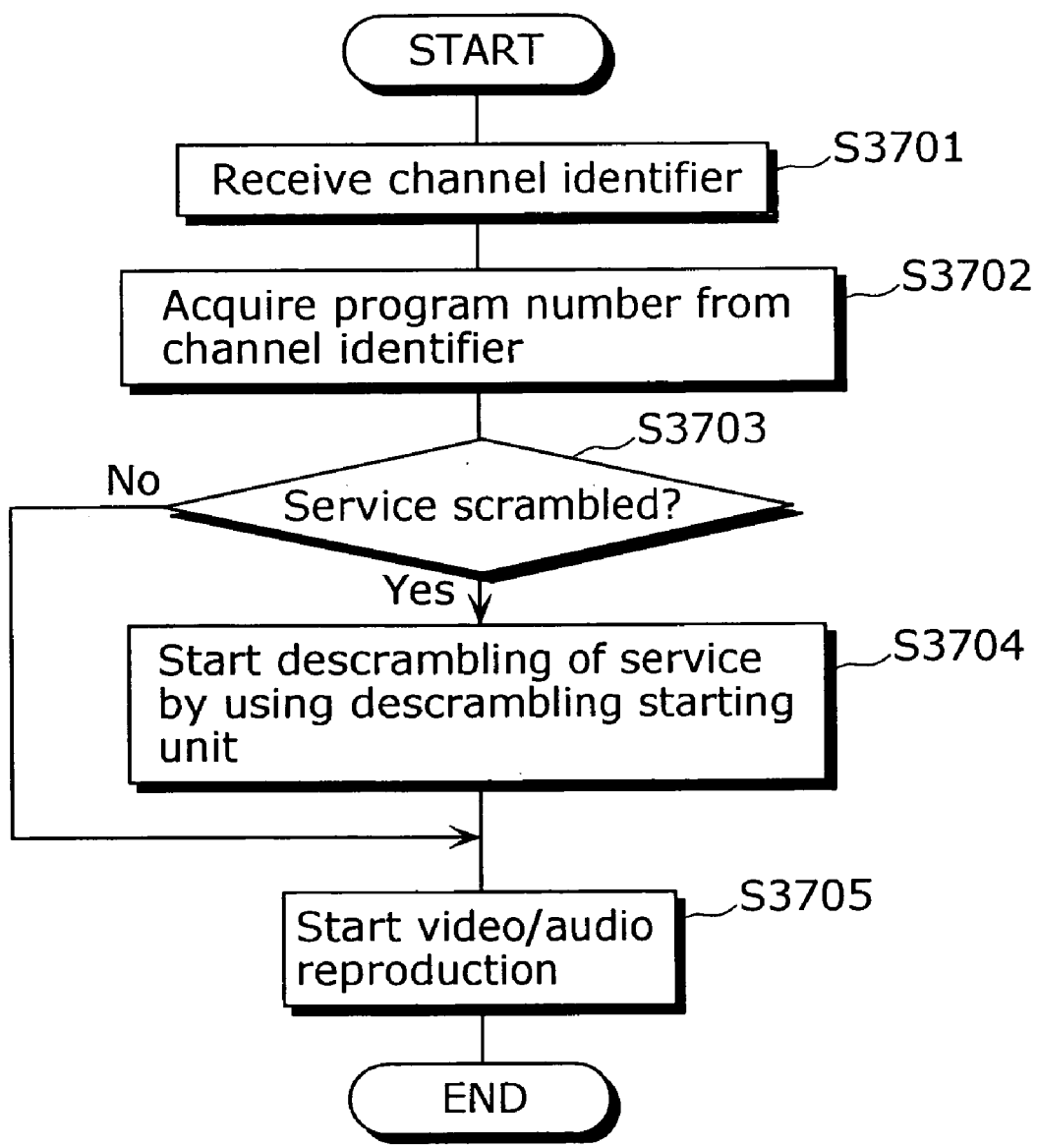
FIG. 37 shows an example of a stream information access library exemplified in the second embodiment.

FIG. 37 shows an operating sequence for the JMF 2205a as an example of a stream information access library to which a service is designated. When a channel identifier is received (S3701), a program number is obtained from the channel identifier (S3702). As discussed earlier, the means for obtaining the program number is different depending on the object to be used as a channel identifier. As examples, a method using the PAT order and one which uses an SI exist. If the service is scrambled (S3703), the descrambling of the service is started using the descrambling starting unit 2803 (S3704). Subsequently, the reproduction of the video/audio is started (S3705).

Figure 38:
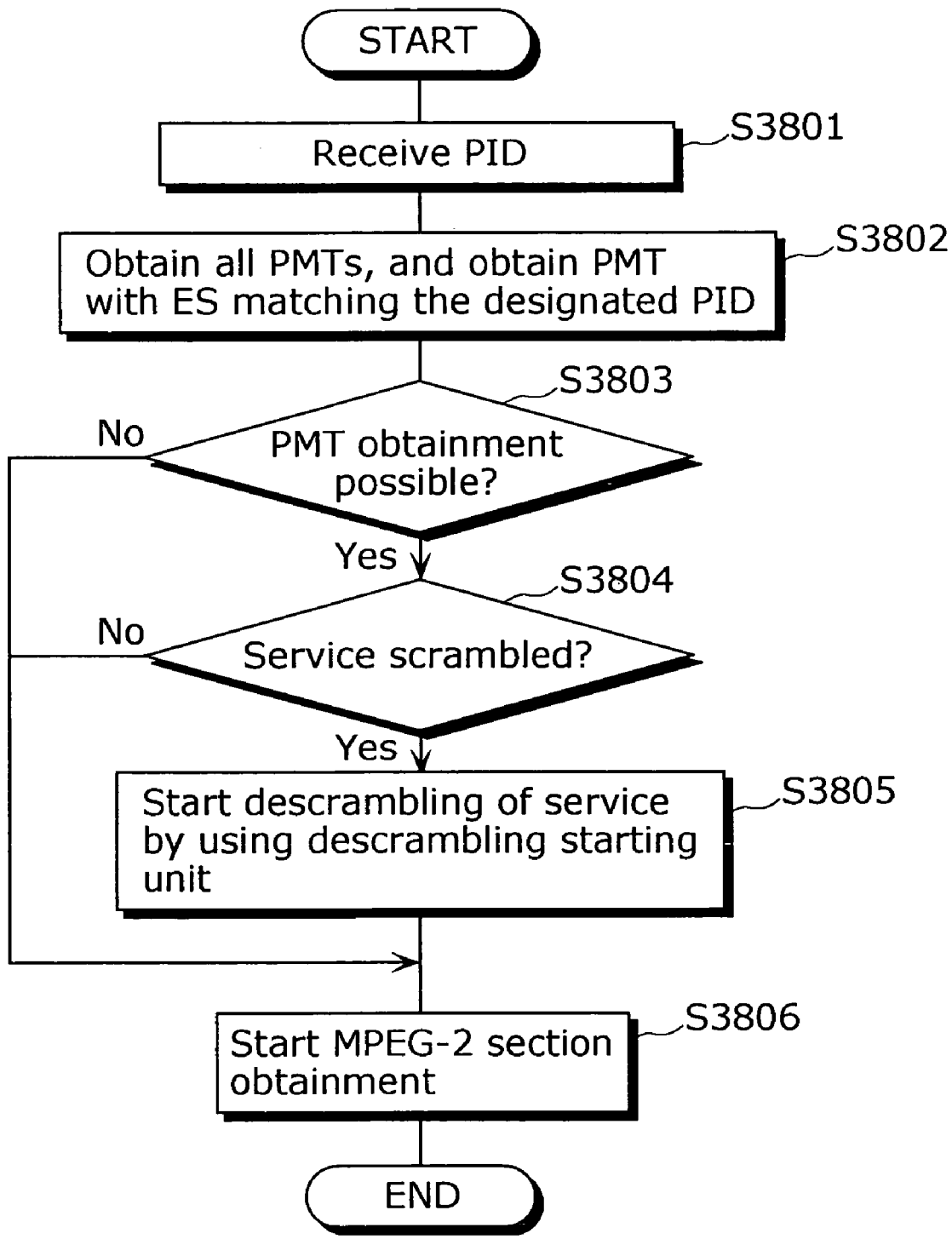
FIG. 38 shows an example of a stream information access library exemplified in the second embodiment.

FIG. 38 shows an operating sequence for the SF 2205e as an example of a stream information access library to which an ES is designated. When a PID is received (S3801), all the PMTs existing within the MPEG-2 transport stream are obtained, and from among these, a search is made for the one which includes the designated PID (S3802). If not found, there is no need to carry out descrambling as the TS packet identifying the designated PID is not scrambled. If found (S3803), judgment is then made as to whether or not the service including such PID is scrambled (S3804), and descrambling is started using the descrambling starting unit 2803 (S3805). Subsequently, the obtainment of the MPEG-2 section is started.

In the present embodiment, during the carrying out of a service selection by the service manager 2204, descrambling is first started at that point as the JMF 2205a, DSM-CC 2205d, or the like, are to be used. When the Java program launched by such service selection uses a stream information access library, the descrambling up to that point is terminated and descrambling is started for "the service designated to the stream information access library" or "the service including the ES designated to the stream information access library".

An example of a Java program for realizing the EPG shown in FIG. 36 is indicated. First, the selection of a service by the service manager, based on the channel selection by a user taking place in the EPG 2202 of the broadcast receiving apparatus itself, is carried out. In this case, it is assumed that the Java program for realizing the EPG is included in the "channel 1" indicated by the row 2411 in FIG. 24 and that the user has selected the "channel 1". Now, the service manager 2204 carries out the service selection by obtaining the program number based on the channel identifier "1" of the "channel 1", and then descrambling is started. The video and audio are reproduced and the Java program for realizing the EPG in FIG. 36 is launched. This Java program displays a screen like that in FIG. 36, on the display. At this time, the channel on which the cursor is placed by default is the "channel 1" to which the Java program belongs, and which is already being descrambled. The Java program displays the video belonging to the "channel 1" in 3621 using the JMF 2205a. From here, when the user moves the cursor up or down, the video of the service corresponding to the channel identifier of the channel on which the cursor is placed is displayed on 3621 using the JMF 2205a. At this point, every time the JMF 2205a is used, the descrambling being performed up to that time is terminated and the descrambling for a new service is started. In this manner, the Java program is able to realize an EPG as that in FIG. 36 without particular concern to descrambling.

In the present embodiment, implicit descrambling can be carried out on the scrambled information to be used by the Java program that is accessed most recently.

Moreover, although in the present embodiment the service manager 2204 does not perform descrambling and implicit descrambling is performed by the stream information access libraries, the present invention can be applied even when a format is taken in which implicit descrambling is also carried out at the time of service selection by the service manager 2204.

Third Embodiment

Figure 39:
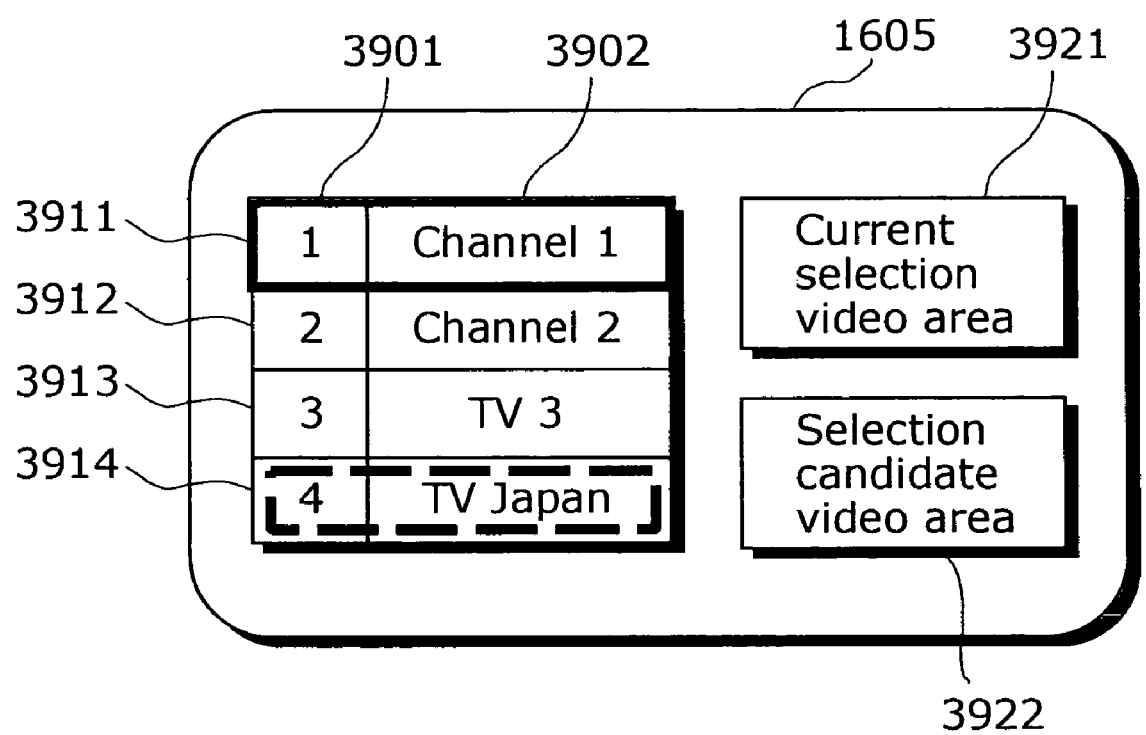
FIG. 39 shows an example of a screen display of a Java program exemplified in the third embodiment.

In the second embodiment, the implicit descrambling of the most recently accessed information is possible as descrambling is started upon the use of a stream information access library by the Java program. However, it is not possible to descramble a plurality of services at the same time as, like in the first embodiment, the number of services that can be scrambled at the same time is one. For example, the case where the Java program implements an EPG with a more advanced function than that in the second embodiment is considered. FIG. 39 shows an example such an EPG. The EPG displays a program list on the left half of a screen. Rows 3911 to 3914 show the selection choice for each channel. Furthermore, a column 3901 shows channel identifiers, and a column 3902 shows channel names. In addition, the video of the selection candidate indicated by the selection candidate cursor (broken line) in the program list is displayed in 3922 on the bottom right of the screen, and the currently selected video indicated by the current selection cursor (solid line) is displayed in 3921 on the top right of the screen. In FIG. 39, the selection candidate cursor points out "TV Japan" and the current selection cursor points out "Channel 1". In the case where a Java program for realizing an EPG such as this is considered, there is a need to simultaneously descramble both the video information of the selection candidate and the video information of the currently selected video. As respective video and audio of the channels of the rows 3911 to 3914 are normally transmitted in individual services, in such a case, there is a need to descramble two services at the same time. In the first and second embodiments, the realization of an EPG such as this, by a Java program is not possible as the number of services that can be descrambled at the same time is one. Furthermore, although in the first embodiment, the number of services that can be simultaneously selected by the service manager 2204*f* is only one, even when the service manager 2204 can simultaneously select a plurality of services, there is still a need to descramble the plurality of services at the same time. This too cannot be handled in the first embodiment.

Figure 40:
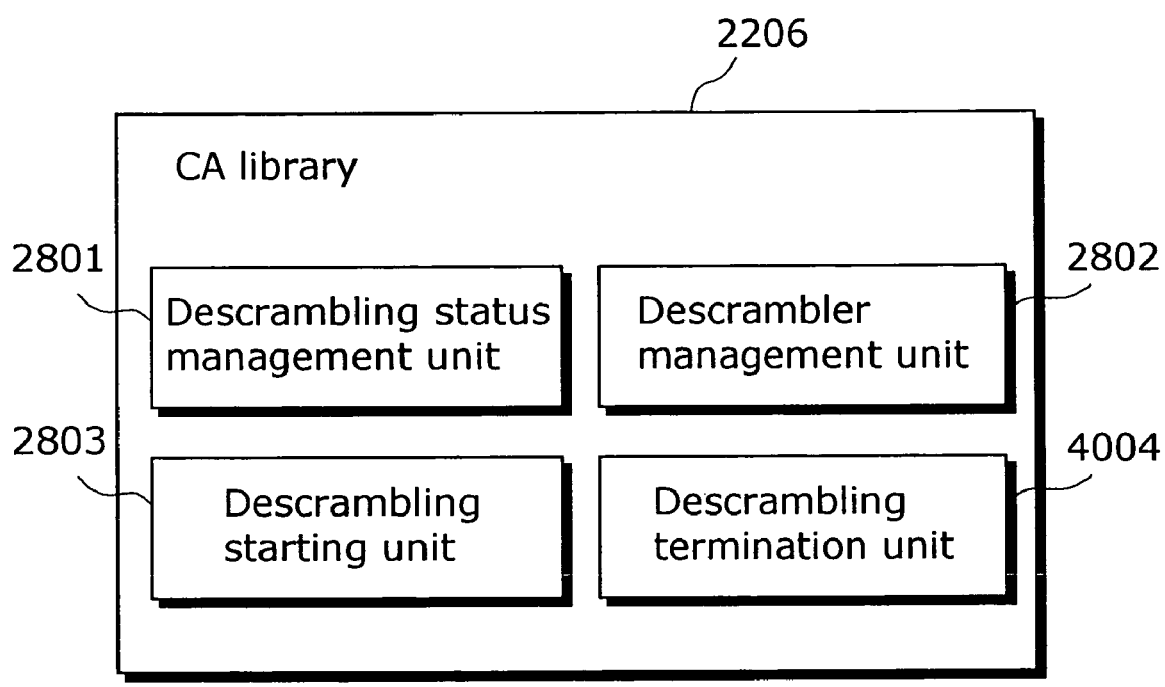
FIG. 40 is a configuration diagram of the CA library in the third embodiment.

In the present embodiment, the simultaneous descrambling of a plurality of services is possible. FIG. 40 shows the appearance of the CA library 2206 for implementing the above. A modification is done on the descrambling status management unit 2801, the descrambler management unit 2802, and a descrambling starting unit 2803, and in addition, a descrambling termination unit 4004 is introduced.

In the first embodiment, the descrambling status management unit 2801 is only able to hold one program number. However, in the present embodiment, it can hold a plurality of program numbers. In addition, it holds a count regarding each program number.

In the case where only one service is descrambled, there was no need for the descrambler management unit 2802 to manage descramblers for each service being descrambled, and it is enough just to manage, "in use" or "not in use", as the use status of a descrambler. However, as the simultaneous descrambling of a plurality of services is allowed in the present embodiment, the termination of the descrambling of a service cannot be done properly without knowing which descrambler is being used in the descrambling of which service. The descrambler management unit 2802 in the present embodiment holds the program number, together with the use status, for each descrambler. Consequently, it is possible to determine which descrambler is being used for the descrambling of which service. FIG. 41 shows a chart indicating the appearance of the management performed by the descrambler management unit 2802 in the present embodiment. A column 4103 is added to that in FIG. 29. The column 4103 shows program numbers, and indicates which descrambler is being used in the descrambling of which service.

Figure 42:
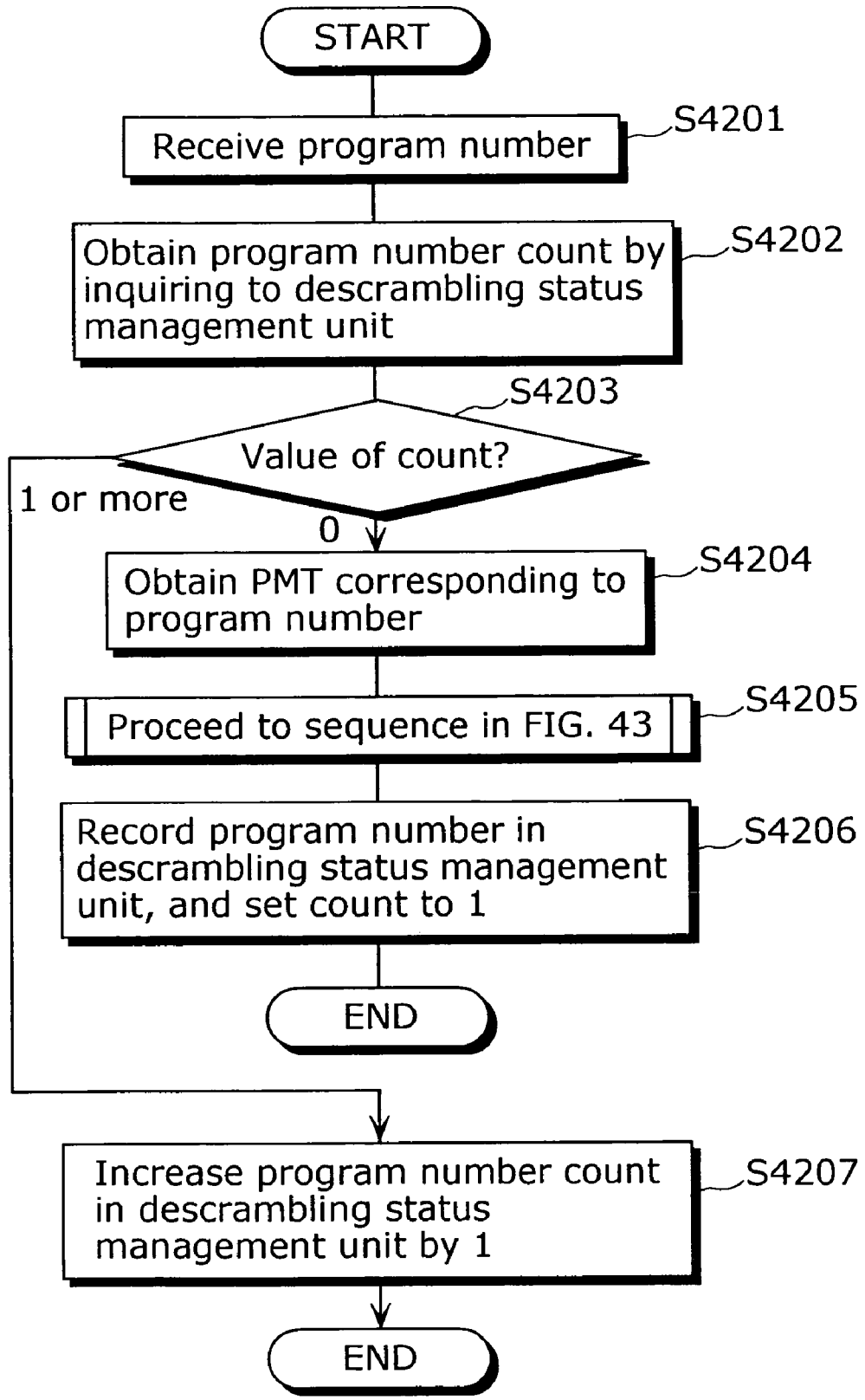
FIG. 42 shows a sequence for the descrambling starting unit in the third embodiment.
Figure 43:
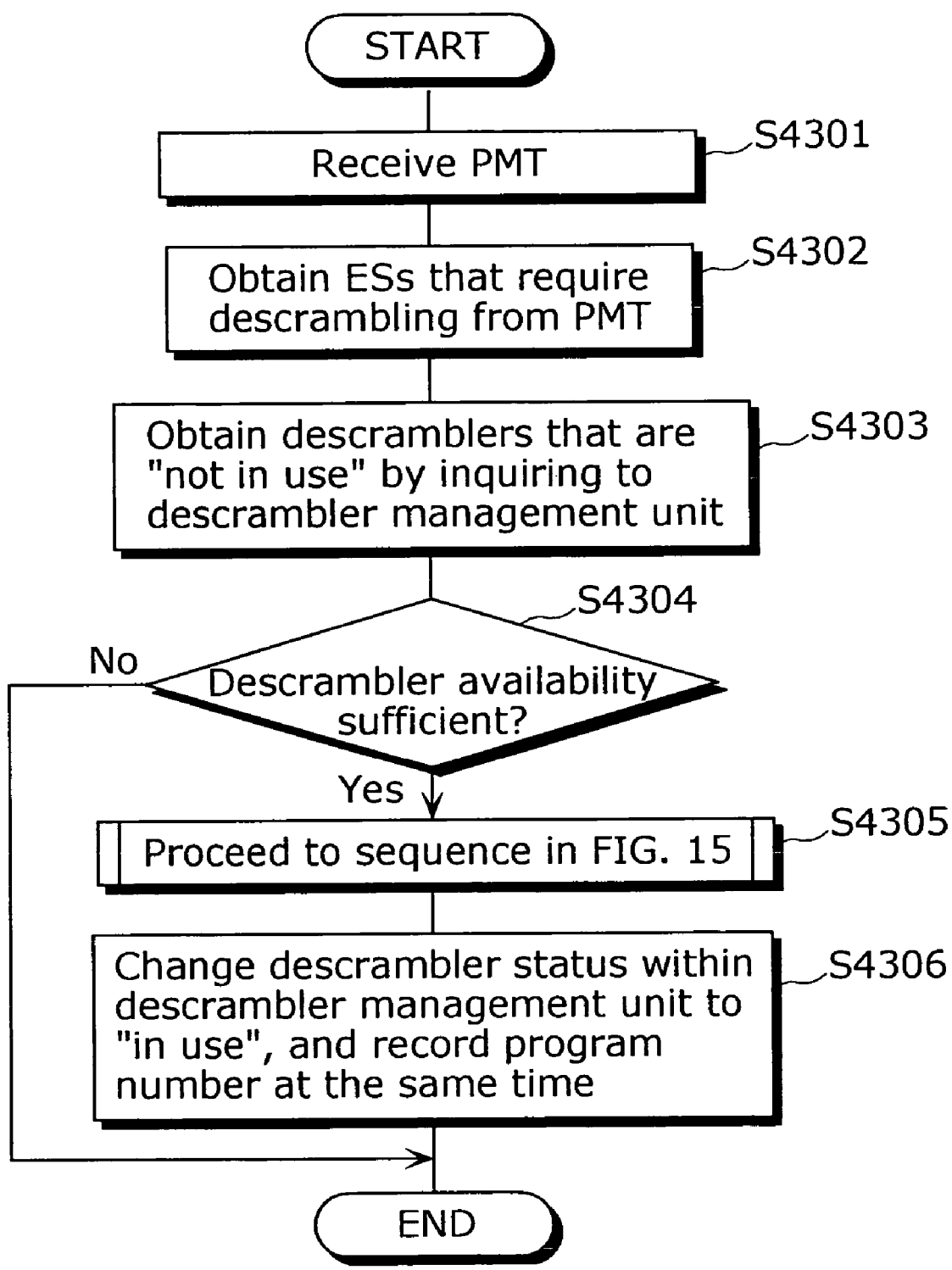
FIG. 43 shows a sequence for the descrambling starting unit in the third embodiment.

In the first embodiment, the descrambling starting unit 2803 terminates an on-going descrambling and starts a new descrambling in the sequence in FIG. 31. This is a process resulting from the need to terminate an on-going descrambling in order to start with a new descrambling, as only one service can be descrambled at the same time. The descrambling starting unit 2803 in the present embodiment does not terminate a descrambling that has already been started. FIG. 42 and FIG. 43 show an operational sequence for the descrambling starting unit 2803 in the present embodiment. Upon receiving a program number (S4201), the descrambling starting unit 2803 first obtains the program number of the services being descrambled at that point, by inquiring to the descrambling status management unit 2801 (S4202). It compares the program number received in S4201 with the program number obtained in S4202 and judges whether a service already being descrambled is the service designated in S4201 (S4203). If the service identified by the program number designated in S4201 is already being descrambled, the count managed by the descrambling status management unit 2801 is increased by 1 (S4207), and the sequence concludes. If the count is 0 and descrambling, per se, is not being carried out, the PMT identified by the program number obtained in S4201 is obtained (S4204), then the sequence proceeds to that in FIG. 43 (S4205). In FIG. 43, upon receiving the PMT (S4301), the ESs requiring descrambling are obtained from the PMT (S4302). Subsequently, a descrambler which is "not in use" is obtained by inquiring to the descrambler management unit 2802 (S4303). In the case where a there are enough descramblers existing for the descrambling of the ESs obtained in S4302 (S4304), descrambling is started based on the sequence in FIG. 15 (S4305). In addition, as the descrambler management unit 2802 in the present embodiment records program numbers being descrambled together with the use status of the descramblers, it places a use status of "in use" and sets the program number described in the PMT, with regard to the descrambler that has started with descrambling this time around. Subsequently, returning to FIG. 42, if the descrambling is successful, the program number is recorded in the descrambling status management unit 2801 and the count is set to 1. Moreover, even in the present embodiment, in the case where the descrambler exists inside the external adapter 1811, the sequence shown in FIG. 43 can be implemented as a program within the external adapter 1811, as in the first embodiment. The present invention can be implemented even in that case. In addition, the present invention can be applied even when the form of implementation is one in which the sequences in FIG. 42 and FIG. 43 are performed asynchronously in such case.

The descrambling termination unit 4004 terminates the descrambling of a designated service. The operational sequence for the descrambling termination unit is slightly different for a hardware configuration as that in FIG. 16 where the descrambler is located inside the terminal apparatus 1600 and a hardware configuration as that in FIG. 18 where the descrambler is located outside the terminal apparatus 1800.

Figure 44:
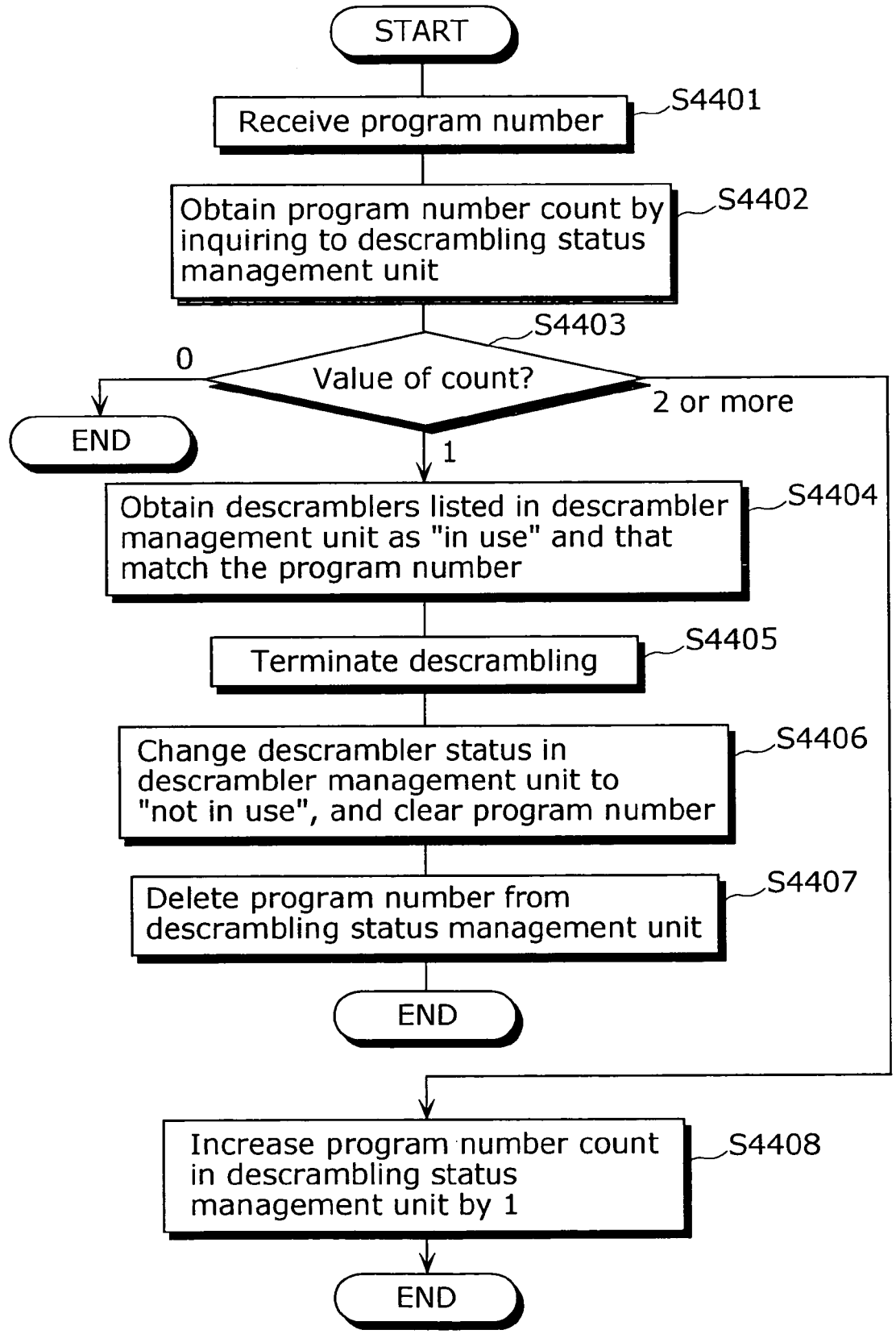
FIG. 44 shows a sequence for the descrambling termination unit in the third embodiment.

Consider the case of a hardware configuration as that in FIG. 16 in which the descrambler is located inside the terminal apparatus 1600. FIG. 44 shows the operational sequence for this case. First, the designated program is received (S4401), and the count of all the program numbers is obtained by inquiring to the descrambling status management unit 2801 (S4402). The count of the program numbers, obtained in S4402 is checked (S4403), and if the count is 0 and descrambling is not going on, the sequence is concluded. If the count is 2 or more, the corresponding program number count in the descrambling status management unit 2801 is decreased by 1 (S4408), and the sequence is concluded. If the count is 1, the descramblers having a status of "in use" according to the descrambler management unit 2802, as well as having program numbers that match the program number received in S4401 are obtained (S4404), and their descrambling is terminated (S4405). In addition, the descrambler management unit 2802 sets a use status of "not in use" and clears the program number for the descrambler which terminated its descrambling this time around (S4406). Subsequently, the program number is deleted from the descrambling status management unit 2801 (S4407). In this case, the descrambling termination library is stored in the ROM 1609 as a library for terminating a descrambling, and is executed by the CPU 1606.

Figure 45:
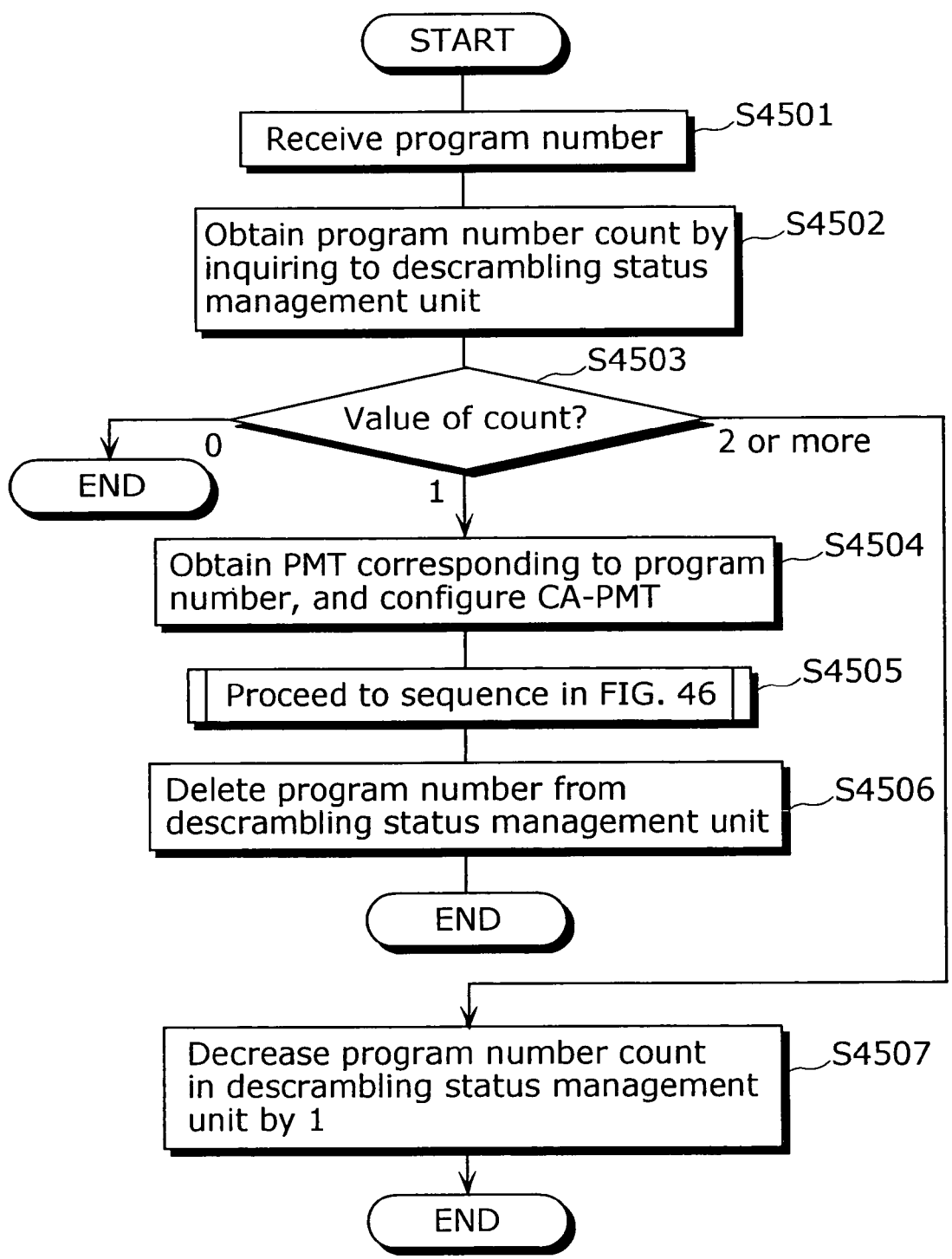
FIG. 45 shows a sequence for the descrambling termination unit in the third embodiment.
Figure 46:
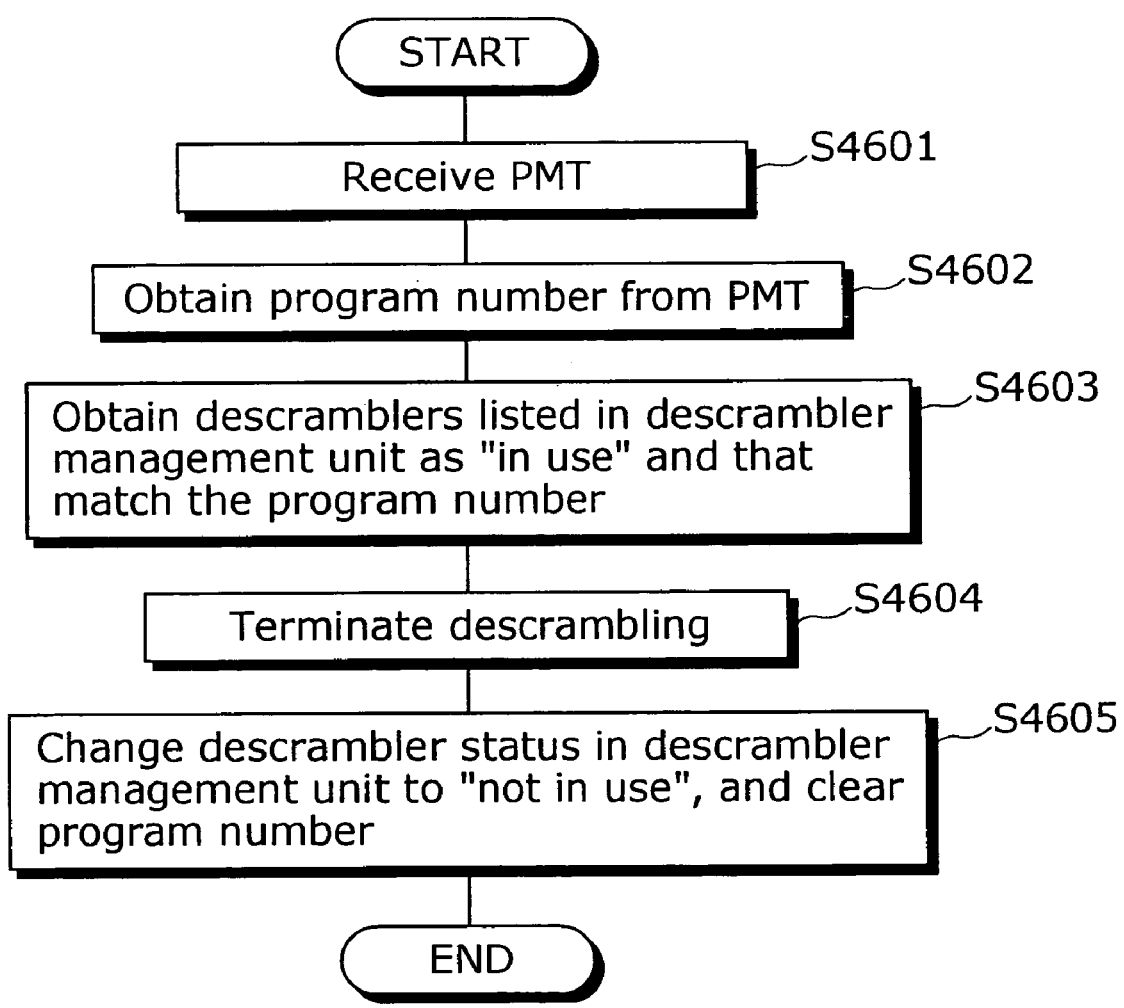
FIG. 46 shows a sequence for the descrambling starting unit in the third embodiment.

Consider the case of a hardware configuration as that in FIG. 18 in which the descrambler is located outside the terminal apparatus 1800. FIG. 45 and FIG. 46 show the operational sequences for this case. First, the designated program number is received (S4501), and the count of the program number is obtained by inquiring to the descrambling status management unit 2801 (S4502). The value of the count is judged (S4503), and if it is 0, the sequence is concluded as descrambling for the service corresponding to the program number is not being carried out. If it is 2 or more, the descrambling status management unit 2801 decreases the value of the count corresponding to the program number by 1, and the sequence is concluded. If it is 1, in order to actually terminate the descrambling, a CA-PMT is configured by obtaining the PMT (S4504), and then the sequence proceeds to that in FIG. 46 (S4505). In actuality, the CA-PMT is transmitted to the external adapter 1811 in S4505. In the sequence in FIG. 46, upon receiving the PMT (S4601), a program number is obtained from the PMT (S4602), and the descramblers having a use status of "in use" according to the descrambler management unit 2802, as well as matching the obtained program number, are obtained (S4603). The descrambling of these descramblers is terminated (S4604), the status within the descrambler management unit 2802 for the descramblers that terminated their descrambling is changed to "not in use", and their program numbers are also cleared. Subsequently, returning to FIG. 45, the program number is deleted from the descrambling status management unit 2801 (S4506). In this case, the library for implementing the sequence shown in FIG. 45 is stored in the ROM 1609 and executed by the CPU 1806. With regard to the sequence in FIG. 46, this is stored as a program in the ROM of the external adapter 1811, and executed by the CPU of the external adapter 1811 when the external adapter 1811 receives the CA-PMT. Moreover, there are instances where the sequence in FIG. 45 and the sequence in FIG. 46 are executed asynchronously as in the descrambling starting unit 2803 in the first embodiment.

In the present embodiment, a plurality of services can be descrambled simultaneously, and descrambling is started upon the service selection by the service manager 2204 as well as the use of a stream information access library by the Java program.

In the second embodiment, as the services that can be descrambled at the same time is limited to one as in the first embodiment, a preceding descrambling is terminated and a new descrambling is started upon the use of a stream information access library. However, as a plurality of services can be descrambled in the present embodiment, simply substituting services to be descrambled is not possible. As a result, the descrambling of services is started upon the start of the use of a stream information access library, and the descrambling of services is terminated upon the end of such usage. For this reason, it is necessary to remember the program number of the service being descrambled. For this purpose, a service storage unit is introduced for each stream information access library.

Figure 49:
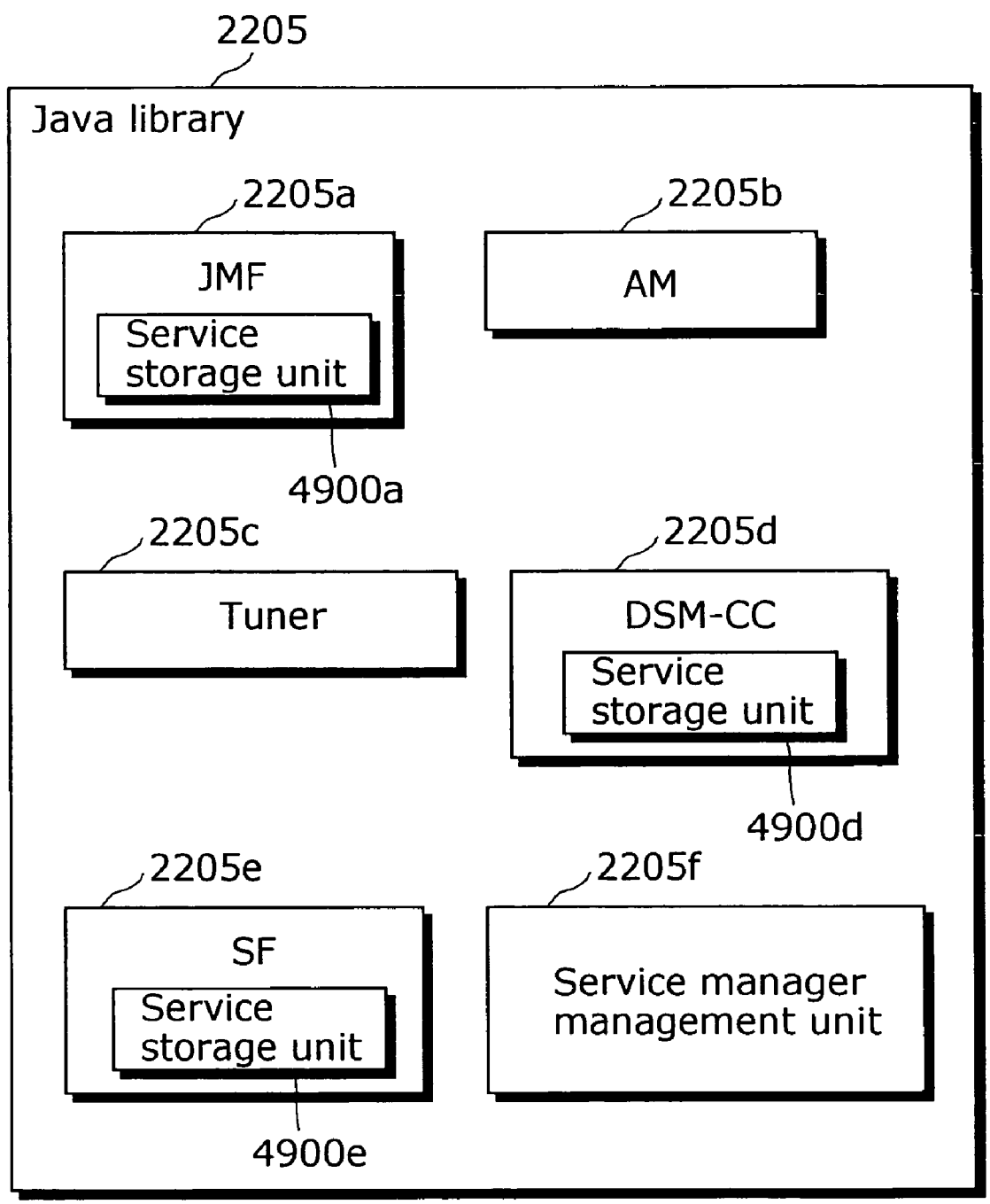
FIG. 49 shows the configuration of the information access library possessed by the service storage unit in the third embodiment.

A service storage unit exists for each stream information access library, and it holds the program number of the service being descrambled by that stream information access library at that point. These exist in the primary storage unit 1608 and are referred to by the respective stream information access libraries. As stream information access libraries can simultaneously perform a plurality of descrambling, the holding of a plurality of program numbers is possible. In that case, the program numbers are recorded as a set together with the identifier of the execution unit held by a stream information access library, and by designating the identifier of an execution unit, the program number of the service to be descrambled based on such execution unit can be obtained. FIG. 49 shows the appearance of the service storage unit existing for each stream information access library. In this diagram, a service storage unit 4900a belongs to the JMF 2205a, a service storage unit 4900d belongs to the DSM-CC2205d, and a service storage unit 4900e belongs to the SF 2205e. Hereinafter, service storage units shall be referred to as 4900.

Figure 47:
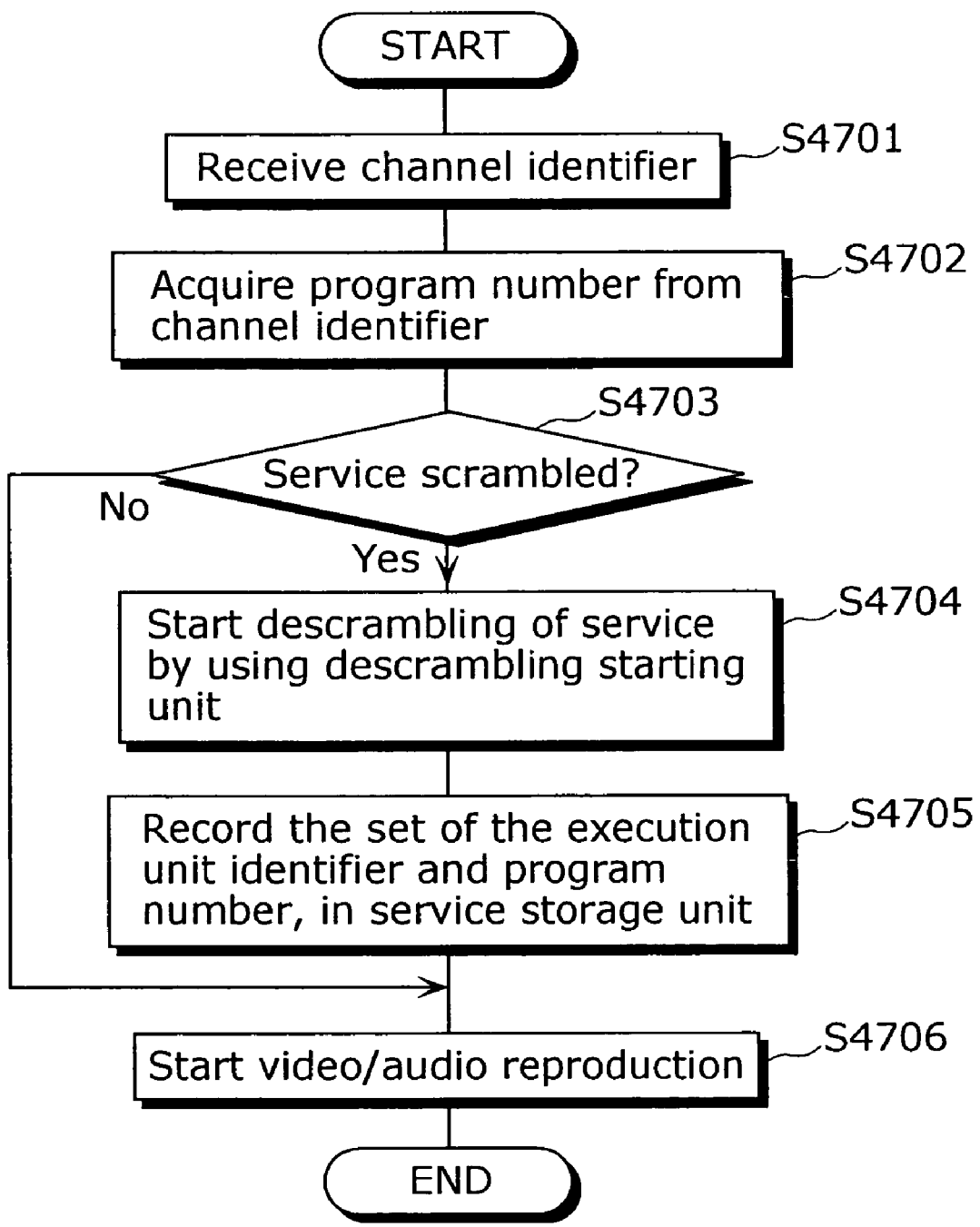
FIG. 47 shows the operation sequence during the start of descrambling, for the stream information access library in the third embodiment.

The case of the JMF 2205a shall be discussed as an example of a stream information access library. FIG. 47 shows a sequence used with regard to the start of usage. When the Java program issues a video/audio reproduction command to a certain execution unit found inside the JMF 2205a, first, a channel identifier is received (S4701), then a program number is obtained (S4702), and if the service is scrambled (S4703), descrambling is started using the descrambling starting unit 2803 (S4704). At that time, the identifier of that execution unit and the program number are recorded as a set in the service storage unit 4900 (S4705). Subsequently, the video and audio is reproduced (S4706).

Figure 48:
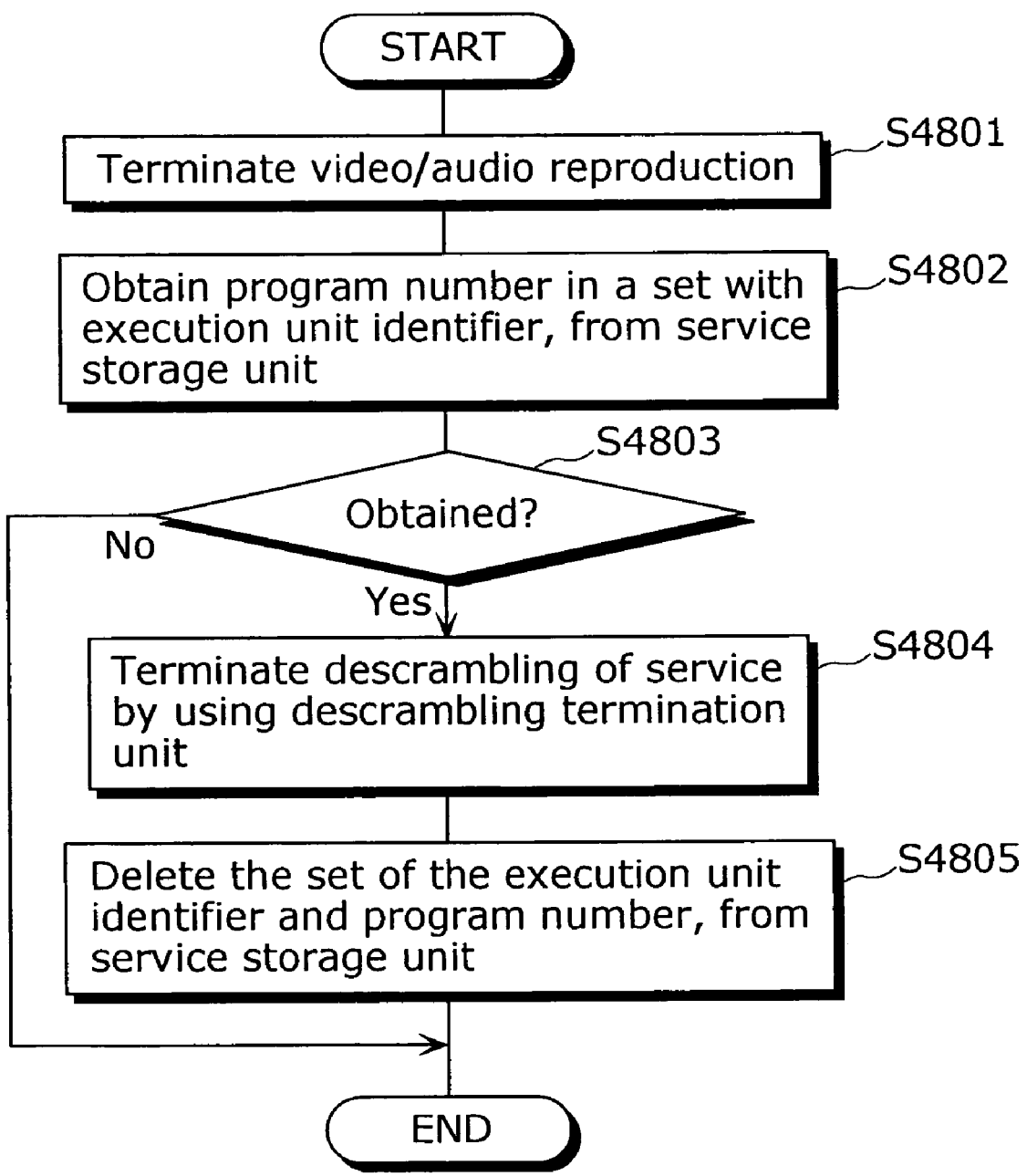
FIG. 48 shows the operation sequence during the termination of descrambling, for the stream information access library in the third embodiment.

FIG. 48 shows the sequence used for the termination of the usage. When the Java program issues a video/audio reproduction termination command to a certain execution unit, the reproduction of the video/audio being reproduced by such execution unit at that point is terminated (S4801). In addition, as there is a need to terminate any descrambling being carried out according to such execution unit at that time, first the program number that is in a set with the identifier of that execution unit is obtained from the service storage unit 4900 (S4802). If it is obtained (S4803), this means that descrambling is being carried out. Descrambling is then terminated using the descrambling termination unit 4004 (S4804), and the set of the execution unit and the program number is deleted from the service storage unit 4900 (S4805).

By operating in this manner, the start and termination of descrambling is carried out at the same time as the start and termination of the use of the JMF 2205a. This is also applicable to the other stream information access libraries.

In the first embodiment, the selection of a previously selected service is terminated upon the selection of a new service, as only one service can be simultaneously selected by the service manager 2204. With regard to descrambling, it is possible to terminate the descrambling of a previously selected service upon the selection of a new service. However, the service manager 2204 in the present embodiment can simultaneously select a plurality of services. As such, the selection of a new service cannot be a counterpart to the termination of the selection of a previous service. For example, in the OCAP environment discussed earlier, the service manager 2204 is allowed to simultaneously hold a plurality of "service context" execution units, and accordingly, the simultaneous selection of a plurality of services is possible. In addition, as the number of "service context" execution units changes dynamically, the number of services to be selected simultaneously is variable. In other words, the service manager 2204 in the present embodiment possesses the functions for service selection and service selection termination. As with the aforementioned stream management library, the service storage unit 4900 is also introduced within the service manager 2204 in order to implement descrambling on a service unit basis in this environment.

As in the first embodiment, the selection of a service by the service manager 2204 is started through "the channel selection by a user, using the EPG 2202", as well as "the use of the service manager management library 2205f by the Java program". Furthermore, in the case where a new service selection is to be carried out for a "service context" execution unit already selecting a service, the selection termination of a service by the service manager 2204 is performed ahead of such service selection or when the service selection termination function existing in the service manager management library 2205f is used by the Java program. Even with regard to the service manager 2204, descrambling is started upon service selection and the set of the identifier of the execution unit and the program number is recorded in the service storage unit 4900, and upon service selection termination, descrambling is terminated by obtaining the program number corresponding to the execution unit, and the set of such identifier of the execution unit and the program number is deleted, as in the sequence for the JMF 2205a discussed previously.

Moreover, in the present embodiment, the service storage unit 4900, held in each stream information access library, holds the set of the identifier of an execution unit and a program number. However, it is also possible to have an implementation where, in addition, the identifier for identifying just the single Java program which used the stream information access library in the procedure S4704, is recorded in the service storage unit 4900. In other words, it is also possible to have an implementation where the service storage unit 4900 holds a set bearing the three components of the identifier of an execution unit, the program number, and the identifier of the Java program. In this case, when a Java program uses a stream information access library to access scrambled information within an MPEG-2 transport stream and after descrambling is carried out, the Java program is concluded while such use is on-going, it is possible to have an implementation where the descrambling which was started by the use of the stream information access library by such Java program, is implicitly concluded. The Java program launching/termination functions are possessed by the AM 2205b, and during the conclusion of a Java program, the AM 2205b notifies each stream information access library by specifying the identifier of such Java program. Having received the notification, the stream information access libraries use the descrambling termination unit 4004, in the case where the set which includes the identifier of the terminated Java program is held in the service storage unit 4900 held by each, to terminate the descrambling of the service identified by the program number existing in such set. At the same time, the set including the identifier of the terminated Java program is deleted from the service storage unit 4900. For example, when a certain Java program uses a stream information access library in order to reproduce video/audio, the stream information access library starts descrambling if the information is scrambled. At that time, the set of the identifier of the Java program, the identifier of the "player" execution unit, and the program number, is held in the service storage unit 4900. When the Java program is concluded by the AM 2205b, the AM 2205b carries out a notification to each stream information access library by specifying the identifier of the Java program. Receiving such notification, the JMF 2205a searches the service storage unit 4900 for the set that includes the identifier of the Java program. If such group is found, it designates the program number included in the set, and descrambling is terminated using the descrambling termination unit 4004. In addition, in the case where this implementation is adopted, it is possible to terminate the descrambling started implicitly through the use of a stream information access library by the Java program included in a service for which selection is terminated, during the conclusion of the selection of a certain service by the service manager 2204. During the conclusion of a selection of a service, the service manager 2204 issues a termination command for the Java program to the AM 2205b. Upon receiving the command, the AM 2205b terminates the execution of the Java program included in the service. At that time, as the AM 2205b carries out a termination notification to each stream information access library by specifying the identifier of the Java program, each Java program can terminate the descrambling for the Java program to be concluded. Furthermore, among Java programs, there are Java programs that are not concluded even when the service selection is concluded. As the management for such Java programs is also carried out by the AM 2205b, with regard to Java programs that are not terminated even during the conclusion of the service selection, execution is not terminated even upon the selection termination of the service, and as the Java program termination notification to the stream information access libraries is also not carried out, the descrambling started by such Java program can be maintained.

Moreover, the descrambling status management unit 2801, the descrambling starting unit 2803, and the descrambling termination unit 4004, in the present embodiment use a count indicating how many times the descrambling starting unit 2803 is used for the same service. By using the count, descrambling is not concluded as long as the descrambling termination unit 4004 is not invoked in the number of times as the descrambling starting unit 2803 is invoked. However, it is also possible to have an implementation where the count is discontinued, and descrambling is concluded when the descrambling termination unit is used once, even if the descrambling starting unit is used three times. In that case, the side using the descrambling starting unit 2803 and the descrambling termination unit 4004, namely the service manager 2204 and the stream information access libraries must be cautious so as not to terminate a descrambling which is still required. For example, assuming that the JMF 2205a and the SF 2205e are using scrambled information transmitted by ESs within the same service, when the usage of the JMF 2205a is finished and the descrambling termination unit 4004 is utilized, the descrambling is terminated, notwithstanding the fact that the use by the SF 2205e is not yet finished. In order to avoid such a situation, it is also possible to have an implementation where the user of the descrambling starting unit 2803 and the descrambling termination unit 4004 is provided with a common service storage unit 4900 in which a count is performed.

The operation example of a Java program for implementing the EPG in FIG. 39 shall be taken up. First, the service manager 2204 performs the service selection based on the channel selection of a user carried out on the EPG 2202 of the broadcast receiving apparatus itself. In this case, it is assumed that the Java program for implementing the EPG is included in "Channel 1" indicated by the row 2411 in FIG. 24, and that the user selects "Channel 1". The service manager 2204 performs service selection by obtaining the program number based on the channel identifier "1" of "Channel 1", and descrambling is started. Video and audio is reproduced and the Java program for implementing the EPG in FIG. 39 is launched. This Java program displays a screen such as the one in FIG. 39 on the display. At this point, "Channel 1" is currently selected by default, and the video being descrambled upon the selection of a service by the service manager 2204 is displayed in 3921. Furthermore, in the case where the selection candidate cursor is placed by default on "TV Japan" at the bottom of the program list, the Java program displays the video of "TV Japan" onto 3922 using the JMF 2205a. At this time, the JMF 2205a uses the descrambling starting unit.

Here, as it is a service that has not yet been descrambled, a new descrambling is started. Subsequently, the termination of reproduction/start of reproduction is repeated by the Java program using the JMF 2205a, every time the cursor of the selection candidate (broken line) is moved up or down by a user. At the same time, the JMF 2205a carries out the descrambling termination and starting. A Java program such as this can be implemented by allowing the descrambling of a plurality of services.

Moreover, in the present embodiment, there are three types for the timing of the performance of implicit descrambling, namely, upon the selection of a service by the service manager 2204, upon the use of the stream information access libraries by a Java program, or both. However, the present invention can be applied for any of these. In the case where it is only upon the selection of a service by the service manager 2204, only the ESs included in the PMT of the service being selected by the service manager 2204 are descrambled. In the case where it is upon the use of the stream information access libraries, descrambling is performed based on the PMT including the information to be used by the application, regardless of the service being selected by the service manager 2204. In the case where it is both timings, either one is included.

Moreover, in the present embodiment, in the case where the number of descramblers becomes insufficient, descrambling cannot be performed unless a descrambling which has already started is terminated. In such a case, the service selection by the service manager 2204 and the access of information included in an MPEG-2 transport stream using the stream information access library is practically impossible. In this case, as this is a descrambling failure, it is also possible to have an implementation which returns an error regarding the service selection and the access of stream information itself. In addition, it is also possible to have an implementation where an error is not returned, and obtainment is only carried out for the accessing of only information which has not been scrambled. For example, assume that there is a service having scrambled ESs for video and audio but with non-scrambled ESs for MPEG-2 sections transmitting the Java program. In the case where the service manager 2204 performing the service selection on such service is unable to start descrambling, it is possible to give up on the video/audio and treat the service selection as successful only from the launching of the Java program. It is also possible to have an implementation that has the descrambling failure as a reason for treating the service selection as a failure.

Furthermore, there are two types of services in the OCAP environment discussed earlier. One is the common service which exists by association with a PMT, and the other is an abstract service which exists without association with a PMT. The abstract service exists having only a Java program contained inside, and upon the selection of a service, reproduction of video/audio is not carried out and only the Java program is downloaded using the DSM-CC 2205d. Furthermore, the service selection for an abstract service is concluded when the execution of the Java program is concluded. In an environment such as one having two types of services, as in the OCAP environment, it is possible to change the timing of descrambling start and termination according to the service type, during the service selection by the service manager 2204. For example, in the selection of the common service, descrambling is carried out implicitly during the service selection by the service manager 2204, and descrambling is not performed during service selection in the case of the abstract service. In that case, descrambling is carried out only while the Java program is being downloaded by the DSM-CC 2205d during the abstract service selection stage and such descrambling is terminated by the DSM-CC 2205d when downloading is finished. In this environment, descrambling is continued while a service is selected with regard to a common service. However, with regard to an abstract service, only the descrambling by the DSM-CC 2205d is carried out, and aside from this, descrambling is not performed even while the service is selected.

Fourth Embodiment

In the previous embodiments, a service was used as a unit of descrambling. However, in the case where a service is assumed as the unit of descrambling, the descrambler is wasted as descrambling is carried out even on scrambled information which is not actually used by the Java program. In order to effectively use a descrambler, the necessary descrambling should be carried out at the necessary time. For example, in the case where descrambling is implicitly carried out during the stage where the Java program uses the SF 2205e which performs the sorting of a section by the designation of an ES, only one ES is designated and it is sufficient to occupy a single descrambler to carry out the descrambling. However, in the previous embodiments, it was necessary to descramble the entire service which included the designated ES as descrambling is carried out on a per service basis. If in the case where the service contains many other ESs such as video/audio, and so on, decoding is performed on the unnecessary ESs, which is inefficient.

In the present embodiment, the acceptance of an ES as a unit of descrambling is assumed possible. Accordingly, descrambling can be carried out by designating an ES. In order to implement this, the operation of the descrambling status management unit 2801, the descrambler management unit 2802, the descrambling starting unit 2803, and the descrambling termination unit 4004, are modified.

In the previous embodiments, a program number is recorded in the descrambling status management unit 2801, whereas in the present embodiment, the set of the program number and a PID is recorded. In addition, a count is held for each group, and the number of times in which the descrambling for the targeted ES is started using the descrambling starting unit 2803 is counted.

In the previous embodiments, the descrambler management unit 2802 records the use status and program numbers, whereas in the present embodiment, a PID is recorded in addition to the program number. As such, is able to respond to the start and termination of descrambling by the designation of an ES.

Figure 50:
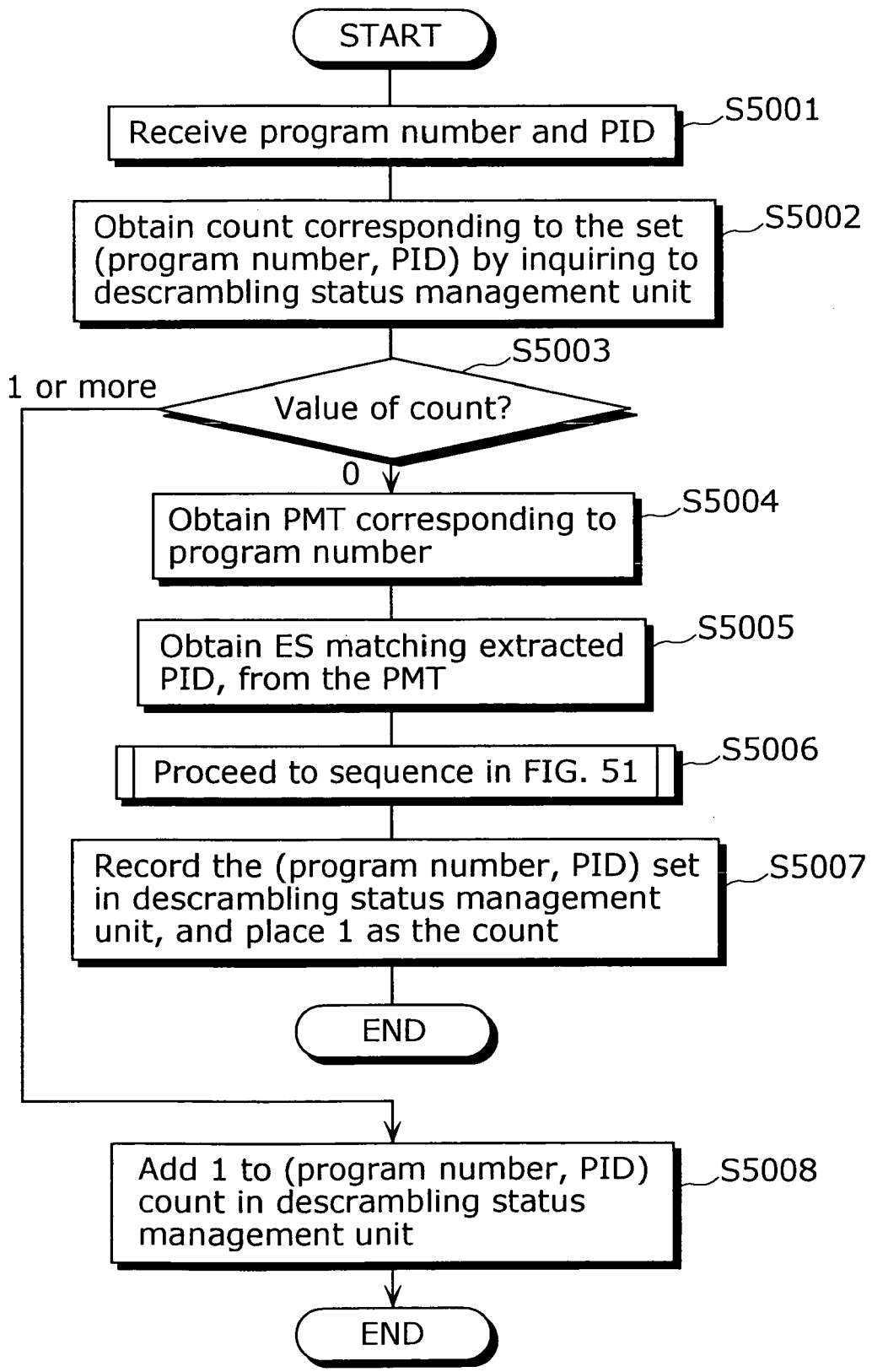
FIG. 50 shows a sequence for the descrambling starting unit in the fourth embodiment.
Figure 51:
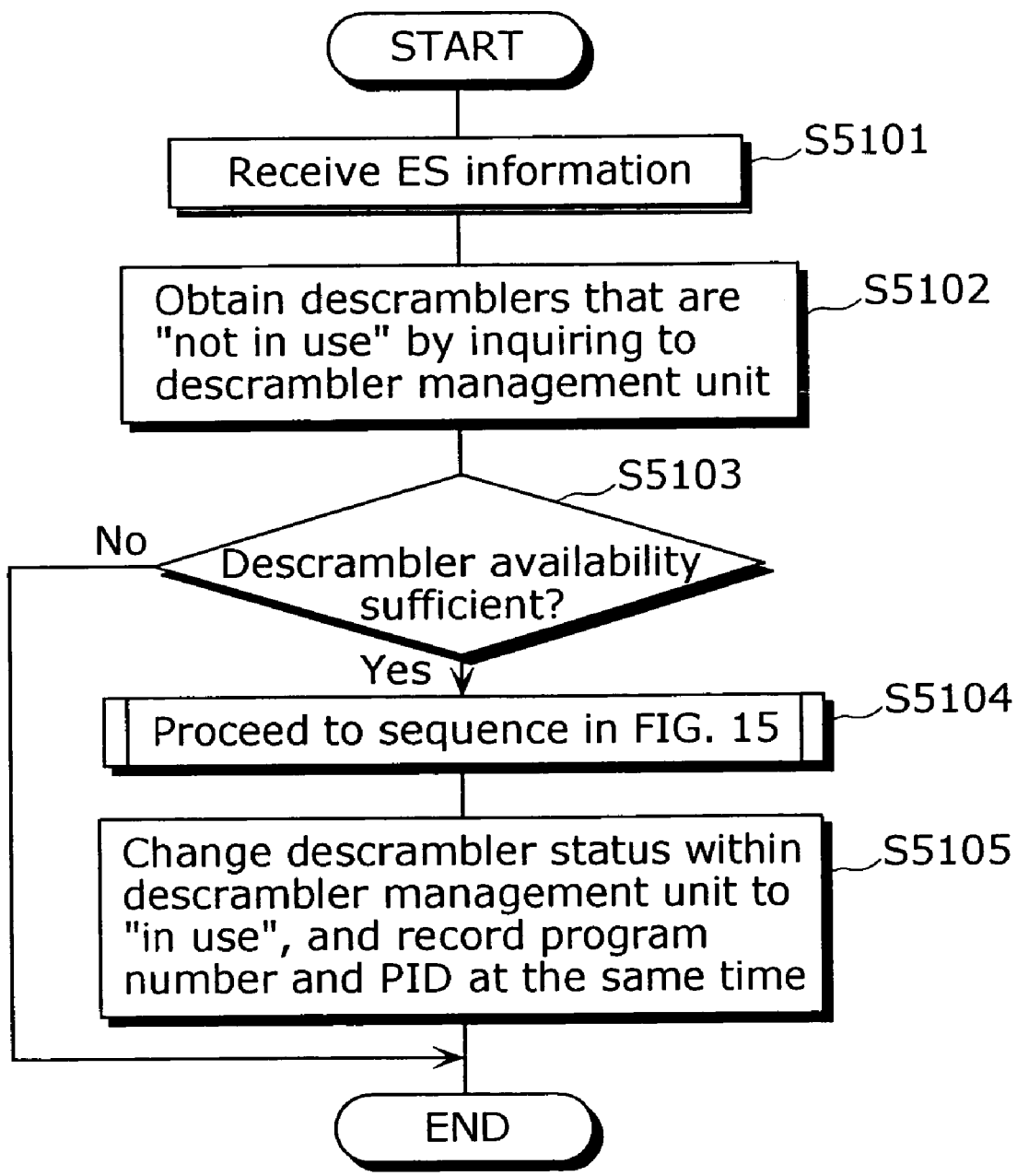
FIG. 51 shows a sequence for the descrambling starting unit in the fourth embodiment.

The operation of the descrambling starting unit 2803 is modified as in FIG. 50 and FIG. 51. First, in order to accept an ES designation together with a service designation, a PID is received together with the program number (S5001). Next, the count corresponding to the set of the program number and PID is obtained from the descrambling status management unit 2801 (S5002). If the count is 1 or more (S5003), the count is increased by 1 (S5008) and the sequence is concluded. If the count is 0, the descrambling of the ESs made up by the TS packet of the designated PID has not yet been started. The PMT corresponding to the program number is obtained (S5004), and information regarding ESs, extracted from within the PMT, and that matches the PID, is obtained (S5005). Subsequently, the sequence proceeds to that in FIG. 51 (S5006). In the sequence in FIG. 51, first ES information is obtained (S5101) and then the descramblers with a status of "not in use" are obtained by inquiring to the descrambler management unit 2802 (S5102). If there are sufficient descramblers for descrambling all the ESs (S5103), descrambling is started through the sequence in FIG. 15 (S5104). Subsequently, the descrambler management unit 2802 changes the use status of the descramblers starting the descrambling this time to "in use", and records the program number and PID (5105). Subsequently, returning to the sequence in FIG. 50, the set of the program number and the PID is recorded in the descrambling status management unit 2801, and the count is placed at 1 (S5007). Moreover, even with regard to the descrambling starting unit 2803 in the present embodiment, as with the descrambling starting unit 2803 in the first embodiment, in the case where the descrambler exists in the external adapter 1811, there are instances where it is implemented as a library existing in the ROM 1609 for the sequence in FIG. 50, and as a certain program in the ROM found inside the external adapter 1811 for the sequence in FIG. 51. In addition, there are also cases where an implementation format is adopted in which both operate asynchronously. The present invention can be applied in any of such cases.

The operating sequence for the descrambling termination unit 4004 differs depending on whether the descrambler is located inside or outside the broadcast receiving apparatus.

Figure 52:
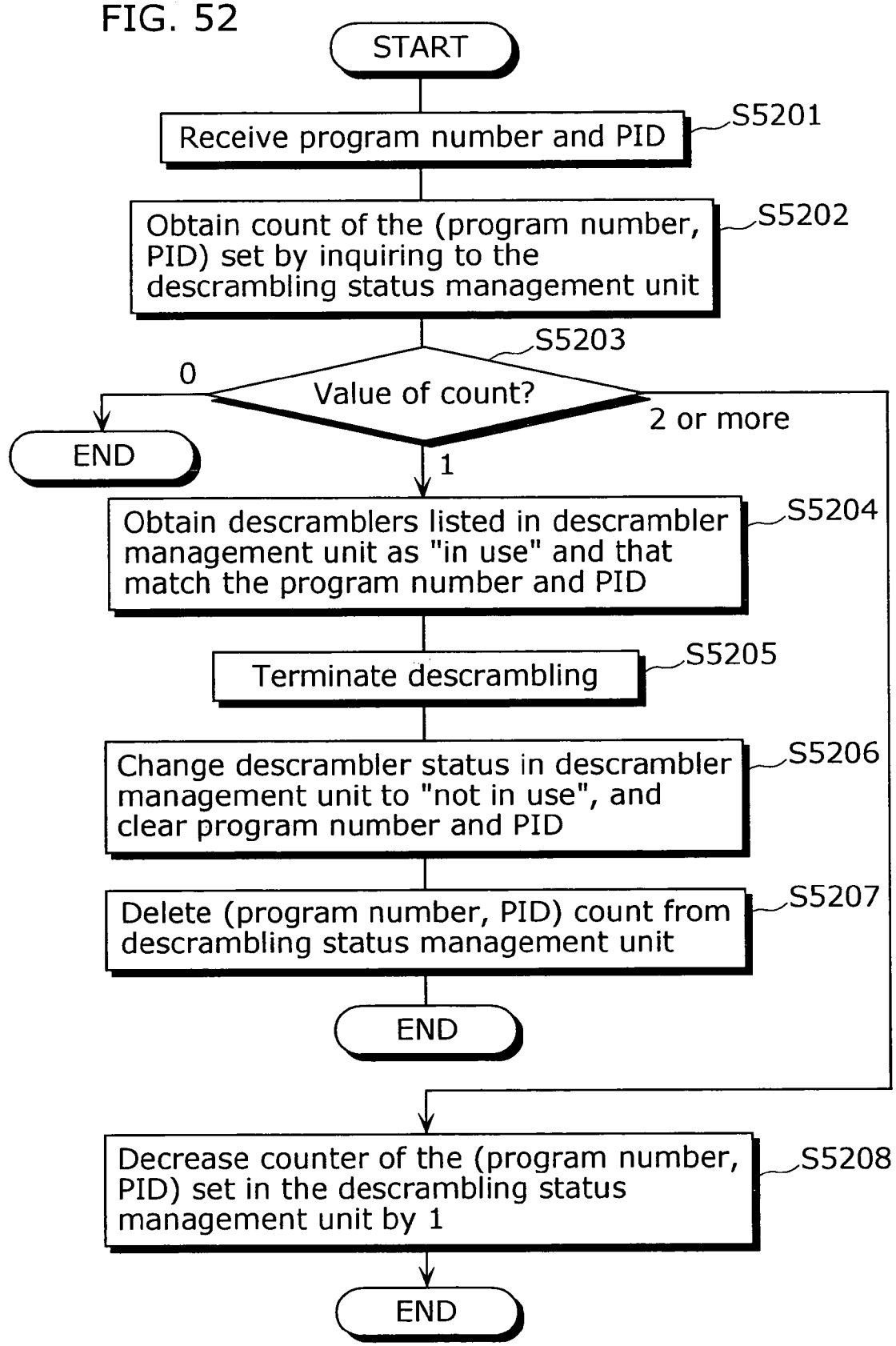
FIG. 52 shows a sequence for the descrambling termination unit in the fourth embodiment.

FIG. 52 shows the operating sequence in the case where, as in FIG. 16, the descrambler exists inside the terminal apparatus 1600. First, upon receiving a program number and a PID (S5201), the count for the set of the program number and the PID is obtained by inquiring to the descrambling status management unit 2801 (S5202). The value of the count is judged (S5203), and if it is 0, the sequence is ended without doing anything, as the descrambling for the ES made up by the TS packet of such PID has not been started. If the value is 2 or more, the count for the set of the program number and the PID in the descrambling status management unit 2801 is decreased by 1 (S5208) and the sequence is concluded. If it is 1, in order to terminate the descrambling, a descrambler which is "in use", and that matches the program number and PID, is obtained from the descrambler management unit 2802 (S5204) and the descrambling is terminated (S5205). Subsequently, with regard to the descrambler which has terminated descrambling this time around, the status in the descrambler management unit 2802 is changed to "not in use", and the program number and PID is cleared (S5206). In addition, the set of the program number and the PID are deleted from the descrambling status management unit 2801 (S5207).

Figure 53:
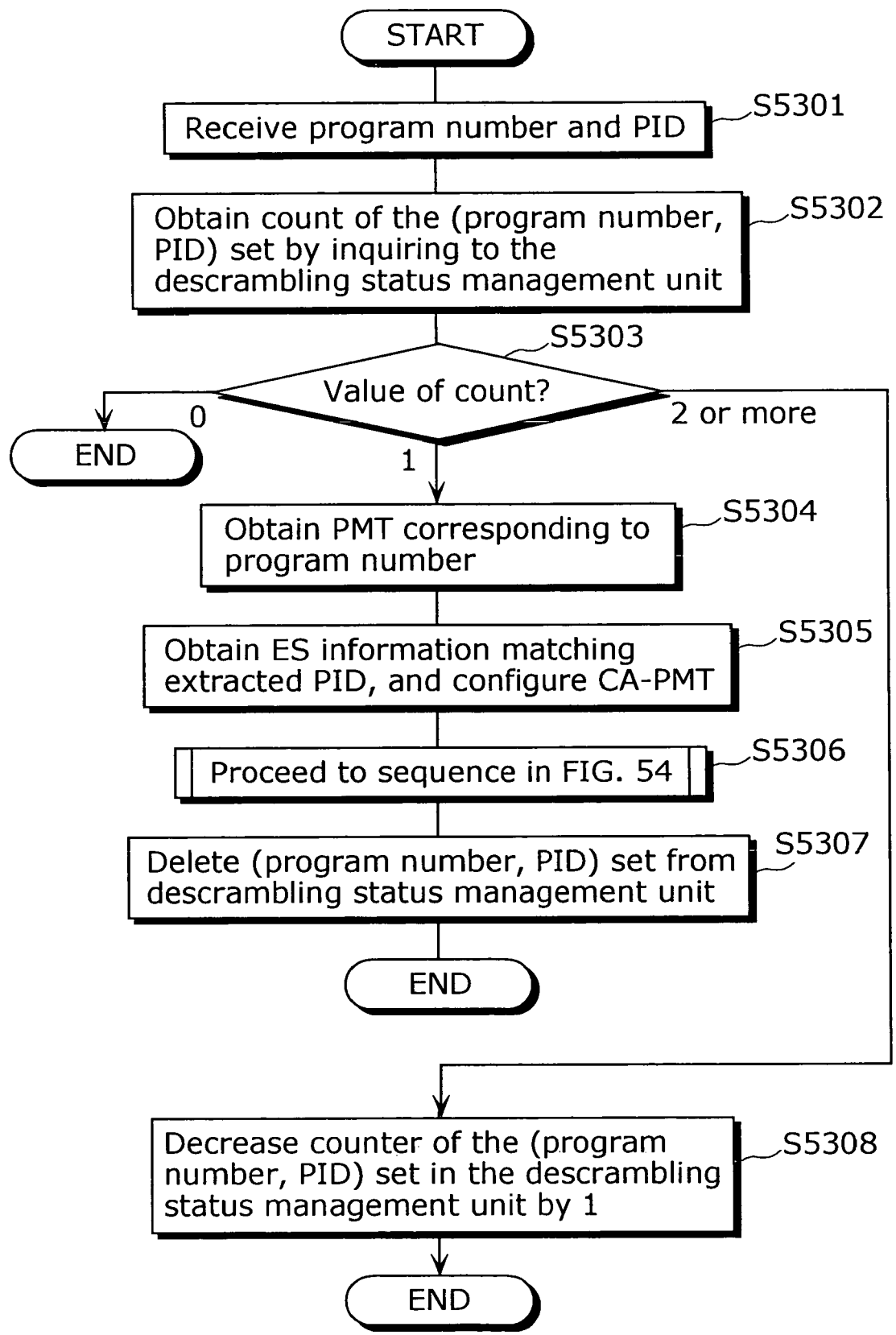
FIG. 53 shows a sequence for the descrambling termination unit in the fourth embodiment.
Figure 54:
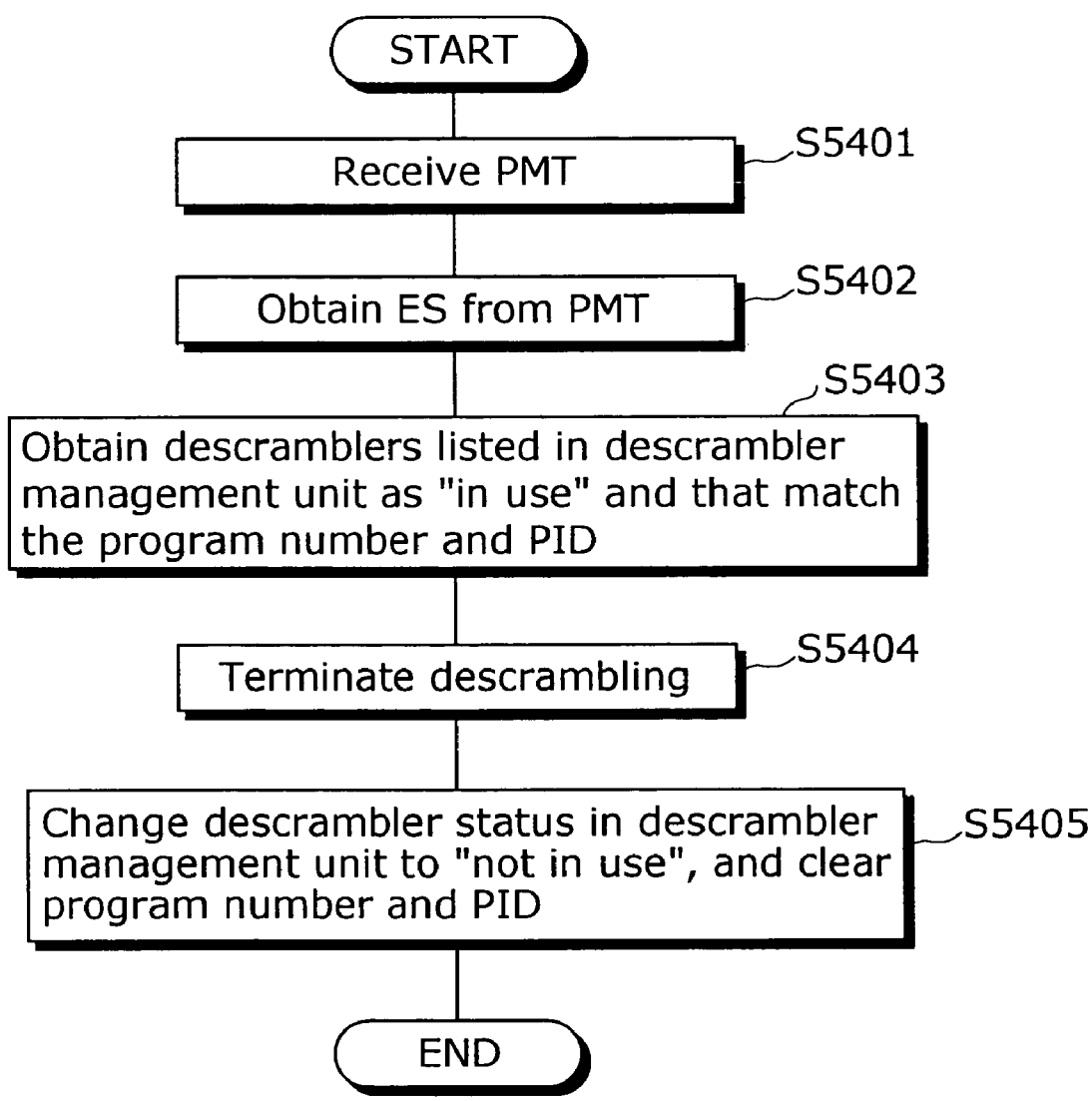
FIG. 54 shows a sequence for the descrambling termination unit in the fourth embodiment.

FIG. 53 and FIG. 54 show the operating sequence in the case where, as in FIG. 18, the descrambler exists within an external adapter 1811 outside the terminal apparatus 1600. First, upon receiving a program number and a PID (S5301), the count for the set of the program number and the PID is obtained by inquiring to the descrambling status management unit 2801 (S5302). The value of the count is judged (S5303), and if it is 0, the sequence is concluded without doing anything, as the descrambling for the ES made up by the TS packet of the designated PID has not been started. If the value is 2 or more, the count for the set of the program number and the PID in the descrambling status management unit 2801 is decreased by 1 (S5308) and the sequence is concluded. If it is 1, a PMT corresponding to the program number is obtained (S5304), the ES information extracted in S5303, that matches the PID is obtained, and a CA-PMT is configured (S5305) in order to terminate the descrambling. By transmitting this to the external adapter 1811, the sequence proceeds to that in FIG. 54 (S5306). In FIG. 54, first the CA-PMT is received (S5401), and the ES information is obtained (S5402). The descrambler which is "in use" and has a matching program number and PID is obtained by inquiring to the descrambler management unit 2802 (S5403), and descrambling is terminated (S5404). Subsequently, with regard to the descrambler which has terminated descrambling this time around, the status in the descrambler management unit 2802 is changed to "not in use", and the program number and PID is cleared (S5405). In addition, going back to FIG. 53, the set of the program number and the PID are deleted from the descrambling status management unit 2801 (S5307). Even in the present embodiment, it is possible to have a form of implementation where the library for implementing the sequence in FIG. 53 is recorded in the ROM 1609, and the program for implementing the sequence in FIG. 54 is recorded in the external adapter 1811. In addition, a form in which both are executed asynchronously is also possible. The present invention can be applied in any of the cases.

In the present embodiment, the implicit descrambling by the service manager 2204, as well as the implicit descrambling by the stream information access libraries is possible. In addition, the descrambling start/termination timing is, as in the third embodiment, one where descrambling is started upon the service selection of the service manager 2204 and terminated upon the conclusion of the service selection, as well as starting the descrambling upon the start of stream information access library usage, and terminating it upon the conclusion of such usage. However, as the information designated to the descrambling starting unit 2803 and the descrambling termination unit 4004 is not only the program number, and the PID can also be designated as well, the performance of useless descrambling is avoided by designating only the PID to stream information access libraries in which a PID is designated, such as the SF 2205e, and so on.

Moreover, the descrambling status management unit 2801, and the descrambling starting unit 2803, as well as the descrambling termination unit 4004 use a count indicating how many times the descrambling starting unit 2803 is used for the same ES identified by a program number and a PID. By using the count, descrambling is not concluded as long as the descrambling termination unit 4004 is not invoked in the number of times as the descrambling starting unit 2803 is invoked. However, it is also possible to have an implementation where the count is discontinued, and descrambling is concluded when the descrambling termination unit is used once, even if the descrambling starting unit is used three times. In that case, the side using the descrambling starting unit 2803 and the descrambling termination unit 4004, namely the stream information access libraries must be cautious so as not to terminate a descrambling which is still required. If not, the termination of the descrambling of an ES still requiring descrambling is possible. In order to avoid such a situation, it is also possible to have an implementation where the user of the descrambling starting unit 2803 and the descrambling termination unit 4004 is provided with a common service storage unit 4900 in which a count is performed.

Furthermore, although the descrambling status management unit 2801 in the present embodiment holds the set of a program number and a PID, and the count of such set, as it is possible to designate an ES with only a PID, an implementation that holds the PID and such count is also possible.

Furthermore, it is possible to have an implementation where the descrambling starting unit 2803 and the descrambling termination unit 4004 in the present embodiment do not receive the program number. In that case, as the designation of a PMT by a program number is not possible when the information of ESs described in a PMT is required or when the CA-PMT is used, all the PMTs are obtained, and from among these, the PMT matching the PID is picked out and used.

Moreover, although the descrambling starting unit 2803 and the descrambling termination unit 4004 in the present embodiment receive a single program number and a single PID, implementation is also possible even with a plurality of PIDs. In that case, the operation for individual ESs discussed in the present embodiment is repeated for the number of ESs, within the operating sequence for the descrambling starting unit 2803 and the descrambling termination unit 4004. Furthermore, in the case where it is desired to have all the ESs within a PMT represented by designating a service and omitting the PID designation, it is possible to have an implementation in which operations are carried out in such manner by simply designating only the program number.

By using the present embodiment, the descrambler can be used without concern over the Java program.

Fifth Embodiment

In the third embodiment, the descrambling starting unit 2803 can implement the simultaneous descrambling of a plurality of services for as long as there are descramblers. For example, in the case where there are ten services that include ten ESs, the simultaneous descrambling of all the services is possible if there are one hundred descramblers. Furthermore, a format where descrambling is implemented on a per ES basis rather than on a per service basis, and where only necessary ESs are descrambled is discussed in the fourth embodiment. These maximum values such as the number of services or ESs that can be descrambled simultaneously are dependent on the number of descramblers that can be used, regardless of whether or not the descrambler exists inside the terminal apparatus. For example, as in the procedure S5103 in FIG. 51, a judgment such as starting the descrambling when an available descrambler exists, is found within the operating sequence for the descrambling starting unit 2803. However, there are instances where the number of services that can be descrambled simultaneously is determined according to hardware limitations, software limitations, or the like. For example, in the first embodiment, the number of services that can be descrambled at the same time is fixed at one. For example, in a hardware configuration using the external adapter 1811, the maximum number of services that can be descrambled is determined depending on the external adapter 1811. In addition, as the external adapter 1811 can be detached and attached to the terminal apparatus 1800, pre-establishing the management of the maximum number of services is not possible for the terminal apparatus 1800. As such, a system for managing the maximum number of services is introduced in the present embodiment.

Figure 55:
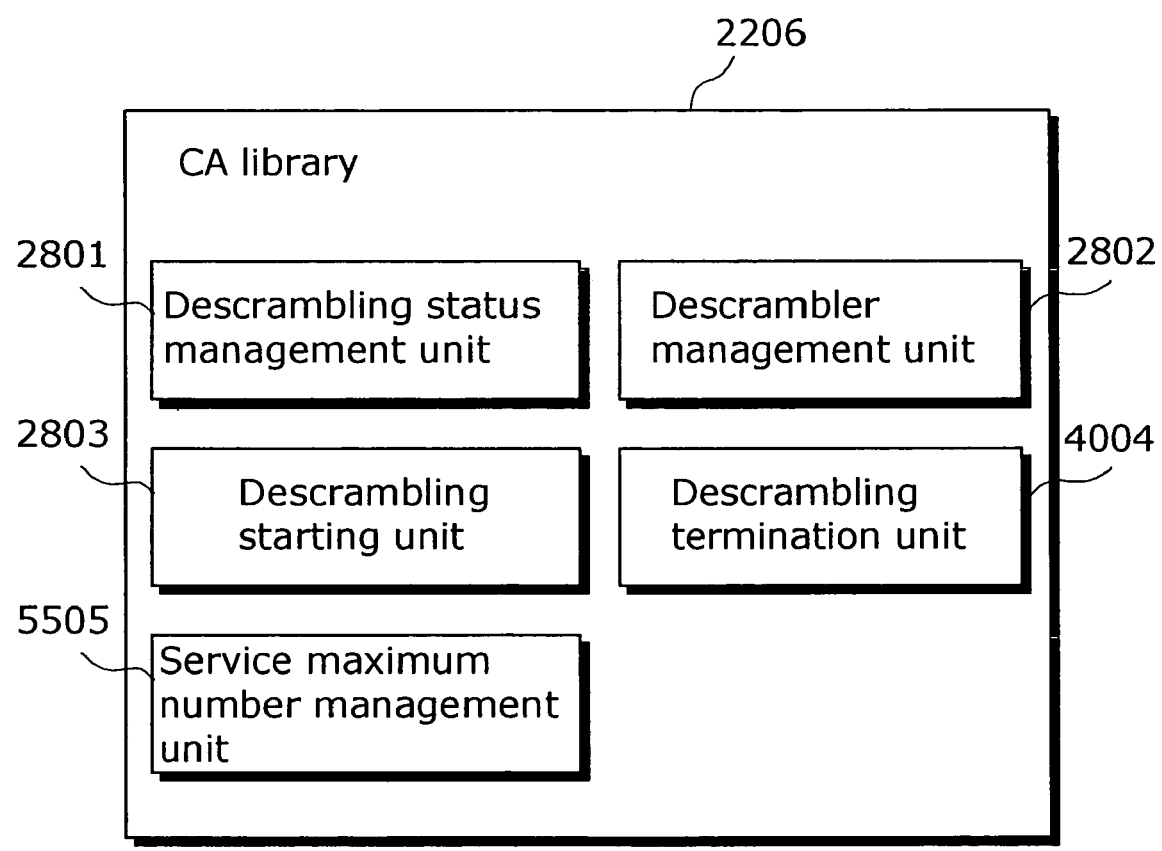
FIG. 55 is a diagram of the internal configuration of the CA library in the fifth embodiment.

In the present embodiment, a new service maximum number management unit 5505 is introduced in the CA library 2206, as in the configuration diagram in FIG. 55.

The service maximum number management unit 5505 holds the maximum number of services that can be descrambled simultaneously. For example, it holds "1" when only one service can be descrambled simultaneously, and holds "3" when up to three services can be descrambled simultaneously. In the case where, as in FIG. 16, the descrambler exists inside the terminal apparatus 1600, the service maximum number management unit 5505 is held in the ROM 1609 and referred to by the descrambling starting unit 2803. In the case where, as in FIG. 18, the descrambler exists in the external adapter 1800 outside the terminal apparatus 1800, it is held in the ROM inside the external adapter 1811, and referred to by a program operating in the external adapter 1811. Furthermore, even when the descrambler exists in the external adapter 1811, in the case where the terminal apparatus 1800 is able to obtain, in advance, the maximum number of services that can be descrambled simultaneously, from the external adapter 1811, it is possible to have a case where the service maximum number management unit 5505 is implemented by holding such value in the primary storage unit 1608 or the secondary storage unit 1607. In addition, in the case where the maximum number of services that can be simultaneously descrambled fluctuates dynamically, the service maximum number management unit 5505 can exist in the primary storage unit 1608 or the secondary storage unit 1607, and it possible to hold the dynamically fluctuating maximum value of services that can be simultaneously descrambled. The present invention can be applied in any of the cases.

In addition, a modification shall be made on the descrambling starting unit 2803 within the CA library 2206.

With regard to the descrambling starting unit 2803, the sequence is different depending on whether the service maximum number management unit 5505 exists in the terminal apparatus or in the external adapter. In the case where the service maximum number management unit 5505 exists in the terminal apparatus, the descrambling starting unit 2803 obtains the service maximum number from the maximum number management unit 5505 and also obtains the number of services being descrambled at that time from the descrambling status management unit 2801, upon receiving the designated program number. The two values are compared, and descrambling is started when the maximum number is larger. In the case where the service maximum number management unit 5505 exists in the external adapter 1811, when the external adapter 1811 receives a CA-PMT, the maximum number of the services that can be descrambled simultaneously is obtained from the service maximum number management unit 5505 by the program operating on the external adapter 1811, which implements the descrambling sequence, and furthermore, the number of descrambling being carried out at that point is obtained from the descrambler management unit 2802. The two values are compared, and descrambling is started when the maximum number is larger.

Even with regard to the present embodiment, either one or both the service manager 2204 as well as the stream information access library can carry out implicit descrambling, and such operating sequence for the service manager 2204 as well as the stream information access library is the same as that in the third embodiment and fourth embodiment.

According to the present embodiment, descrambling can be controlled, not by the maximum number of descramblers per se, but by the maximum number of services that can be descrambled simultaneously.

Sixth Embodiment

In the previous third to fourth embodiments, there are instances where a plurality of Java programs operates at the same time as services can be selected in a plurality. As the number of descramblers which can be used is limited, there is a limit to the services and ESs that can be descrambled simultaneously. As a result, contention for descramblers occurs when the limit is reached. In the present embodiment, the case where a plurality of Java programs simultaneously operates and simultaneously accesses information within a broadcast signal is assumed.

In the present embodiment, in a case such as this where a plurality of Java programs starts descrambling, a format which prioritizes the descrambling which is started first is assumed.

With regard to the third and fourth embodiments, the operating sequences of the descrambling starting unit 2803 and the descrambling termination unit 4004 already implement a first-one-wins format. In the case where pluralities of services as well as ESs are designated and descrambling is started, the simultaneous descrambling of a plurality of services can be carried out when there is an excess of descramblers. However, when there is no excess of descramblers, descrambling cannot start unless the descrambling that has started earlier concludes. In other words, in the case where the descrambling of a plurality of services is allowed, it is possible to respond to the first-one-wins format by using the CA library 2206 in the third embodiment as well as the fourth embodiment.

With regard to the first and second embodiments, the descrambling termination unit 4004 does not exist, and the operating sequence for the descrambling starting unit 2803 implements a last-one-wins format. In other words, the operating sequence is one in which a Java program which attempts to start descrambling later, can always start descrambling. In order to change this, a modification is made on the CA library 2206 used in the service first and second embodiments.

The descrambling starting unit 2803 within the CA library 2206 is modified. In addition, the descrambling termination unit 4004 is introduced.

Figure 56:
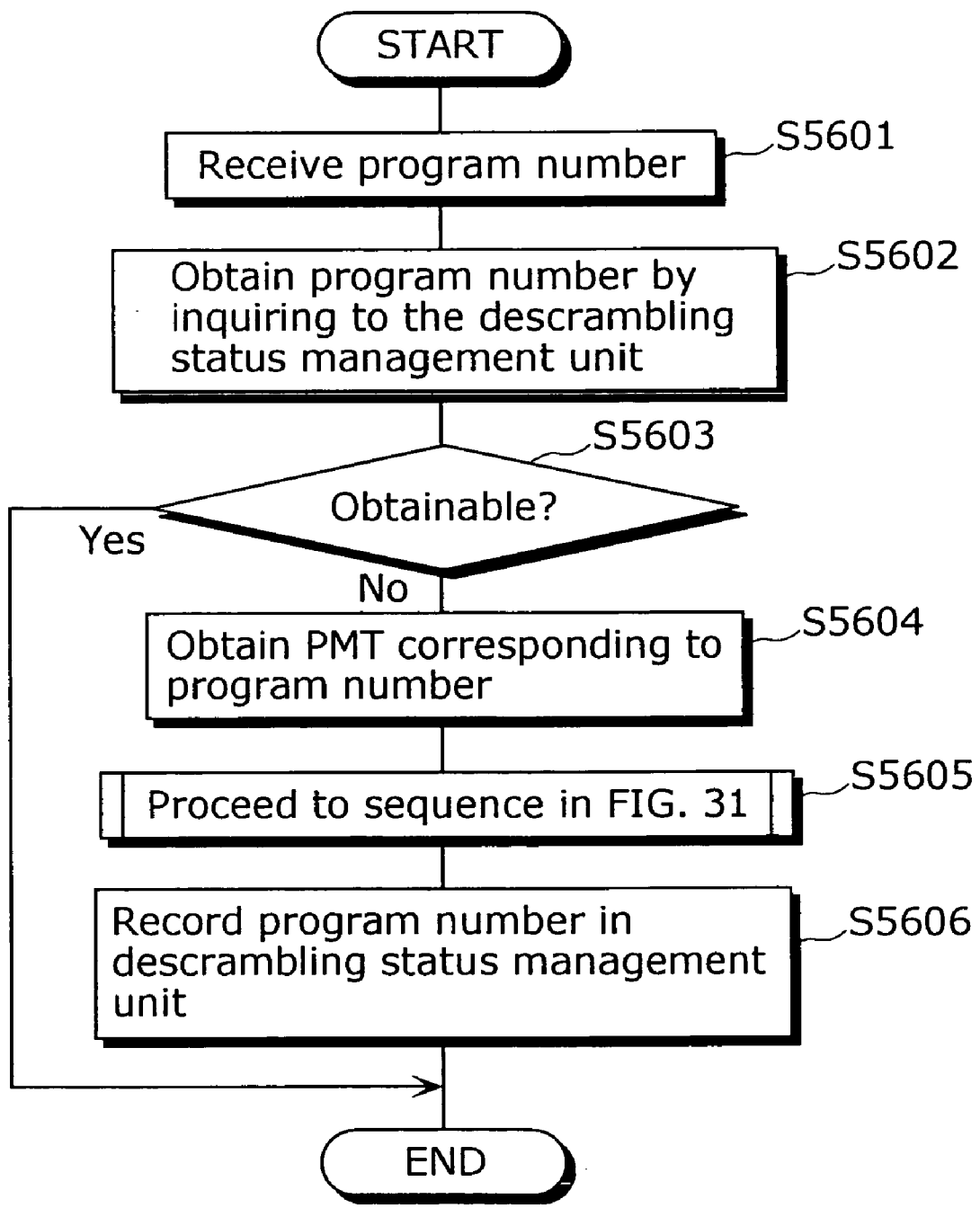
FIG. 56 shows a sequence for the descrambling starting unit in the sixth embodiment.

The operating sequence for the descrambling starting unit 2803 is changed from the sequences in FIG. 30 and FIG. 31 in the first embodiment, to the sequences in FIG. 56 and FIG. 31. As FIG. 31 is identical, explanation shall be omitted. In FIG. 56, first the program number is received (S5601), and the program number is obtained by inquiring to the descrambling status management unit 2801 (S5602). Here, as the program number can only be obtained when descrambling is already being started, it can be judged that descrambling is already started if the program number can be obtained, and that descrambling is not being carried out if the program number cannot be obtained. Such judgment is carried out (S5603) and if descrambling is already being carried out, the sequence is concluded without anything being done. If descrambling is not being carried out, the PMT is obtained (S5604), descrambling is started using the sequence in FIG. 31 (S5605), and the program number is recorded in the descrambling status management unit 2801 (S5606).

The operating sequence for the descrambling termination unit 4004 can be the same as that in the third embodiment.

In other words, if the descrambling for a designated program number is already being started, such descrambling is terminated.

Through the implementation of the above-mentioned configuration, a first-one-wins format can be implemented even in a hardware configuration in which simultaneous descrambling can be performed for only one service. For example, in the case where two Java programs (Java program 1, Java program 2) operate at the same time, when implicit descrambling is started as the Java program 1 starts the video and audio reproduction through the JMF 2205*a* first, even if the Java program 2 attempts to start the reproduction of video and audio included in another service by using the JMF 2205*a*, descrambling cannot be started for the service designated by the Java program 2 according to the judgment in the procedure S5603 in FIG. 56, as descrambling is already being carried out on the service designated by the Java program 1. The first-one-wins format is realized in this manner.

Seventh Embodiment

In the sixth embodiment, although an environment having a plurality of Java programs operating is assumed, in the case where contention for descramblers occurs, the right of use of the Java program that starts descrambling first is prioritized. In the present embodiment, a situation is assumed where a plurality of Java programs operates, and in addition, the respective Java programs are set with priority levels. FIG. 57 (1) shows a schematic diagram of this situation. A descrambler 5711, a descrambler 5712, and a descrambler 5713 are already being used by a Java program A 5701. At this point, in the case where a Java program B 5702 attempts to carry out the simultaneous descrambling of two ESs, descrambling cannot be started as only a descrambler 5714 exists as a descrambler which is not in use. Here, each Java program is set with a priority level and, in the case where the Java program B 5702 is set with a higher priority level than the Java program A 5701, in the present embodiment, the descrambling according to the Java program A 5701 is terminated and the descrambling according to the Java program B 5702 is started, as in FIG. 57 (2).

In the present embodiment, when contention for descramblers occurs among a plurality of Java programs, priority is given to the implicit descrambling associated with the use of an access library for information within a broadcast signal, by a Java program having a high priority level. In order to realize this, modifications are made to the descrambling status management unit 2801 and the descrambling starting unit 2803 in the previous embodiments. Furthermore, the descrambler management unit 2802 shall be the same as in the third embodiment.

Together with the program number and the counter, the descrambling status management unit 2801 records the priority level of the Java program using the stream information access library which is the basis for descrambling. In addition, in the case where a plurality of Java programs uses priority levels, the priority levels of all the Java programs are recorded.

Figures 58, 59:
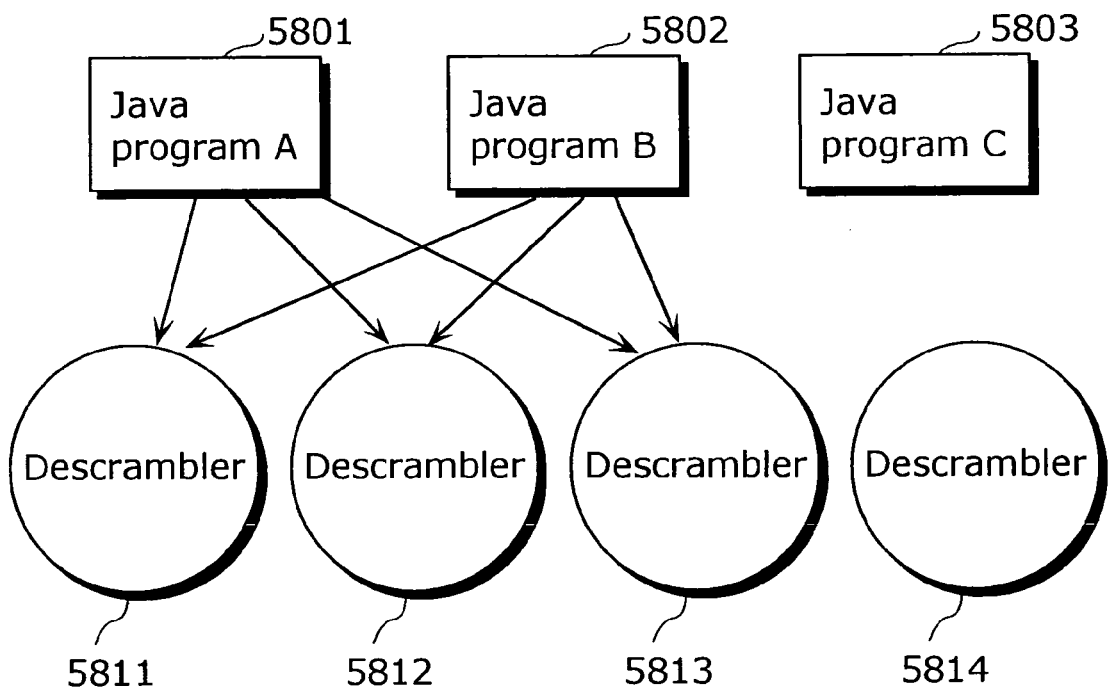
FIG. 58 is a schematic diagram of contention for a descrambler in the seventh embodiment.
FIG. 59 shows the appearance of the information holding of the descrambling status management unit in the seventh embodiment.

When descrambling is already being carried out, the descrambling starting unit 2803 implicitly terminates the descrambling already being carried out and starts a new descrambling in the case where the priority level of the program using the service manager management library 2205*f* or a stream information access library, which are the bases for the descrambling already being started, is lower than the priority level of the Java program newly using the service manager management library 2205*f* or a stream information access library. However, in the case where a service is already being descrambled from a plurality of Java programs, the descrambling status management unit 2801 records the priority levels of all such Java programs. FIG. 58 shows such a situation. In FIG. 58, a Java program A 5801 and a Java program B 5802 are carrying out the descrambling for a service with a program number of 101. The descrambling status management unit 2801 in this situation is as shown in FIG. 59. It indicates that the program with a program number of 101 is being descrambled by the Java program A 5801 having a priority level of "10" and the Java program B 5802 having a priority level of "20". At this time, when a Java program C 5803 attempts to start descrambling, a descrambler can be taken if the priority level of the Java program C 5803 exceeds 20. However, if the priority level of the Java program C 5803 is 20 or less, it cannot take a descrambler even if such priority level is higher than that of the Java program A 5801, as it is equal or lower than the priority level of the Java program B 5802.

Figure 60:
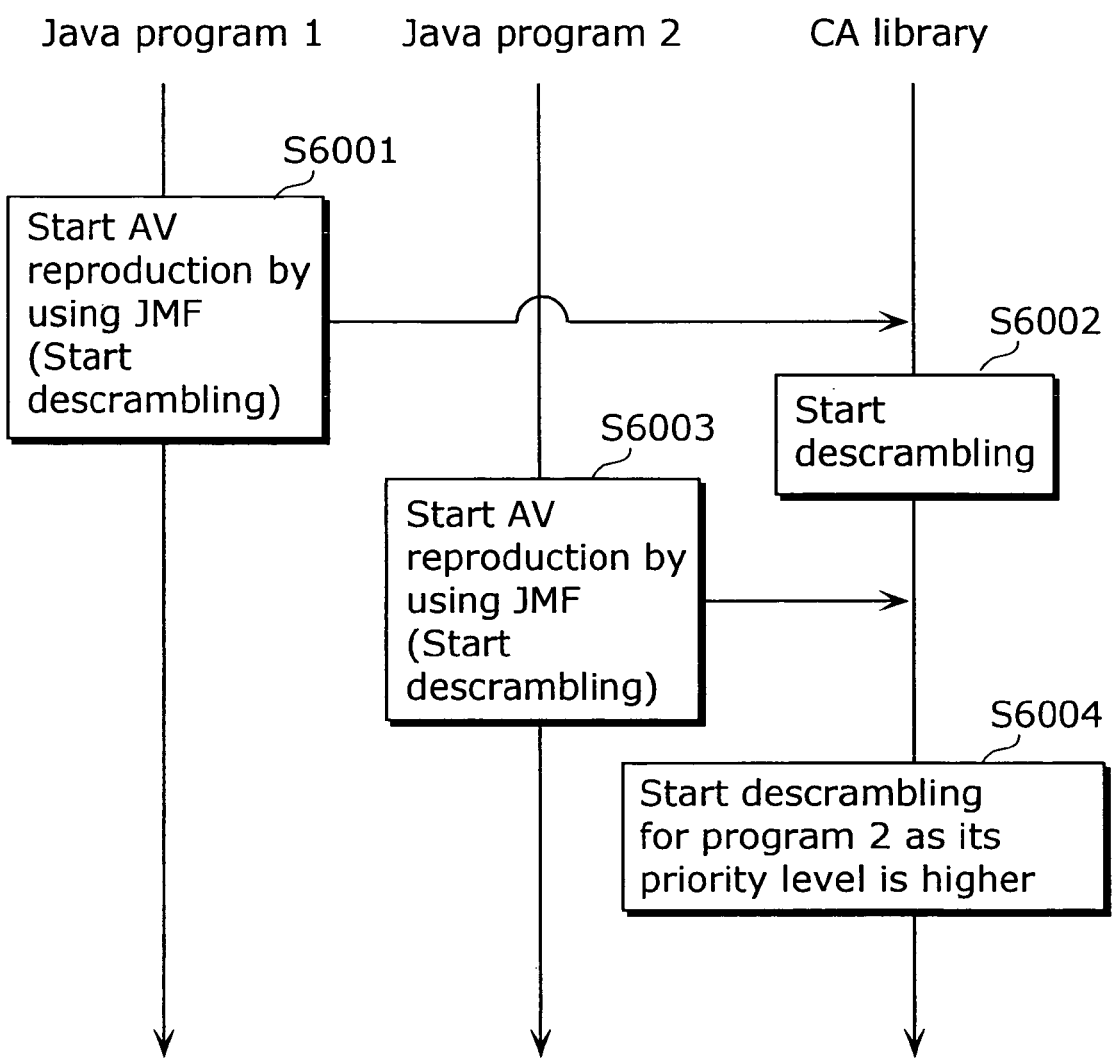
FIG. 60 shows an example of contention resulting from the descrambling of a plurality of programs, in the seventh embodiment.

FIG. 60 shows a diagram of the overall sequence in the present embodiment. A Java program 1 and a Java program 2 are two Java programs operating simultaneously on a broadcast receiving apparatus, with the Java program 2 having a higher priority. First, when the Java program 1 carries out video/audio reproduction by using the JMF 2205*a*, the JMF 2205*a* attempts to start descrambling implicitly by using the CA library 2206 (S6001). The CA library 2206 starts descrambling (S6002). Subsequently, when the Java program 2 attempts to carry out the reproduction of another video/audio (S6003) by using the JMF 2005*a*, the JMF 2205*a* attempts to start descrambling implicitly by using the CA library 2206 (S6004). The CA library 2206 compares the priority of the Java program 1 carrying out the descrambling that is already started with the priority of the Java program 2 attempting to carry out a new descrambling, and as the priority level of the Java program 2 is higher, it terminates the descrambling for the Java program 1 and starts the descrambling for the Java program 2.

Moreover, in the present embodiment, there are three types for the timing for carrying out implicit descrambling, namely, the case where it is performed upon only the service selection by the service manager 2204 as in the first embodiment, the case where it is performed upon the use of the stream information access library as in the second embodiment, or a case of both. The present invention can be applied for any of these. Furthermore, the present invention can be applied even when the simultaneous descrambling of a plurality of services is possible. In that case, the descrambling status management unit 2801 and the descrambler management unit 2802 are used are used, with those in the third embodiment as bases. Furthermore, the present invention can be applied even when the descrambling is on a per ES basis. In the case where the ES is used as the unit, the descrambling status management unit 2801 and the descrambler management unit 2802 are used, with those in the fourth embodiment as bases.

Furthermore, although the settlement of a contention using the priority levels among Java programs is discussed in the present embodiment, in the case where descrambling is started implicitly upon the service selection of the service manager 2204, aside from the use of the service manager management library 2205*f* by a Java program, there are also instances where service selection is started by the channel selection of a user using the EPG 2202. For that reason, priority levels are also set with regard to descrambling based on a service selection through the EPG 2202, and descrambling can be carried out using priority levels. For example, assume that a priority level which is higher than that of all the Java programs is given to the user. When the service selection brought about by the channel selection of a user using the EPG 2202 is started by the service manager 2204, priority is given over the descrambling arising from the use of the service manager management library 2205*f* or the use of the stream information access library by a Java program, and descrambling of the service is started. Furthermore, when one point within the range of priority levels that can be adopted by a Java program is set as the priority level of a user, a descrambler carrying out the descrambling started by a Java program having a priority level which is lower than such point can be taken. However, a descrambler carrying out the descrambling started by a Java program having a priority level that is higher than such point cannot be taken. In the aforementioned OCAP environment, a management Java program, having the highest priority level within the range that can be adopted by a Java program, operates on the broadcast receiving apparatus for the purpose of carrying out system management. If for example, the priority level of the user is higher than that of the management Java program, descrambling can be carried out with priority over the management Java program, and in addition, if it is lower than that of the management Java program, the descrambler used in the descrambling started by the management Java program can no longer be taken. By setting a priority level for the user in such manner, contention between a Java program and a user operation can be settled.

Furthermore, aside from the Java program and a user, there are instances where a stream information access library is used by the broadcast receiving apparatus. For example, in the aforementioned OCAP environment, the broadcast receiving apparatus uses the AM 2205*b* to constantly monitor information known as XAIT transmitted through the OOB. This includes information regarding abstract services, and there are cases where it is necessary to download the Java program included in the abstract service, when XAIT information is updated. In such case, it is necessary for the AM 2205*b* to download the files which make up the Java program using the DSM-CC 2205*d*. This is a usage of the stream information access library, neither by a Java program nor a user, but by a system on the broadcast receiving apparatus, and descrambling needs to be carried out if the MPEG-2 section transmitting the files making up the Java program is scrambled. As with a user operation, a unique priority level is also set with regard to a case such as this, and contentions can be settled by using such priority level in the case where a contention between a Java program, as well as a user operation occurs. The present invention can also be applied in such a case. For example, if a priority level which is higher than that of the Java programs or the user operation is set, descrambling is always prioritized and executable, in any situation. Furthermore, if the priority level is set higher than that of the Java programs but lower than that of the user, a descrambler can be taken from the descrambling started by a Java program, but a descrambler cannot be taken from the descrambling started by the user. Furthermore, if it is set at one point within the range of priority levels that can be adopted by a Java program, taking the descrambler from a Java program operating on a priority level higher than such point also becomes impossible.

Moreover, in considering priority levels, either the descrambling from the service manager 2204 or the descrambling from the stream information access library is judged, and contention settlement by priority levels can be carried out without affecting each other. For example, in the case where contention occurs during the use of the descrambling starting unit 2803 by a stream information access library, descrambling that has already started likewise by a stream information access library is checked, and contention settlement by priority levels is carried out, and with regard to descrambling already being carried out by the service manager 2204, this is not used in settling the contention even if descrambling with a lower priority level exists. In addition, it is also possible to have a format where, although contention settlement by priority levels can be done freely during the usage of the descrambling starting unit 2803 by the service manager 2204, contention settlement by priority levels is carried out only within descrambling by the stream information access libraries during the usage of the descrambling starting unit 2803 by a stream information access library. Inversely, it is also possible to have a format where, although contention settlement by priority levels can be done freely during the usage of the descrambling starting unit 2803 by a stream information access library, contention settlement by priority levels is carried out only within descrambling by the service manager 2204 during the usage of the descrambling starting unit 2803 by the service manager 2204.

Eighth Embodiment

In the first to seventh embodiments, there is no means for a Java program to know information regarding descrambling which has been implicitly started.

In addition, in the seventh embodiment, there are instances where an implicit descrambling based on a Java program having a relatively low priority level is terminated by a Java program having a high priority level. However, the Java program for which descrambling is terminated does not have a means to know of such event.

Figure 61:
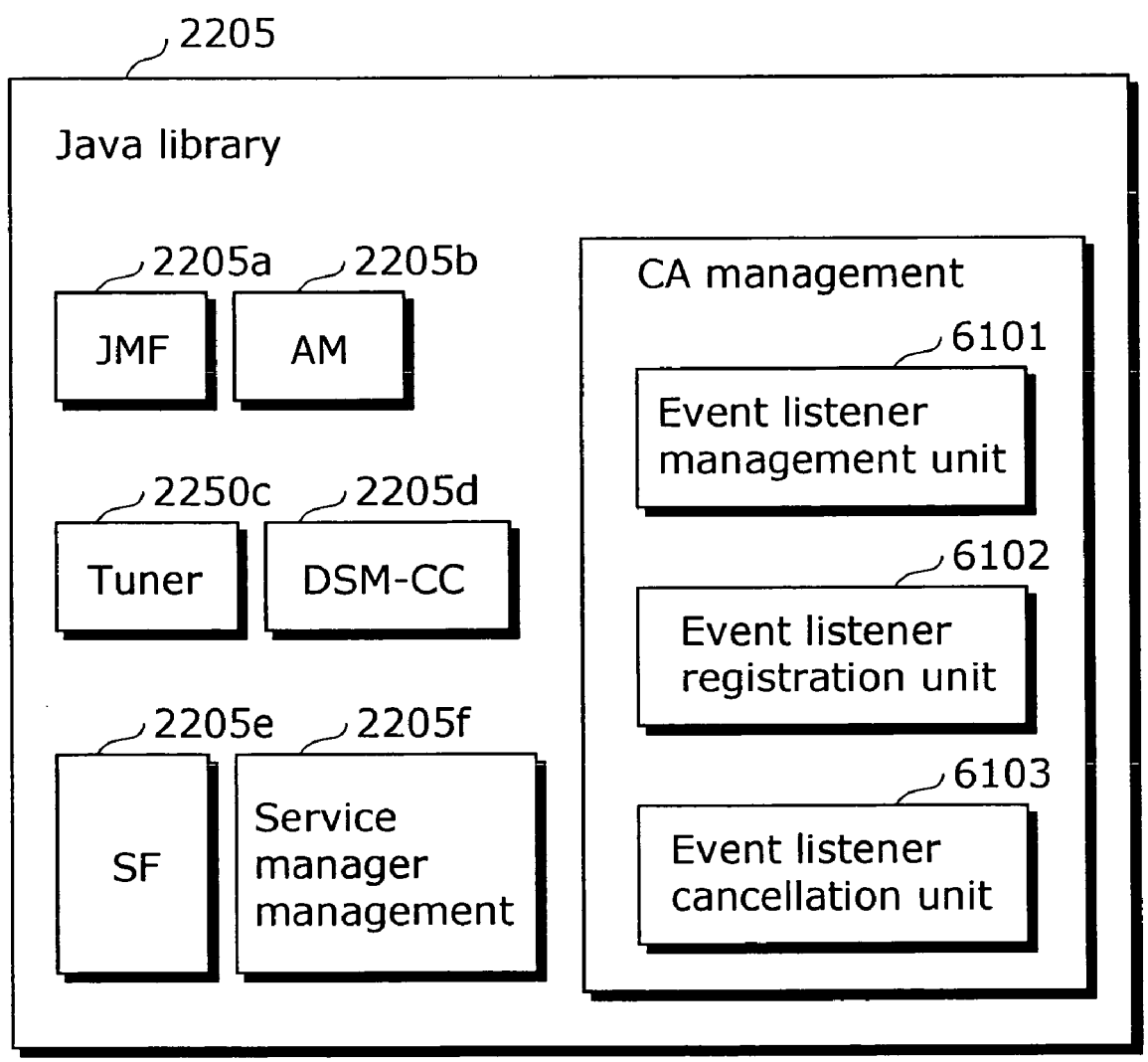
FIG. 61 is a configuration diagram of the Java library in the eighth embodiment.

In the present embodiment, a function for registering an event listener for recognizing a descrambling termination is provided to the Java program. FIG. 61 shows the internal configuration of the Java library 2205 in the present embodiment. A CA management library 6100 is provided inside the Java library 2205, inside of which an event listener management unit 6101, an event listener registration unit 6102, and an event listener cancellation unit 6103 are provided.

The event listener management unit 6101 is a module for holding an event listener registered by the Java program, and is recorded within the primary storage unit 1608. It has event listener registered by the event listener registration unit 6102, and has an event listener canceled by the event listener cancellation unit 6103. Furthermore, a notification is made to the event listener managed by the event listener management unit 6101, when descrambling is started/terminated by the use of the descrambling starting unit 2803 and descrambling termination unit 4004, within the CA library 2206.

The event listener registration unit 6102 is implemented as a library for the registration of an event listener by the Java program. It is held in the ROM 1609 and executed by the CPU 1606. An event listener registered by the event listener registration unit 6102 is managed by the event listener management unit 6101, and is used for the notification of an event regarding descrambling.

The event listener cancellation unit 6103 is implemented as a library for canceling an event listener registered in the event listener management unit 6101 by the Java program. It is held in the ROM 1609 and executed by the CPU 1606.

The event listener registration unit 6102 and the event listener cancellation unit 6103 are used by the Java program.

Moreover, the event for notification can also hold the reason for the event. For example, in the case of a descrambling termination event, a reason indicating why it was terminated can also be held. Furthermore, an event listener is not required to receive only descrambling termination events. Although in the present embodiment, notification of an event is made only when the descrambling is taken by another Java program, notification can also be made for a normal descrambling start event or a descrambling termination event resulting from a different reason, depending on the implementation.

Figure 62:
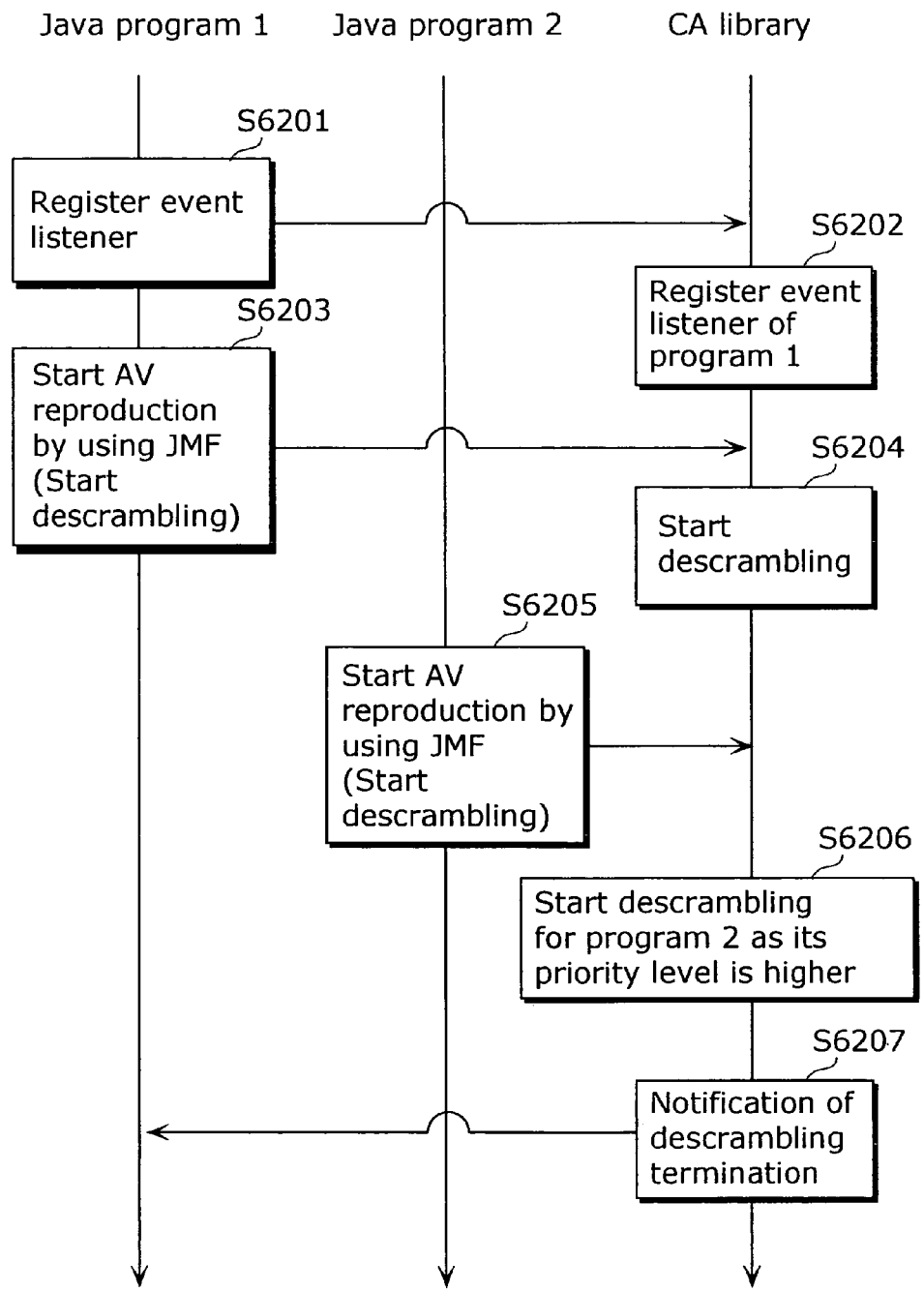
FIG. 62 shows an example of contention resulting from the descrambling of a plurality of programs, in the eighth embodiment.

FIG. 62 shows the sequence diagram for the present embodiment. A Java program 1 and a Java program 2 are two Java programs operating simultaneously on a broadcast receiving apparatus, with the Java program 2 having a higher priority. First, when the Java program 1 uses the event listener registration unit 6102 (S6201), the CA library 2206 registers the event listener in the event listener management unit 6101 (S6202). Next, when video/audio reproduction is carried out by the Java program using the JMF 2205a, the JMF 2205a implicitly attempts to start descrambling using the CA library 2206 (S6203). The CA library 2206 starts the descrambling (S6204). Subsequently, when the Java program 2 carries out the reproduction of a different video/audio using the JMF 2205a, the JMF 2205a implicitly attempts to start descrambling using the CA library 2206 (S6205). The CA library 2206 compares the priority of the Java program 1 performing the descrambling that is already started with the priority of the Java program 2 attempting to perform a new descrambling, and as the priority level of the Java program 2 is higher, it terminates the descrambling for the Java program 1 and starts the descrambling for the Java program 2 (S6206). At this point, as the descrambling of the Java program 1 is terminated, the event listener of the Java program 1 is notified that the descrambling is terminated (S6207).

Through to the present embodiment, the Java program is able to know the timing of descrambling start/termination.

Ninth Embodiment

In the eighth embodiment, a plurality of Java programs operates simultaneously, and the Java program with a low priority level acquires a means for registering/canceling an event listener to which notice is given of the termination of its descrambling in the case where a Java program with a high priority level terminates the descrambling of the Java program with a low priority level. In addition to that, in the present embodiment, in the case where the descrambling by the Java program with a high priority level is terminated, a notification to the effect that descrambling can be started, is made to the event listener set by the Java program with a low priority level which has had its descrambling terminated.

Figure 63:
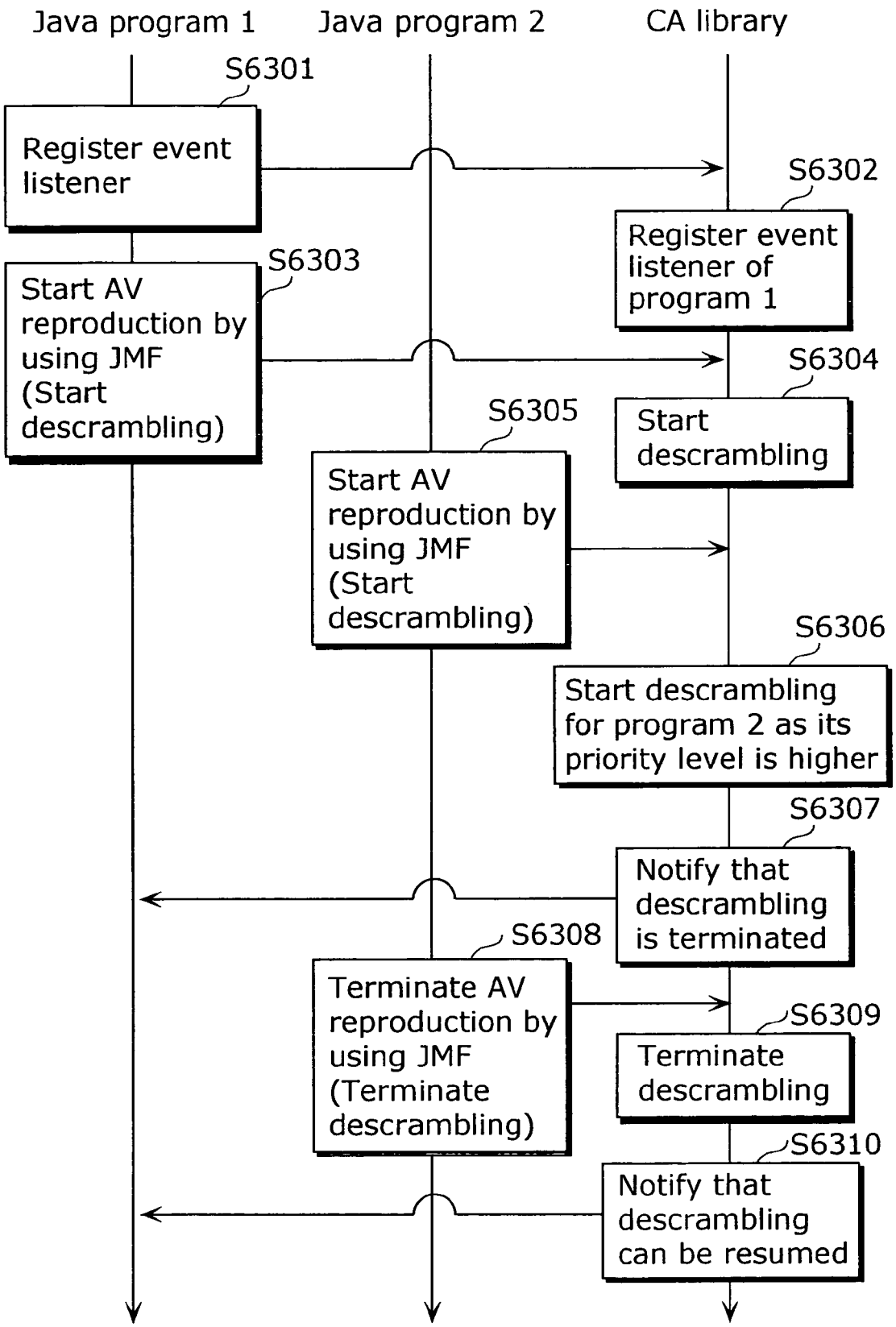
FIG. 63 shows an example of contention resulting from the descrambling of a plurality of programs, in the ninth embodiment.

FIG. 63 shows the sequence for the present embodiment. A Java program 1 and a Java program 2 are two Java programs operating simultaneously on a broadcast receiving apparatus, with the Java program 2 having a higher priority. First, when the Java program 1 uses the event listener registration unit 6102 (S6301), the CA library 2206 registers the event listener in the event listener management unit 6101 (S6302). Next, when video/audio reproduction is carried out by the Java program using the JMF 2205a, the JMF 2205a implicitly attempts to start descrambling using the CA library 2206 (S6303). The CA library 2206 starts the descrambling (S6304). Subsequently, when the Java program 2 carries out the reproduction of a different video/audio using the JMF 2205a, the JMF 2205a implicitly attempts to start descrambling using the CA library 2206 (S6305). The CA library 2206 compares the priority of the Java program 1 performing the descrambling that is already startedd with the priority of the Java program 2 attempting to perform a new descrambling, and as the priority level of the Java program 2 is higher, it terminates the descrambling for the Java program 1 and starts the descrambling for the Java program 2 (S6306). At this point, as the descrambling of the Java program 1 is terminated, the event listener of the Java program 1 is notified that the descrambling is terminated (S6307). After that, when the Java program 2 terminates the video/audio reproduction using the JMF 2205a, the JMF 2205a implicitly attempts to terminate descrambling using the CA library 2206 (S6308). The CA library 2206 terminates the descrambling (S6309), and a notification to the effect that descrambling can be resumed, is made to the Java program 1 (S6310).

Tenth Embodiment

In the eighth embodiment, a plurality of Java programs operates simultaneously, and the Java program with a low priority level acquires a means for registering/canceling an event listener to which notice is given of the termination of its descrambling in the case where a Java program with a high priority level terminates the descrambling of the lava program with a low priority level. In addition to that, in the present embodiment, in the case where the descrambling by the Java program with a high priority level is terminated, the descrambling required by the Java program with a low priority lever which has had its descrambling terminated, is implicitly started, and a notification to the effect that descrambling has been resumed is made to the event listener java program with a low priority level.

Figure 64:
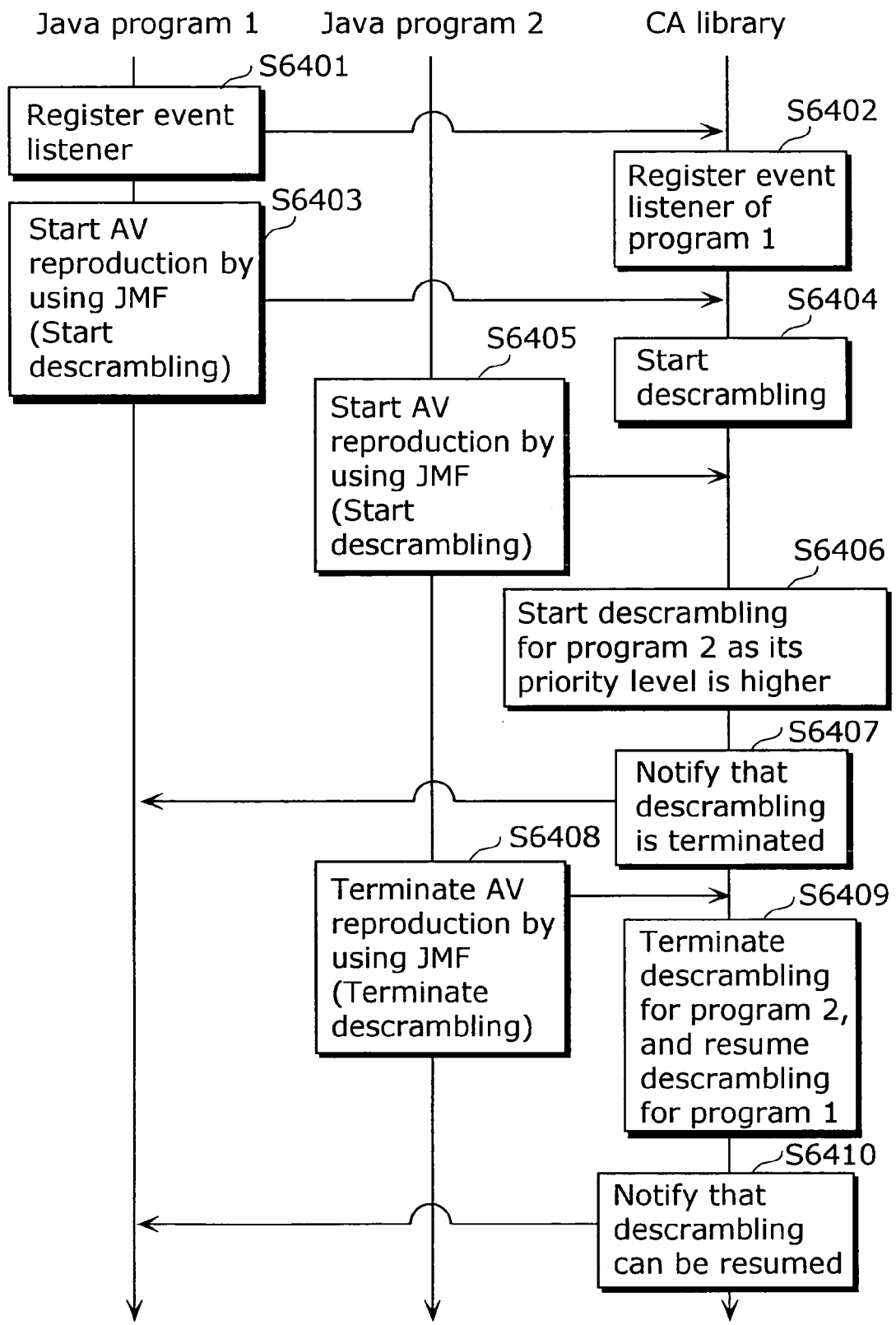
FIG. 64 shows an example of contention resulting from the descrambling of a plurality of programs, in the tenth embodiment.

FIG. 64 shows the sequence for the present embodiment. A Java program 1 and a Java program 2 are two Java programs operating simultaneously on a broadcast receiving apparatus, with the Java program 2 having a higher priority. First, when the Java program 1 uses the event listener registration unit 6102 (S6401), the CA library 2206 registers the event listener in the event listener management unit 6101 (S6402). Next, when video/audio reproduction is carried out by the Java program using the JMF 2205a, the JMF 2205a implicitly attempts to start descrambling using the CA library 2206 (S6403). The CA library 2206 starts the descrambling (S6404). Subsequently, when the Java program 2 carries out the reproduction of a different video/audio using the JMF 2205a, the JMF 2205a implicitly attempts to start descrambling using the CA library 2206 (S6405). The CA library 2206 compares the priority of the Java program 1 performing the descrambling that is already started with the priority of the Java program 2 attempting to perform a new descrambling, and as the priority level of the Java program 2 is higher, it terminates the descrambling for the Java program 1 and starts the descrambling for the Java program 2 (S6406). At this time, as the descrambling of the Java program 1 is terminated, the event listener of the Java program 1 is notified that the descrambling is terminated (S6407). After that, when the Java program 2 terminates the video/audio reproduction using the JMF 2205a, the JMF 2205a implicitly attempts to terminate descrambling using the CA library 2206 (S6408). The CA library 2206 terminates the descrambling and resumes the descrambling for Java program 1 (S6409), and the Java program 1 is notified of the resumption of descrambling (S6410).

Using the present embodiment, the Java program is able to know by notification, when the descrambling for the stream information access it is performing is terminated, and furthermore, when such can be resumed.

Eleventh Embodiment

In the seventh embodiment, a plurality of Java programs operates simultaneously, and a Java program with a high priority level terminates the descrambling of a Java program with a low priority. In addition to that, in the present embodiment, in the case where the descrambling by the Java program with a high priority level is terminated, the descrambling required by the Java program with a low priority lever which has had its descrambling terminated, is implicitly started. In the tenth embodiment, a notification is made to the event listener at this point. However, in the present embodiment, a notification is not carried out.

Figure 65:
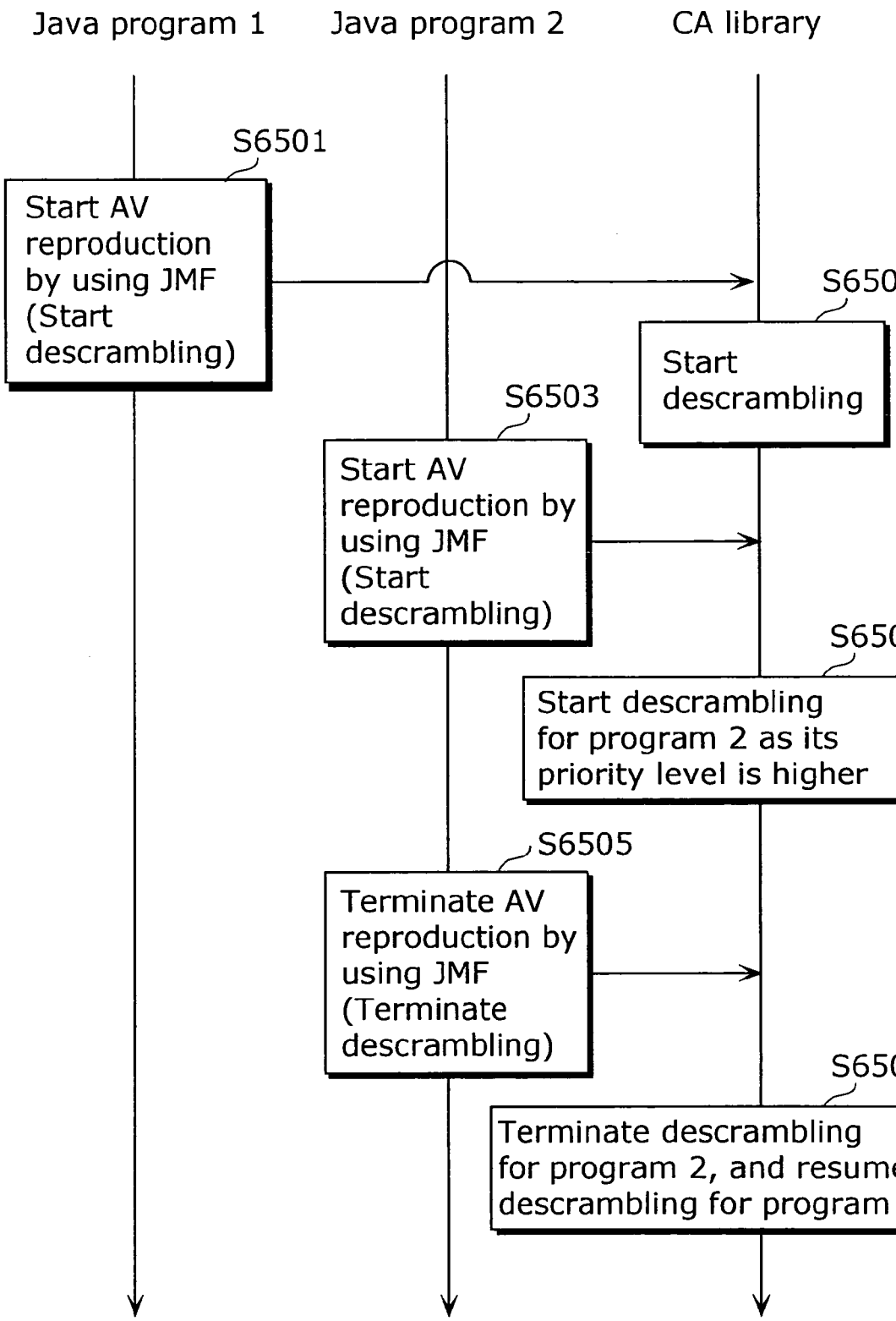
FIG. 65 shows an example of contention resulting from the descrambling of a plurality of programs, in the eleventh embodiment.

FIG. 65 shows the sequence for the present embodiment. A Java program 1 and a Java program 2 are two Java programs operating simultaneously on a broadcast receiving apparatus, with the Java program 2 having a higher priority. First, when video/audio reproduction is carried out by the Java program using the JMF 2205a, the JMF 2205a implicitly attempts to start descrambling using the CA library 2206 (S6501). The CA library 2206 starts the descrambling (S6502). Subsequently, when the Java program 2 carries out the reproduction of a different video/audio using the JMF 2205a, the JMF 2205a implicitly attempts to start descrambling using the CA library 2206 (S6503). The CA library 2206 compares the priority of the Java program 1 performing the descrambling that is already started with the priority of the Java program 2 attempting to perform a new descrambling, and as the priority level of the Java program 2 is higher, it terminates the descrambling for the Java program 1 and starts the descrambling for the Java program 2 (6504). After that, when the Java program 2 terminates the video/audio reproduction using the JMF 2205a, the JMF 2205a implicitly attempts to terminate descrambling using the CA library 2206 (S6505). The CA library 2206 terminates the descrambling and resumes the descrambling for Java program 1 (S6506).

Using the present embodiment, even when a Java program has its descrambling taken by a Java program with a higher priority level, descrambling can be automatically restored when such use is terminated.

Twelfth Embodiment

In the first to eleventh embodiments, the CA library 2206 is used when the broadcast receiving apparatus implicitly performs descrambling, and its use is not possible for the Java program itself. In the present embodiment, the CA library is made available for the Java program, and the Java program can perform descrambling on its own. On this occasion, first the CA library becomes a library making use of the Java language. Furthermore, four types of timing exist in the previous embodiments for the start of descrambling, namely, "the channel selection by a user using the EPG 2202", "the use of the service manager management library 2205f by a Java program", "the use of a stream information access library by a Java program", and "the use of a stream information access library by the broadcast receiving apparatus". However, in the present embodiment, implicit descrambling is not started during "the use of the service manager management library 2205f by a Java program" and "the use of a stream information access library by a Java program". In this case, the Java program itself starts descrambling by using the CA library 2206.

Figure 66:
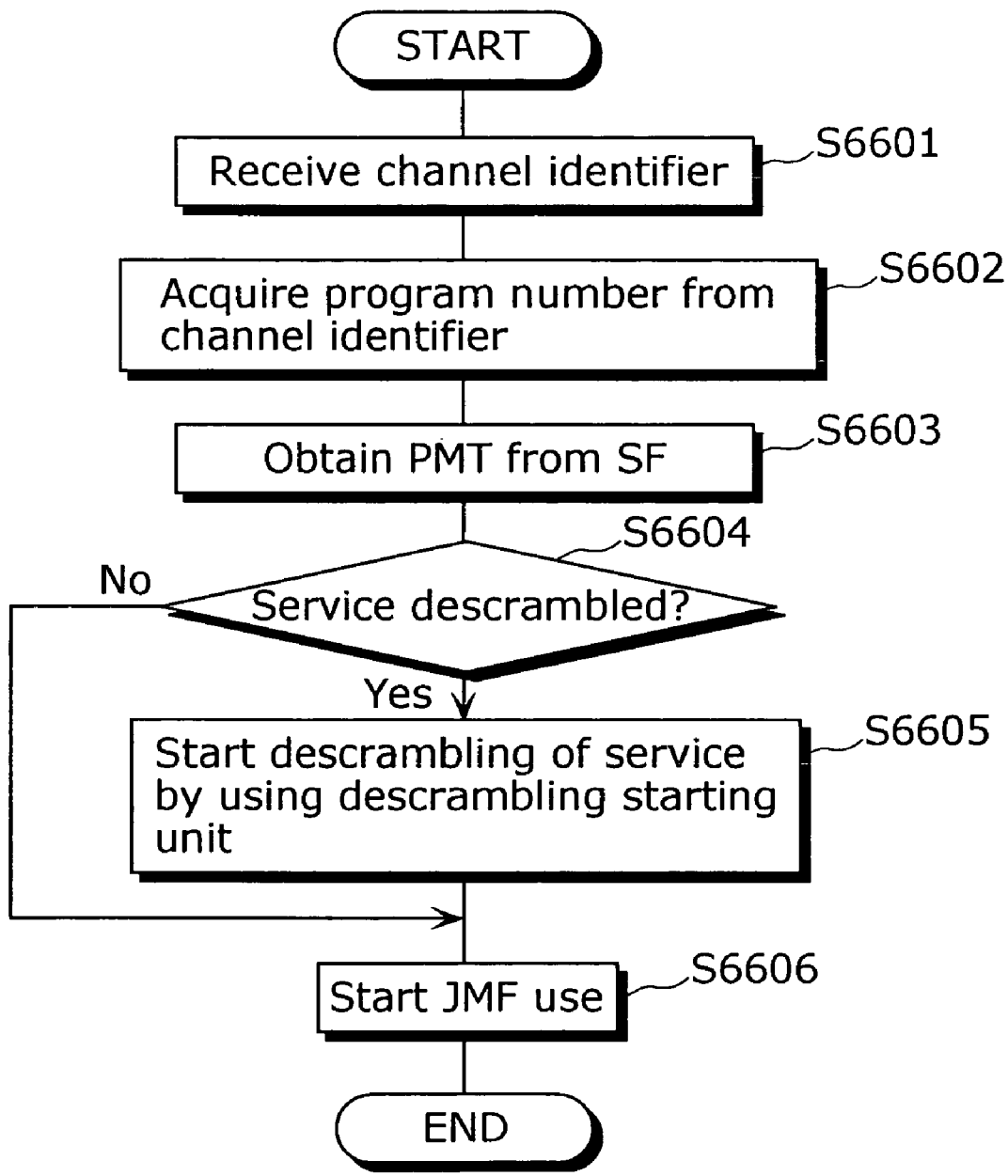
FIG. 66 shows a sequence for the use of the descrambling starting unit by a Java program, in the twelfth embodiment.

FIG. 66 shows, as a simple example, the operation sequence in which the Java program descrambles using the mechanism of the CA library 2206, and uses video and audio. When a channel identifier is obtained (S6601), the program number is obtained from the channel identifier (S6602). The PMT is obtained using the SF 2205e (S6603) as it is an environment where the PMT is not scrambled. If a CA descriptor is included and scrambling has been performed (S6604), descrambling of the service is started using the descrambling starting unit 2803 (S6605). After that, the reproduction of video/audio is started using the JMF 2205a.

Moreover, all the mechanisms based on implicit descrambling start/termination in the previous embodiments can also be applied even in the form where the Java program itself uses the CA library 2206. All items discussed in the previous embodiments such as the handling of descrambling in ES units, the handling of contention among a plurality of programs, the handling of contention with the broadcast receiving apparatus, and so on, can also be applied during the use of the CA library 2206 by the Java program itself.

For example, in the environment in the seventh embodiment where a plurality of Java programs are executed simultaneously, in the case where a Java program starts descrambling using the descrambling starting unit 2803 within the CA library 2206, the priority level of the Java program itself is recorded in the descrambling status management unit 2801, and priority level judgment is carried out during a contention. In addition, even with regard to the event listener notification mechanism introduced in the eighth embodiment, a notification can be received upon the start and termination of descrambling, by the addition of the event listener registration unit 6102. The descrambling in service/ES units as discussed in the first to fourth embodiment is also possible. Furthermore, the implementation format where all descrambling started by a Java program are concluded when the Java program concludes, and the implementation format where all descrambling for Java programs belonging to a service are terminated upon the conclusion of such service, as discussed in the third embodiment, are also possible.

Thirteenth Embodiment

In the twelfth embodiment, it is assumed that the Java program is able to use the CA library 2206. As a result, the Java program uses the CA library 2206 on its own and is able to perform descrambling. Even in this case, there are still instances where the descrambling started by the Java program is taken by the descrambling resulting from "the channel selection by a user using the EPG 2202" and "the use of a stream information access library by the broadcast receiving apparatus". As only the priority level of the Java program was noted in the previous embodiments, it is not possible for a Java program to designate the service for which descrambling is to be terminated in the case where the Java program carries out descrambling of a plurality of services.

In the present embodiment, modification is done on the descrambling status management unit 2801 and the descrambling starting unit 2803, and the Java program can set a priority level on the descrambling it has started.

The descrambling status management unit 2801 records, not only the priority level of the Java program, but also the priority level designated by the Java program.

During the settlement of a contention for a descrambler, the descrambling starting unit 2803 obtains the descrambling that are started by the Java program having the lowest priority level among the Java programs already having started descrambling. In addition, descrambling is terminated from among these, in sequence beginning from the one designated by the Java program with the lowest priority level for descrambling.

Consequently, as descrambling is terminated in sequence from the descrambling having the lowest priority level among the descrambling started at that time, the Java program can designate the termination sequence for the descrambling that it starts.

Fourteenth Embodiment

In the fifth embodiment, the service maximum number management unit 5505 is present, and the maximum number of services is managed using the service maximum number management unit 5505. However, in the case where the external adapter 1811 is used as in FIG. 18, the maximum number of services is not known in advance, and there are cases where it is not known whether a service can be descrambled or not until the CA-PMT which is a "query" descrambling control flag, is actually transmitted to the external adapter 1811. Before actually transmitting the CA-PMT message for starting descrambling to the external adapter 1811, the descrambling starting unit 2803 in the present embodiment establishes communication with the external adapter and inquires whether or not it is possible to start the descrambling of the ESs included in the service. If it is possible, the descrambling starting unit 2803 transmits the CA-PMT message for starting the descrambling to the external adapter 1811. It should be noted that even in the present embodiment, as in the third embodiment, the descrambling termination unit 4004 is used in the case where descrambling started by the service manager 2204 as well as the stream information access library using the descrambling starting unit 2803, is no longer required by the service manager 2204 as well as the stream information access library. Consequently, descrambling status can be properly managed at all times.

Figure 67:
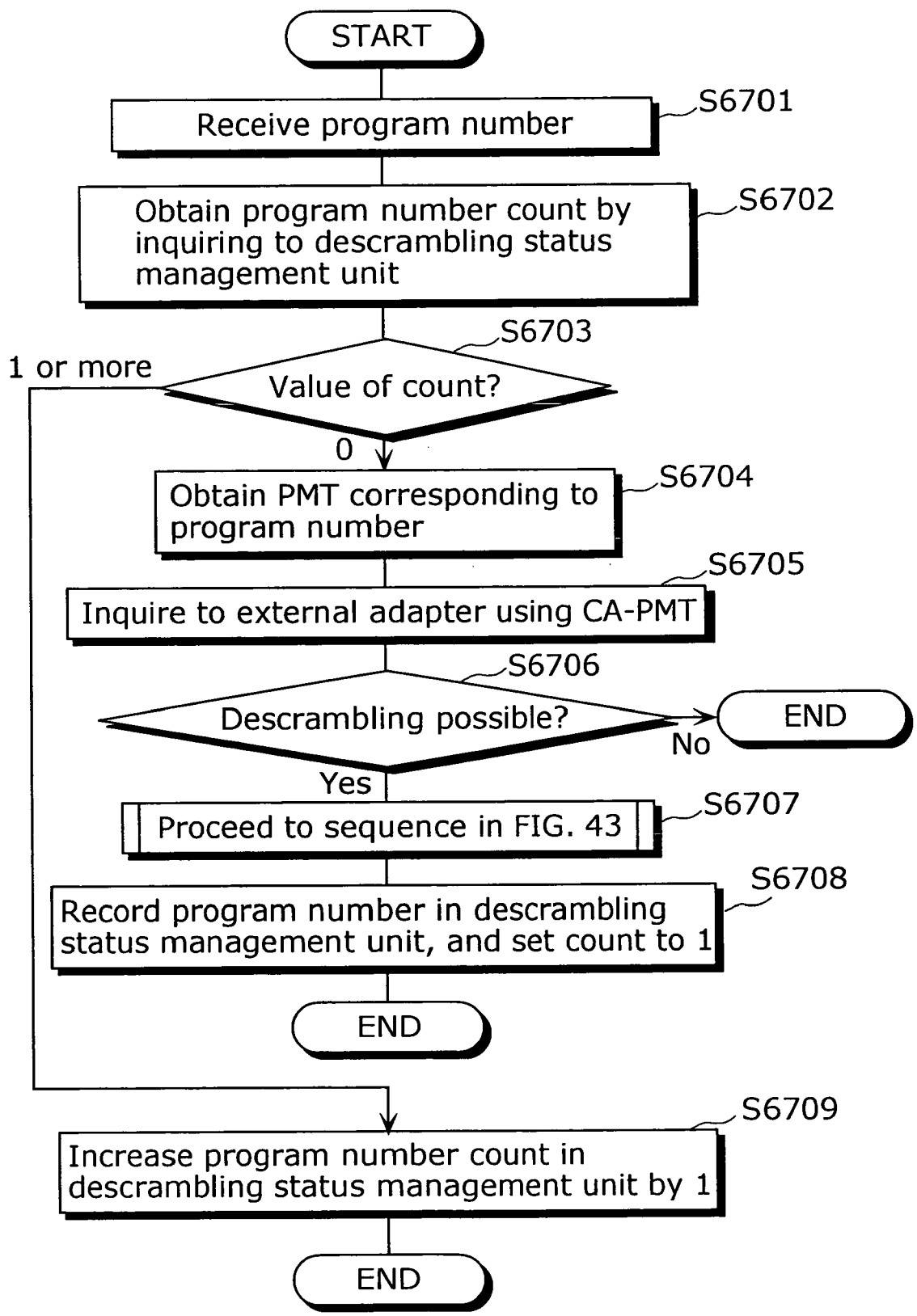
FIG. 67 shows the sequence when the descrambling starting unit inquires, to the external adapter, as to whether or not descrambling is possible, in the fourteenth embodiment.

FIG. 67 shows the operating sequence for the descrambling starting unit 2803 in the present embodiment. FIG. 67 exemplifies the case in which the external adapter 1811 is a POD. First, a program number is received (S6701), and the count that has been stored as a set with the designated program number is obtained by inquiring to the descrambling status management unit 2801 (S6702). This value is judged (S6703), and if the count is 1 or more and descrambling is already started, the count managed by the descrambling status management unit 2801 is increased by 1 (S6709) and the sequence is concluded. If the count is 0 and descrambling has not yet started, the PMT corresponding to the program number is first obtained in order to start descrambling (S6704). Here, the example is given of the case where the external adapter 1811 is a POD, and when the POD sets the descrambling control flag of the CA-PMT as a "query", the specification becomes one for replying whether or not the ESs included in the service represented by the CA-PMT can be descrambled. As such, such the CA-PMT is configured based on the PMT obtained in S6704, and transmitted to the external adapter 1811, then the reply is received (S6705). Next, the reply is judged (S6706). If descrambling is not possible, descrambling is abandoned. If descrambling is possible, a CA-PMT with a descrambling control flag set as "start" is transmitted to the external descrambler 1811, and the sequence proceeds to that in FIG. 43 (S6707). In the sequence in FIG. 43, the descrambling program operating in the external adapter is executed and actual descrambling is started. Detailed explanation of the sequence in FIG. 43 shall be omitted as explanation has already been carried out in the earlier embodiments. Upon the conclusion of the sequence in FIG. 43, the count corresponding to the designated program number, managed by the descrambling status management unit 2801, is set to 1 (S6708) and the sequence is concluded. It should be noted that it is also possible to have an implementation where, instead of waiting for the conclusion of the sequence in FIG. 43, S6708 in FIG. 67 is carried out in parallel.

When the descrambling starting unit 2803 used in the present embodiment is used, in the case of a configuration using the external adapter 1811 as in FIG. 18, whether or not descrambling is possible can be judged by inquiring to the external adapter 1811, itself.

Fifteenth Embodiment

In the seventh embodiment, in an environment where one or more services can be simultaneously descrambled, descrambling is started upon the service selection by the service manager 2204 as well as upon the use of a stream information access library. In addition, through the introduction of the concept of priority levels, the descrambling by a Java program holding a higher priority level is prioritized. In the present embodiment, as basis for descrambling prioritization, a service chosen through the service selection by the service manager 2204 is prioritized over a service accessed using the stream information access library.

In order to implement this mode, the descrambling status management unit 2801 is modified to hold, along with the program number, counter, and Java program priority level, a flag indicating whether the descrambling is triggered by a service selection or a stream information access library. FIG. 68 shows the chart managed by the descrambling status management unit 2801. A column 6801 indicates the program number of the service being descrambled. A column 6802 indicates the counter for counting how many programs are requesting descrambling. A column 6803 indicates the priority level of the Java program requesting the descrambling. A column 6804 is a call source distinguishing flag describing whether descrambling is triggered by the service manager or the stream information access library. Furthermore, each of rows 6811 to 6814 indicates information for one service. In FIG. 68, four services are being descrambled at this point, and the descrambling of the service indicated in row 6811 is started due to a service selection. Descrambling for the services indicated by the rows 6812 to 6814 is started due to stream information accessing. Moreover, there is a possibility that the descrambling for a single service is brought about by a plurality of Java programs. In this case, the priority levels of the plurality of Java programs as well as the call source distinguishing flags are held for each service.

When a service for which descrambling is to be terminated must be determined, in the case where an instruction for descrambling, together with a program number, has been given by the service manager 2204 but a new descrambling of a service cannot be started unless the descrambling of a service already being descrambled is terminated, the descrambling starting unit 2803 first obtains, from the descrambling status management unit 2801, information on the services being descrambled at that time. From among the obtained services currently being descrambled, services for which descrambling is started implicitly by calling a stream information access library are selected as "descrambling termination candidates". From among such services, one service being descrambled by a Java program having the lowest priority level is further selected, and its descrambling terminated. Subsequently, the descrambling starting unit 2803 starts the descrambling of the service instructed by the service manager 2204.

For example, when the service manager newly requests for a descrambling of a service with the program number "500" in the case where the status of descrambling is the situation shown in FIG. 68, the descrambling is terminated for the service in row 6814 which was started by the Java program with the lowest priority level among the services in the rows 6812 to 6814 for which the start of descrambling was triggered by a stream information access library.

When a service for which descrambling is to be terminated must be determined, in the case where an instruction for descrambling, together with a program number, has been given by the stream information access library but a new descrambling of a service cannot be started unless the descrambling of a service already being descrambled is terminated, the descrambling starting unit 2803 first obtains, from the descrambling status management unit 2801, information on the services being descrambled at that time. From among the obtained services currently being descrambled, services for which descrambling is started implicitly by calling a stream information access library are selected as "descrambling termination candidates". In addition, a comparison of priority levels is carried out among such services, and if there is a service being descrambled by a Java program having a priority level that is lower than the priority levels of Java programs using the stream information access library, the descrambling of such service is terminated. Subsequently, the descrambling starting unit 2803 starts the new descrambling of the service instructed by the stream information access library.

For example, when the stream information access library newly requests for a descrambling of a service with the program number "500" in the case where the status of descrambling is that shown in FIG. 68, the descrambling is terminated for the service in row 6814 which was started by the Java program with the lowest priority level among the services in the rows 6812 to 6814 for which the start of descrambling was triggered by a stream information access library.

It should be noted that in the case where the service information held by the descrambling status management unit 2801 shows that a service being accessed by a plurality of Java programs exists in the aforementioned process for determining the service for which descrambling is to be terminated, descrambling is not terminated if there is even one descrambling carried out based on a descrambling start request from the service manager 2204. In addition, with regard to a service for which descrambling start was triggered only as a descrambling based on a descrambling start request from a stream information access library, the priority of the Java program having the highest priority among those recorded is selected as the priority level of such service. For example, in the case of FIG. 69, descrambling for row 6911 will not be terminated as the descrambling request of the service manager 2204 is being carried out. With regard to row 6912, the start of descrambling was triggered by a stream information access library, and furthermore, as the stream information access library is used by Java programs having priority levels of "127" and "64", the priority level "127" is adopted.

In the present embodiment, termination of the descrambling of a service started by the service manager 2204 using the descrambling starting unit 2803, when the stream information access library attempts to start descrambling using the descrambling starting unit 2803, is eliminated. Consequently, it can be guaranteed that the descrambling of a service selected by the service manager 2204 is continued until the selection by the service manager 2204 is cancelled.

For example, if descrambling is terminated in midstream when ESs belonging to a certain service are recorded onto a semiconductor memory such as an HDD, BD, DVD, or SD, there are cases where recording cannot be properly continued. In the environment adopting the present embodiment, when the service manager 2204 selects the service including the ESs to be stored, unintentional termination of the descrambling can be prevented as the descrambling will not be terminated until such selection is cancelled.

Moreover, in the present embodiment, the service selected by the service manager 2204 is guaranteed of definitely being descrambled. However, it is also possible to have an implementation where even a service for which descrambling is started through the service manager 2204 is subjected to priority level evaluation as a descrambling termination candidate, in the same manner as a service for which descrambling is started through the stream information access library. In this case, the call source distinguishing flag is not required in the descrambling status management unit 2801, and judgment is performed simply by priority level evaluation only. In this case, descrambling is always carried out according to the request of a Java program with a high priority level. The service for which descrambling is started by the service manager 2204 is not given special preference and descrambling can no longer be guaranteed, even for a service that is currently selected.

Moreover, "the cases where a new descrambling of a service cannot be started unless descrambling of a service already being descrambled is terminated" considered in the present embodiment are the case in the fifth embodiment where the maximum number of services that can be simultaneously descrambled is exceeded, and the case in the fourteenth embodiment where a notification that descrambling is not possible is returned from the external adapter 1811 in procedure S6705 in FIG. 67.

It should be noted that in the present embodiment, in the case where the maximum value for the services that can be simultaneously descrambled is exceeded when the stream information access library is called, the descrambling starting unit 2803 selects a service for descrambling termination from among "services for which descrambling was started through a request to the descrambling starting unit 2803 by the stream information access library". At this time, although services for termination are selected using a judgment according to priority levels, various methods for such selection can be considered. For example, responses such as "descrambling started earlier is not terminated and descrambling requested later is not carried out (first-one-wins)" and "termination of the service for which descrambling was started out the earliest (First In First Out)" can be considered.

It should be noted that in the present embodiment, in the case where the maximum value for the services that can be simultaneously descrambled is exceeded when the stream information access library is called, the service for descrambling termination is selected from among the "services for which descrambling was started through a request to the descrambling starting unit 2803 by the stream information access library". However, there are also cases where prohibiting the taking of a descrambling is desired, even for descrambling started by the stream information access library. For example, although termination of the descrambling of a service including video/audio currently being reproduced using the JMF 2205*a* is not desired, the descrambling of a service referring to data using the SF2205*e* may be taken. In order to realize this, it is possible to have an implementation where the descrambling status management unit 2801 additionally records the type of the stream information access library which started the descrambling, and the descrambling started by a pre-determined stream information access library is not terminated, during the selection of the service for descrambling termination. For example, in the case of an implementation where the descrambling started by the JMF 2205*a* is not terminated, a service for which descrambling is started by the service manager 2204, as well as the JMF 2205*a*, using the descrambling starting unit 2803 is excluded during the determination of a service for descrambling termination. In addition, in the case of an implementation where descrambling started by the service manager 2204 is not included in the descrambling termination candidates described earlier, only the previously determined stream information access library is given special preference and only the descrambling started using such stream information access library is excluded from being a descrambling termination candidate.

In addition, even for descrambling started by the same JMF 2205*a*, there are cases where, for example, the termination of descrambling for a certain service A is not desired, whereas descrambling for a certain service B may be terminated. In order to realize this, it is possible to have an implementation where the descrambling status management unit 2801 additionally holds a descrambling terminable flag for each program number. At this point, when the stream information access library uses the descrambling starting unit 2803 to start the descrambling of the service A, the descrambling terminable flag is set at OFF, and when the descrambling of the service B is started, the descrambling terminable flag is set at ON. Subsequently, when the descrambling starting unit 2803 is required to select a service for which descrambling is to be terminated, the service with the descrambling terminable flag turned OFF is excluded from being a descrambling termination candidate. Through an implementation in this manner, it becomes possible to respond to cases where the termination of descrambling of a specific service is not desired. In addition, in the case of an implementation where descrambling started by the service manager 2204 is not included in descrambling termination candidates described earlier, only a service for which descrambling is started by the stream information access library, having the descrambling terminable flag set at OFF, is excluded from being a descrambling termination candidate. Furthermore, in an implementation where descrambling started by the service manager 2204 is not included in descrambling termination candidates, and the service manager 2204 can also set a descrambling terminable flag, it is possible to have an implementation where only a specific service selected by the service manager 2204 is excluded from being a descrambling termination candidate.

It should be noted that in the present embodiment, the service manager 2204 can simultaneously select any number of services. For example, in the case where the number of services that can be simultaneously descrambled is "5" and the number of services that the service manager 2204 can simultaneously select is "2", when the service manager 2204 already starts the descrambling of two services using the descrambling starting unit 2803, the number of services that can be simultaneously descrambled by the stream information access library using the descrambling starting unit 2803 is three. For example, in the case where the number of services that can be simultaneously descrambled is "5" and the number of services that the service manager 2204 can simultaneously select is also "5", when the service manager 2204 already starts the descrambling of five services using the descrambling starting unit 2803, descrambling cannot be started by the stream information access library even through the use of the descrambling starting unit 2803. For example, in the case where the number of services that can be simultaneously descrambled is "1" and the number of services that the service manager 2204 can simultaneously select is also "1", it is the same as in the first embodiment.

Moreover, as previously described, a "common service" and an "abstract service" exist in the OCAP environment. The common service includes video, audio, application, and so on, and when chosen during service selection, descrambling is required if such service includes descrambled ESs. On the other hand, the abstract service only contains an application. In addition, the application contained in the abstract service is recorded inside the terminal apparatus, and there are cases where it is launched from there. As such, even when it is chosen during service selection, descrambling is not always necessary. In a case such as this, when the service manager 2204 selects a "common service", descrambling is started, and while currently selected, it is guaranteed that scrambled information belonging to such service is as always descrambled. However, when an "abstract service" is selected, it is possible to have an implementation where descrambling is only started in cases where it is necessary, such as in the case where a Java program to be launched needs to be downloaded from scrambled ESs, and where with regard to such ESs, descrambling is guaranteed while the service is currently selected. Furthermore, in the case of the selection of an abstract service, it is possible to have an implementation where descrambling is automatically terminated after downloading of the Java program is concluded, and it is not guaranteed that the ESs transmitting the Java program are descrambled, even while the service is currently selected.

Moreover, in the present embodiment, there are instances where a service for which descrambling is started by a Java program using the stream information access library, can be terminated by another Java program through the stream information access library or the service manager 2204. In this case, it is possible to have an implementation where the stream information access library sends notification of the termination of descrambling to the Java program for which descrambling is terminated.

Moreover, in the present embodiment, although it is guaranteed that a service selected by the service manager 2204 is definitely descrambled, it is possible to have a case, such as when the setting of the tuner 1601 in FIG. 16 is changed, where the MPEG-2 transport stream including the selected service is changed and the terminal apparatus 1600 or the terminal apparatus 1800 is unable to continuously receive the service itself. In this case, it is possible to have an implementation where descrambling is automatically terminated even for a currently selected service.

Moreover, although the service selection in the present embodiment includes operations such as "tuning", "descrambling", "video/audio reproduction", and "application launching", the inclusion of other operations is also possible, if these are operations performed using ESs included in the service to be selected. In addition, it is also possible that "video/audio reproduction", and "application launching" are not included. For example, it is possible to have additional operations such as "storing the video/audio transmitted by ESs included in a certain service into a semiconductor memory such as an HDD, BD, DVD, or SD", and "transmitting information transmitted by ESs included in a service to another terminal apparatus that is physically connected through a method such as a network connection, USB connection, or IEEE 1394 connection".

Moreover, the descrambling status management unit 2801 in the present embodiment holds a program number as information on a service currently being descrambled. However, even for services belonging within a plurality of MPEG-2 transport streams, there are cases where descrambling is possible for the external adapter 1811 which is able to descramble a plurality of services. In such a case, for example, a service B included in an MPEG-2 transport stream A and a service D included in an MPEG-2 transport stream C can be simultaneously descrambled. The program number is determined in such a way that it can uniquely identify a service within the same MPEG-2 transport stream. However, as the service B and the service D are included in different MPEG-2 transport streams, there are cases where the same program number is assigned. In that case, if only the program number is recorded, it will not be possible to identify whether the program number is for the service B or the service D. In order to identify such services, it is also possible to have an implementation where the descrambling status management unit 2801 records, information identifying the MPEG-2 transport stream, together with the program number. For example, as an MPEG-2 transport stream possesses an ID referred to as a Transport Stream Identifier (TSID), a service can be uniquely identified by holding this TSID and the program number as a set. Aside from this, it is also possible to record an ID based on the frequency or SI, as information for identifying an MPEG-2 transport stream.

Moreover, in the present embodiment, in the case of the configuration in FIG. 18 which uses the external adapter 1811, it is possible to transmit, not only the information of scrambled ESs, but also the information of ESs that are not scrambled, when the descrambling starting unit 2803 and descrambling termination unit 4004 transmit to the external adapter 1811.

It should be noted that even in the present embodiment, as described in the third embodiment, as the descrambling status management unit 2801 records the identifier of Java programs for each service and notifies each stream information access library of the identifier of a concluded Java program, when the AM 2205*b* concludes a Java program, it is possible for each stream information access library to automatically terminate, using the descrambling termination unit 4004, the descrambling started by such Java program through the use of a stream information library. In addition, although during selection cancellation the service manager 2204 terminates the descrambling started by the service manager, for the service for which selection is cancelled, aside from this, it also instructs the AM 2205*b* to conclude the Java program belonging to such service. At this time, it is possible to have an implementation where the descrambling started by the Java program using the stream information access library, is automatically terminated in the same manner.

Moreover, in the present embodiment, in the case where the number of services that can be simultaneously descrambled is "1", as in the first embodiment, the point in which descrambling is guaranteed when the service manager 2204 selects one service, is the same as in the first embodiment. However, in the present embodiment, it is possible for the stream information access library to start descrambling in the case where the service manager does not carry out even a single descrambling. However, even if the stream information access library has started descrambling, the descrambling requested by the service starting unit 2204 is prioritized, when the service manager 2204 requests a descrambling to the descrambling starting unit 2803.

Moreover, in the present embodiment, descrambling is not started in the case where a service which does not include scrambled ESs is selected. Consequently, even in an environment where the service manager 2204 can simultaneously descramble, for example, only one service, descrambling using the stream information access library can be carried out even during a service selection.

It should be noted that in the present embodiment, in an environment using the external adapter 1811, it is also possible to have an implementation where a CA-PMT is transmitted to the external adapter 1811 even in the case where a service which does not include scrambled ESs is selected. Aside from this, there are also cases where the external adapter 1811 uses a CA-PMT as a message for copy production. In this case, a CA-PMT must be transmitted even if descrambling of ESs is not particularly required.

Sixteenth Embodiment

When a DVB-CI and POD, which are examples of the external adapter 1811 described in the first to fifteenth embodiments, receive a CA-PMT which is a "query" descrambling control flag, from the terminal apparatus 1800, judgment is made as to whether or not descrambling of the ESs described in such CA-PMT is possible, and the terminal apparatus 1800 is notified of the judgment result.

Furthermore, when a CA-PMT which is a "start" descrambling control flag is received from the terminal apparatus 1800 in the case where another descrambling is already being carried out, there are instances where, depending on the DVB-CI and POD, the descrambling already being carried out is automatically terminated and descrambling is started based on the CA-PMT received.

Seventeenth Embodiment

With regard to the first to sixteenth embodiments, parts described as a "POD" may also be a "Cable CARD". In the case of a POD, reference is made to the "OC-SP-HOSTPOD-IF" specification, whereas in the case of a Cable CARD, reference is made to the "OC-SP-CC-IF" specification.

Furthermore, in the first to fifteenth embodiments, in the case where the external adapter 1811 is used to carry out descrambling, the start of descrambling is instructed through the transmission, by the descrambling starting unit 2803, of a CA-PMT which is a "start" descrambling control flag, to the external adapter 1811, and it is not necessary that only scrambled ESs are included in the CA-PMT during that time. It is possible to included information of ESs that are not scrambled.

Furthermore, in the first to fifteenth embodiments, depending on the embodiment, the descrambling starting unit 2803, or the service manager 2204, or each stream information access library checks as to whether or not scrambled ESs exist inside a service prior to transmitting the CA-PMT, in the case where the external adapter 1811 is used to carry out descrambling. However, it is also possible to have an implementation where the CA-PMT which is a "start" descrambling control flag is configured from the PMT of the service concerned, and transmitted to the external adapter 1811 without checking, during each service selection or during each time the stream information access library is called. Furthermore, aside from information of scrambled ESs, information of ESs that are not scrambled may also be included during transmission. In addition, in the case where an ES is designated to the stream information access library, it is possible to configure the CA-PMT using only the information of the designated ES from within the PMT, and transmitting this to the external adapter 1811.

Moreover, although in the first to fifteenth embodiments, "service selection" is explained as the sequence including tuning, descrambling, video/audio reproduction, and application launching, operations carried out after tuning and descrambling may be treated differently from the present sequence. For example, it is possible to have a case where video/audio reproduction is not carried out and only application launching is carried out or a case where application launching is not carried out and only video/audio reproduction is carried out. In addition, it may also be the accessing of ESs within a service, such as the storage, into a storage device, of ESs for which descrambling is started.

Eighteenth Embodiment

Although with regard to the first to fifteenth embodiments, the service storage unit held by the service manager 2204 is referred to as "4900", there are also cases where this exists inside the service manager 2204. FIG. 70 is a diagram showing this implementation. The service storage unit 7000 exists in the area managed by the service manager 2204. It is also possible to have an implementation where the service storage unit managed by the service manager 2204 is treated differently from the service storage unit 4900 managed by the stream information access library.

Nineteenth Embodiment

In the eighth to tenth embodiments, the event listener registration unit 6102 and the event listener cancellation unit 6103 are used directly by the Java program, and the Java program receives an event directly from the CA library 2206. However, it is also possible to have an implementation where the Java program registers an event listener in the stream information access library, and an event notifying the termination of descrambling is forwarded from the stream information access library.

Twentieth Embodiment

Although in the first and second embodiments, the number of services that can be simultaneously selected as well as the number of service contexts is explained as 1, the present invention can be applied even in an environment where a plurality of service contexts exists even when the number of services that can be simultaneously selected is 1. In actuality, in an environment complying with the OCAP specification, it is possible to have more service contexts than the number of services that can be simultaneously selected. For example, 1 or more service contexts can exist in a terminal capable of simultaneously selecting 1 service. In this case, the Java program can carry out different service selection requests to each of the plurality of service contexts. However, in the case where a service requested later is selected and another service is already currently selected at that time, the current selection is cancelled, as only one service can be simultaneously selected. The timing of the start of descrambling is at the point when the service requested later is selected, and at the same time, descrambling of the service subjected to selection cancellation at that time is terminated.

Twenty-First Embodiment

In the first to fifteenth embodiments, there are cases where two types of services exist in the OCAP environment described earlier. One is the common service which exists by association with a PMT, and the other is an abstract service which exists without association with a PMT. The common service is synonymous to the service explained in the first and second embodiments. When a common service is selected, tuning, descrambling, video/audio reproduction and Java program launching is carried out according to the service manager 2204. On the other hand, an abstract service exists by containing only the Java program, and video/audio reproduction is not carried out upon the selection of a service. Furthermore, although the Java program contained by the abstract service is downloaded and launched when the abstract service is selected, at that time, there are cases where it is stored in the secondary storage unit 1607. Once the Java program is stored in the secondary storage unit 1607, from then on, during service selection, the Java program is launched by being downloaded from the secondary storage unit 1607 for as long as a Java program that is newer than the stored Java program cannot be downloaded. As in the OCAP environment, in the case of such an environment with two or more types of services, it is possible to change the timing of the start and termination of descrambling during the service selection by the service manager 2204, in accordance with the service type. For example, in the selection of a common service, descrambling is implicitly started during the service selection by the service manager 2204. During service selection in the case of an abstract service, a format can be adopted where descrambling is started only when the Java program is downloaded from ESs and the ESs transmitting the Java program is scrambled, and descrambling is not started in the case where descrambling is not required, such as when the Java program is launched by being downloaded from the secondary storage unit 1607.

Furthermore, in an environment such as this where services of several types exist, it is possible to have a case where the service context managed by the service manager 2204 exists in a plurality, and the types of the service that can be selected by the respective service contexts are fixed. For example, in the case where the common service and the abstract service exist as service types, there are cases where a service context for a common service and a service context for an abstract service exist. In such a case, it is possible to adapt a format where in the case of the service context for a common service, descrambling is started upon selection of a common service, and where in the case of the service context for an abstract service, descrambling is started only when the Java program transmitted by scrambled ESs is downloaded during selection of an abstract service.

Furthermore, in the first embodiment, Java programs belonging to a plurality of services operate simultaneously in such an environment where a "common service" and "abstract service" exist. However, even in this case, access is using the stream information access library is possible as it is guaranteed that the ESs belonging to the "common service" selected at that point are being descrambled.

Twenty-Second Embodiment

Although in the first to fifteenth embodiments, the IMF 2205*a*, DSM-CC 2205*d*, and the SF 2205*e* are given as the stream information access libraries, it is possible to have others aside from the three and it is also not necessary that these three are included. Examples that can be cited are a library for implementing a function for storing, into the secondary storage unit 1607, information transmitted by ESs, or a library that transmits, to another terminal which is externally connected to the terminal apparatus 1600 or the terminal apparatus 1800, an MPEG-2 transport stream or information such as video, audio, data, or Java programs, that can be obtained from an MPEG-2 transport stream.

Twenty-Third Embodiment

In the first to fifteenth embodiments, Java programs are acquired not only by downloading those transmitted through an MPEG-2 transport stream in the DSMCC format, and methods which download from a server connected to a terminal via the network, or load from portable media such as a DVD, BD, or SD card, are also possible. The present invention is also applicable in those cases.

Twenty-Fourth Embodiment

In the first to fifteenth embodiments, the number of ESs that can be designated at one time to the stream information access library for accessing is different depending on the type of the stream information access library. For example, one ES is always designated for the SF 2205*e*, whereas for the JMF 2205*a*, it is possible to designate a plurality of ESs like the ES for video and the ES for audio. Furthermore, in the case where a stream information access library of a type other than those previously enumerated further exists, designation is possible in three types, namely, designation of "one ES", "a plurality of ESs", or "a service", this being different for each stream information access library.

Twenty-Fifth Embodiment

In the first to fifteenth embodiments, in the case where descrambling is carried out using the external adapter 1811 as in FIG. 18, the CA-PMT transmitted to the external adapter 1811 during the processing by the descrambling starting unit 2803 is assumed as a "start" descrambling control flag, when not indicated.

Furthermore, in the first to fifteenth embodiments, in the case where descrambling is carried out using the external adapter 1811 as in FIG. 18, the CA-PMT transmitted to the external adapter 1811 during the processing by the descrambling termination unit 4004 is assumed as a "stop" descrambling control flag, when not indicated.

Furthermore, in the first to fifteenth embodiments, a CA-PMT indicating the start of descrambling is transmitted to the external adapter 1811 during the processing by the descrambling starting unit 2803. However, it is also possible to have an implementation where, prior to such transmission, a CA-PMT indicating "a query as to whether or not descrambling is possible" is transmitted to the external adapter 1811 and the result of whether or not descrambling of the ESs included in the CA-PMT can be carried out by the external adapter 1811 is received, and the CA-PMT indicating the start of descrambling is transmitted to the external adapter 1811 if descrambling is possible.

Twenty-Sixth Embodiment

Figure 71:
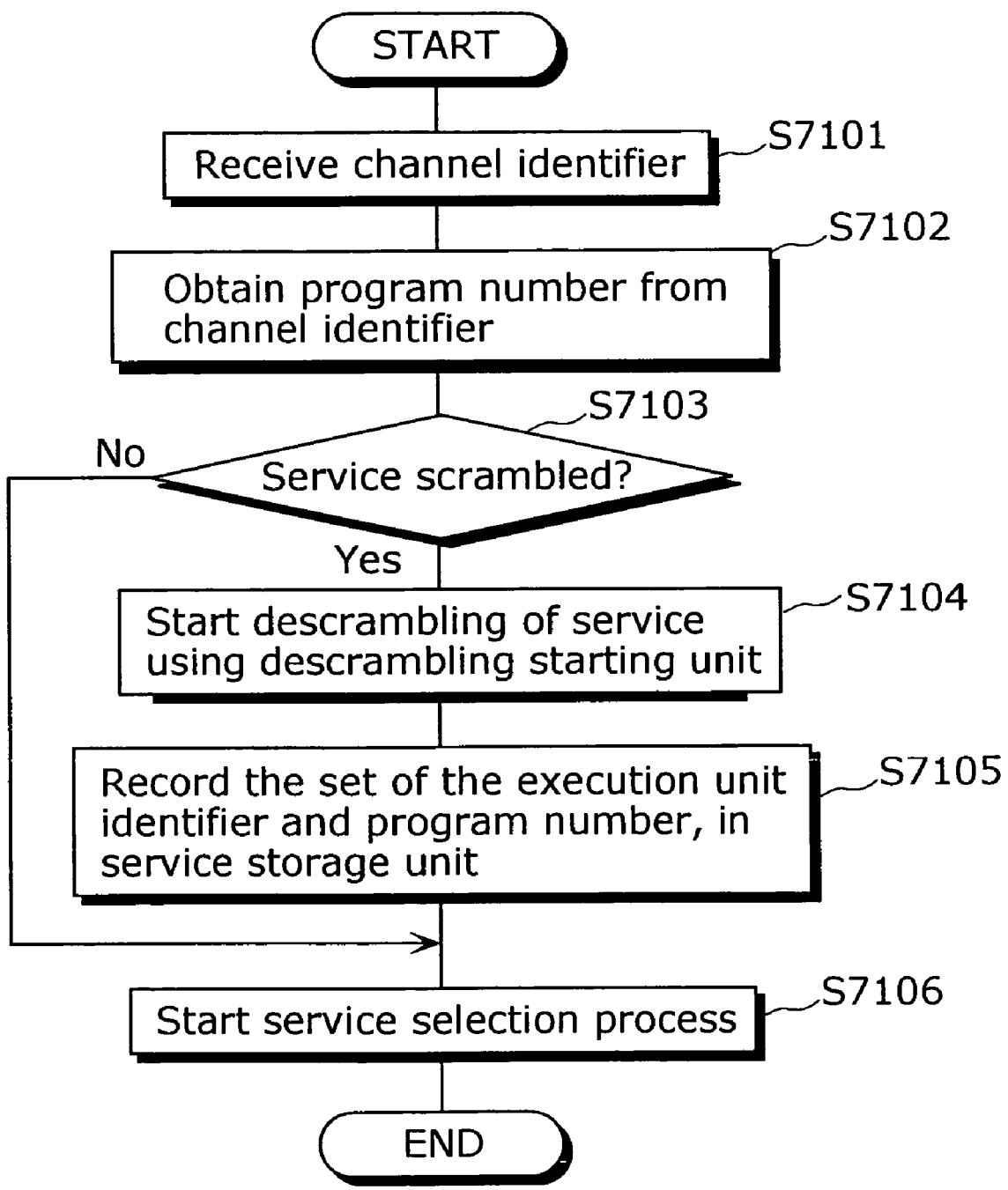
FIG. 71 shows the operating sequence during the start of descrambling by the service manager in the twenty-sixth embodiment.
Figure 72:
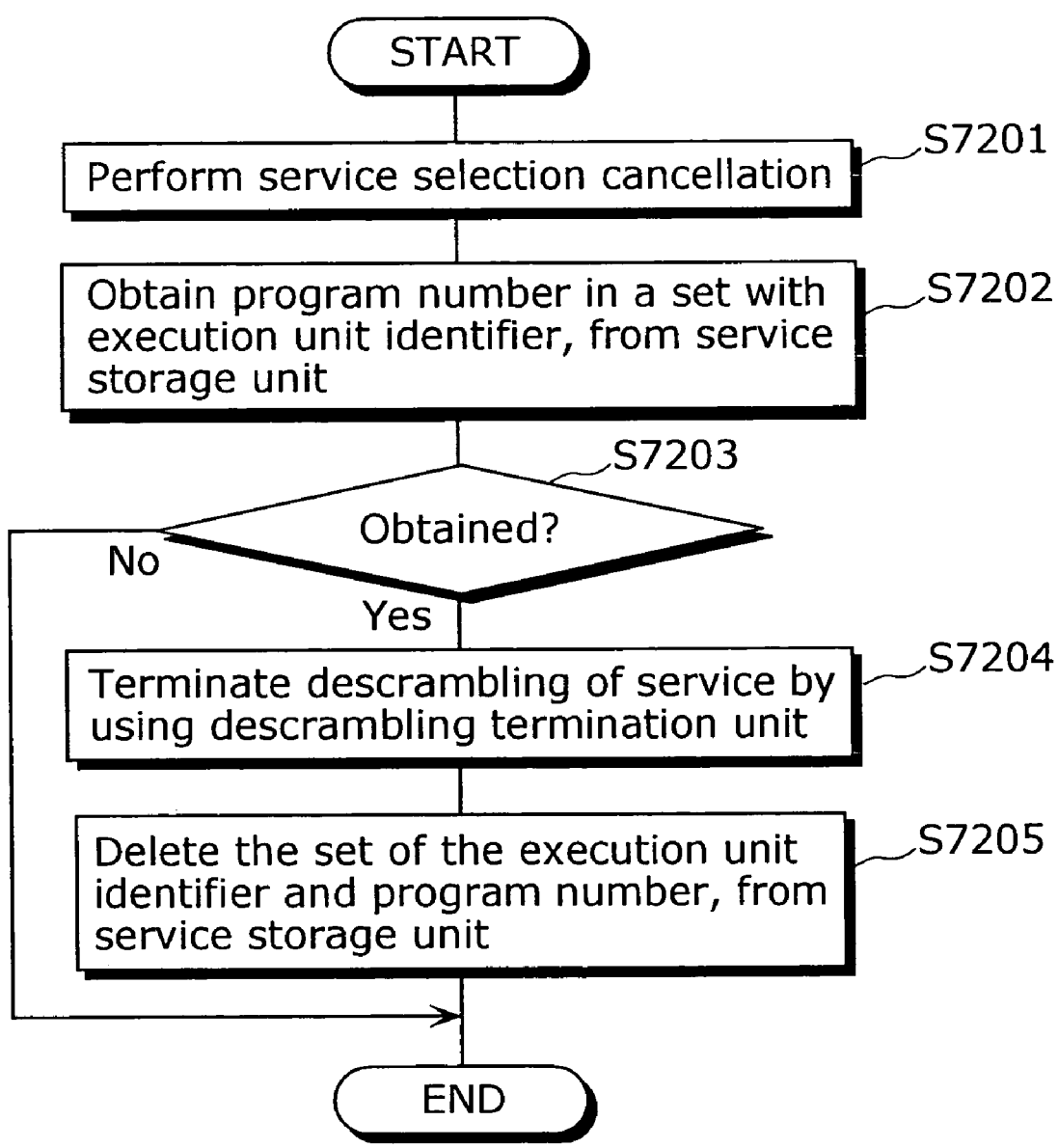
FIG. 72 shows the operating sequence during the termination of descrambling by the service manager in the twenty-sixth embodiment.

The operation with regard to the descrambling by the service manager 2204 in the third embodiment shall also be explained using FIGS. 71 and 72. First, the sequence during service selection shall be explained. When the Java program uses the service manager management library 2205*f* to give a service selection command to the "service context" execution unit managed by the service manager 2204, the service manager cancels a selection if the designated "service context" execution unit is currently selecting a different service at that time. Although details regarding the selection cancellation sequence shall be described later, it should be noted that within such sequence, descrambling of a service performed of selection cancellation is terminated. Subsequently, the sequence proceeds to that in FIG. 71. A channel identifier is received (S7101), and a program number is obtained based on the channel identifier (S7102). If the service is scrambled (S7103), descrambling is started using the descrambling starting unit 2803 (S7104). During that time, the identifier of the "service context" execution unit and the program number are recorded as a set in the service storage unit 4900. Subsequently, the rest of the service selection process (video/audio reproduction, application launching, and so on) is carried out (S7106).

Next, the service selection cancellation sequence shall be explained. FIG. 72 is used with regard to the descrambling termination during service selection cancellation. "In the case where the Java program uses the service manager management library 2205*f* to give a service selection command to the "service context" execution unit managed by the service manager 2204" and "in the case where such "service context" execution unit is already selecting a different service when the Java program gives the service selection command", first, the video/audio reproduction of the service being chosen by such "service context" execution unit is terminated, and the execution of the application belonging to such service is also terminated (S7201). The sequence then proceeding to that in FIG. 72. As there is a need to terminate any descrambling being carried out according to such "service context" execution unit at that time, the program number that is in a set with the identifier of that "service context" execution unit is obtained from the service storage unit 4900 (S7202). If it is obtained (S7203), this means that descrambling is being carried out. Descrambling is terminated using the descrambling termination unit 4004 (S7204), and the set of the identifier of the execution unit and the program number is deleted from the service storage unit 4900 (S7205). By operating in this manner, the service manager 2204 carries out descrambling start/ termination together with service selection/selection cancellation.

The present sequence for the service manager 2204 is used in the embodiments, from the third embodiment onward, in which no specific stipulation is mentioned.

Twenty-Seventh Embodiment

In the first to fifteenth embodiments, it is possible to have an implementation where an error indicating the failure of the start of descrambling is returned to a Java program making a request for a service selection to the service manager 2204, using the service manager management library 2205, or a Java program attempting to access information within an MPEG-2 transport stream using the stream information access library, in the case where descrambling using the service manager 2204 or each of the stream information libraries fails.

Twenty-Eighth Embodiment

In the third embodiment, what is received in procedure S4601 in FIG. 46 is a CA-PMT.

Twenty-Ninth Embodiment

In the first embodiment, in the case which adopts a configuration, as in FIG. 18, where descrambling is carried out using the external adapter 1811, there are cases where the descrambler management unit 2802 existing in the external adapter 1811 is referred to by a program and used in allocating descramblers. Such program operates on the CPU of the external adapter 1811, and is previously recorded in the ROM of the external adapter 1811.

Thirtieth Embodiment

Figure 73:
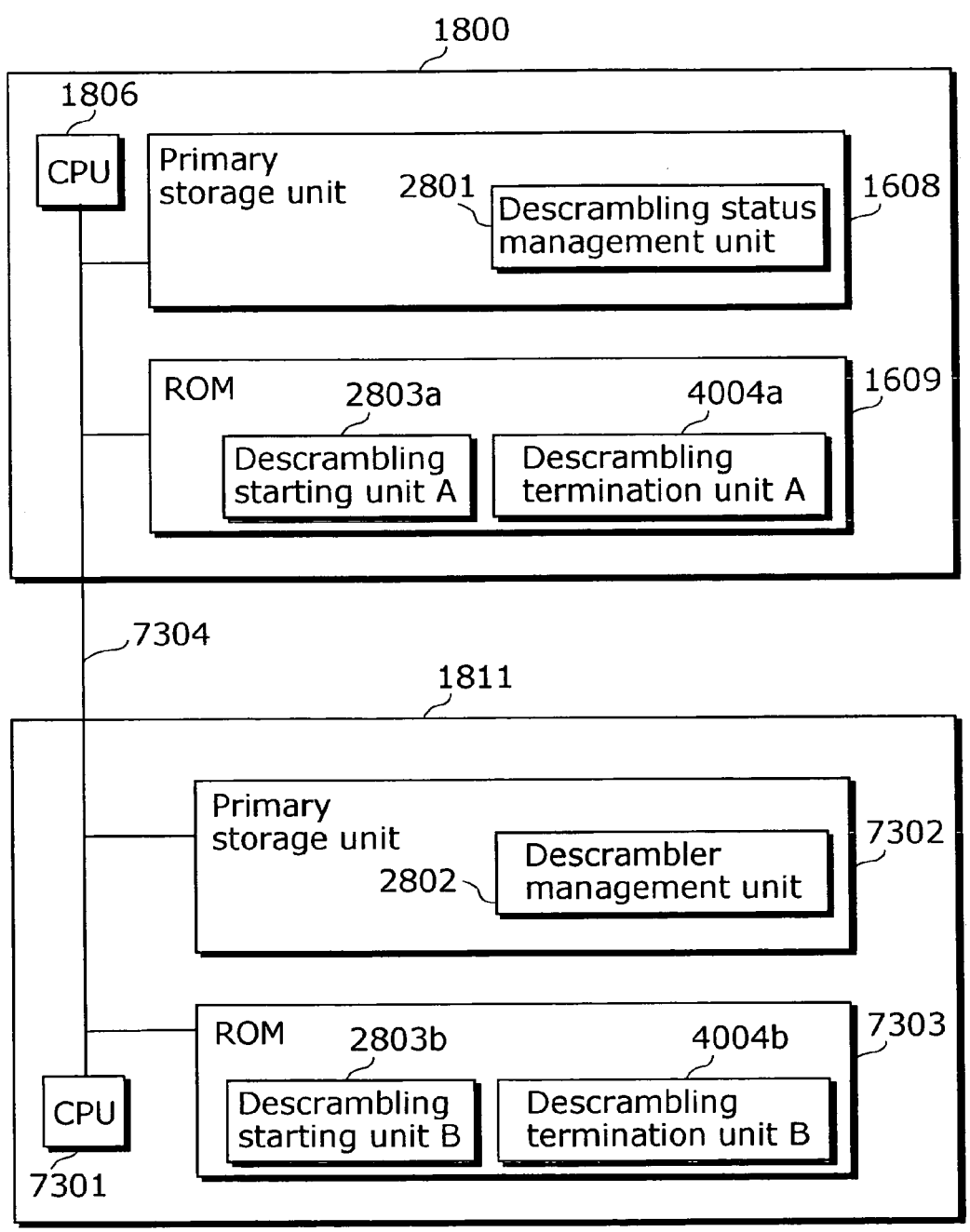
FIG. 73 shows an example of the splitting of the descrambling starting unit and the descrambling termination unit in the case where descrambling is carried out using the external adapter, in the thirtieth embodiment.

In the first to fifteenth embodiments, in the case where descrambling is carried out using the external adapter 1811 as in FIG. 18, the descrambling starting unit 2803 and descrambling termination unit 4004 are split into "library segments located in the ROM 1609 inside the terminal apparatus 1800" and "programs located in the ROM of the external adapter 1811". An example is shown in FIG. 73 in order to facilitate a simple description of this condition. FIG. 73 is a schematic representation of the connection between the terminal apparatus 1800 and the external apparatus 1811 in FIG. 18. The CPU 1806, primary storage unit 1608, and ROM 1609 within the terminal apparatus 1800, are all physically connected to each other by signal lines. At the same time, a CPU 7301, primary storage unit 7302 and a ROM 7303, in the external adapter 1811 are also physically connected to each other. A signal line 7304 is a signal line for the exchange of information between the terminal apparatus 1800 and the external adapter 1811.

The descrambling status management unit 2801 is located in the primary storage unit 1608 in the terminal apparatus 1800. A descrambling starting unit A 2803a and a descrambling termination unit A 4004a are located in the ROM 1609, and are read and executed by the CPU 1806. The descrambling starting unit A 2803a and descrambling termination unit A 4004a are the "library segments located in the ROM 1609 inside the terminal apparatus 1800" of the descrambling starting unit 2803 and descrambling termination unit 4004, respectively.

On the other hand, the descrambler management unit 2802 is located in the primary storage unit 7302 within the external adapter 1811. A descrambling starting unit B 2803b and a descrambling termination unit B 4004b are located within the ROM 7303, and are read and executed by the CPU 7301 within the external adapter 1811. The descrambling starting unit B 2803b and descrambling termination unit B 4004b are the "programs located in the ROM of the external adapter 1811" of the descrambling starting unit 2803 and descrambling termination unit 4004, respectively.

The descrambling start unit 2803 is present in the first embodiment. The sequence in FIG. 30 is executed by the descrambling starting unit A 2803a and the sequence in FIG. 31 is executed by the descrambling starting unit B 2803b. In the procedure S3005, when the descrambling starting unit A 2803a creates and sends a CA-PMT which is a "start" descrambling control flag to the external adapter 1811, the external adapter 1811, upon receiving such flag, activates the descrambling starting unit B 2803b and starts descrambling according to the sequence in FIG. 31. Although in the procedure S3104 and so on, the descrambling starting unit B 2803b accesses the descrambler management unit 2802, there is no problem as the descrambler management unit 2802 also exists in the external adapter 1811. In the same manner, the parts in the first to fifteenth embodiments where it is described that the descrambling starting unit 2803 is split and located in the terminal apparatus 1800 and external adapter 1811 adopt a layout as in FIG. 73.

The descrambling termination unit 4004 is present in the third embodiment. The sequence in FIG. 45 is executed by the descrambling termination unit A 4004a and the sequence in FIG. 46 is executed by the descrambling termination unit B 4004b. In the procedure S4505, when the descrambling termination unit A 4004a creates and sends a CA-PMT which is a "stop" descrambling control flag to the external adapter 1811, the external adapter 1811, upon receiving such flag, activates the descrambling termination unit B 4004b and terminates the descrambling according to the sequence in FIG. 46. Although in the procedure S4603, the descrambling termination unit B 4004b accesses the descrambler management unit 2802, there is no problem as the descrambler management unit 2803 also exists in the external adapter 1811. In the same manner, the parts in the first to fifteenth embodiments where it is described that the descrambling termination unit 4004 is split and located in the terminal apparatus 1800 and external adapter 1811 adopt a layout as in FIG. 73.

It should be noted that although there are cases where a configuration which is different to this is adopted depending on the type of the external adapter 1811, the present invention is based on the internal operation of the terminal apparatus 1800, and the present invention can be applied as long as the external adapter 1811 is capable of communication using varying messages in a CA-PMT. Furthermore, although it is possible to have cases where there are slight differences in the internal configuration for a DVB-CI and Cable CARD, the present invention can still be applied as it is based on the internal operation of the terminal apparatus 1800.

Moreover, there are instances where the descrambling starting unit A 2803a transmits a CA-PMT which is a "query" descrambling control flag to the external adapter 1811. Upon receiving such flag, the external adapter 1811 judges whether or not descrambling is possible, and returns the reply to the terminal apparatus 1800. This reply is used by the descrambling starting unit A 2803a in judging whether or not to transmit a CA-PMT which is a "start" descrambling control flag to the external adapter 1811.

Thirty-First Embodiment

In the first to fifteenth embodiments, in the case where no stipulation is made, the descrambling starting unit 2803 determines, prior to actually carrying out descrambling, whether or not a scrambled ES is included in the service and performs descrambling if a scrambled ES is included. In an environment using the external adapter 1811 in particular, it is possible to have an implementation where a CA-PMT which is a "start" descrambling control flag, is transmitted to the external adapter 1811, regardless of the presence or absence of a scrambled ES.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention proposes a broadcast receiving apparatus characterized by comprising a service execution unit executing a service including one or more pieces of information according to an execution request received, a descrambling unit for descrambling a scrambled piece of information included in the service, and a descrambling control unit for instructing the descrambling unit to start descrambling of all the scrambled pieces of information included in the service when execution of the service is requested to the service execution unit by an application downloaded from outside the broadcast receiving apparatus. The present invention provides, to the application, a method for implicitly carrying out descrambling of the pieces of information.

Although is the present invention is basically applicable to a broadcast receiving apparatus, it can be applied to other information devices such as a mobile phone, as long as these possess a function for receiving a scrambled broadcast.

What is claimed is:

1. A broadcast receiving apparatus comprising:
a receiving unit operable to receive broadcast signal;
an application execution unit operable to execute an application included in the broadcast signal;
a service managing unit operable to extract a service, including one or more pieces of scrambled information, in the broadcast signal received by the receiving unit;
a service execution unit operable to execute a service including one or more pieces of scrambled information according to an execution request received;
a descrambling unit operable to descramble said one or more pieces of scrambled information included in the service;
a service identifier holding unit operable to hold a service identifier for identifying a service including said one or more pieces of scrambled information which the descrambling unit is descrambling; and
a descrambling control unit operable to instruct the descrambling unit to start descrambling of said one or more pieces of scrambled information included in the service corresponding to service identifier held by the service identifier holding unit,
Wherein, when the application requests the execution request of the service execution unit, and when a service according to the execution request is not the same as the service corresponding to the service identifier held by the service identifier holding unit,
the descrambling control unit instructs the descrambling unit to terminate descrambling said one or more pieces of scrambled information included in the service corresponding to the service identifier held by the service identifier holding unit, and instructs the descrambling unit to start to descramble said one or more pieces of scrambled information included in the service according to the execution request by the application, and
the service identifier holding unit holds a service identifier corresponding to the service according to the execution request by the application.

2. The broadcast receiving apparatus according to claim 1, further comprising
an information accessing unit operable to access one or more pieces of scrambled information,
wherein, when a second application requests the information accessing unit to access one or more pieces of scrambled information included in a second service in a situation where i) the service execution unit requested by a first application to execute a first service is in the process of executing the first service and ii) the descrambling unit is in the process of descrambling one or more pieces of scrambled information included in the first service, the descrambling control unit notifies the second application that said one or more pieces of scrambled information included in the second service cannot be descrambled.

3. The broadcast receiving apparatus according to claim 1, further comprising
an information accessing unit operable to access one or more pieces of scrambled information,
wherein, when the application requests the information accessing unit to access one or more pieces of scrambled information in a service which is not being executed by the service execution unit, the descrambling control unit notifies the application that said one or more pieces of scrambled information cannot be descrambled.

4. The broadcast receiving apparatus according to claim 1, wherein, the descrambling unit is attachable to and detachable from the broadcast receiving apparatus, and
when the application requests the service execution unit to execute the service when broadcast receiving apparatus and the descrambling unit are connected, the descrambling control unit instructs the descrambling unit to descramble all the pieces of scrambled information included in said service.

5. The broadcast receiving apparatus according to claim 4, further comprising
an information accessing unit operable to access one or more pieces of scrambled information,
wherein, when a second application requests the information accessing unit to access one or more pieces of scrambled information included in a second service in a situation where i) the service execution unit requested by a first application to execute a first service is in the process of executing the first service and ii) the descrambling unit is in the process of descrambling one or more pieces of scrambled information included in the first service, the descrambling control unit notifies the second application that said one or more pieces of scrambled information included in the second service cannot be descrambled.

6. The broadcast receiving apparatus according to claim 4, further comprising an information accessing unit operable to access one or more pieces of scrambled information, wherein, when the application requests the information accessing unit to access one or more pieces of scrambled information in a service which is not being executed by the service execution unit, the descrambling control unit notifies the application that said one or more pieces of scrambled information cannot be descrambled.

7. The broadcast receiving apparatus according to claim 1, wherein, when the second application requests the service execution unit to execute a second service in a situation where i) the service execution unit requested by a first application to execute a first service is in the process of executing the first service and ii) the descrambling unit is in the process of descrambling one or more pieces of scrambled information included in the first service, the descrambling control unit instructs the descrambling unit to i) terminate descrambling of said one or more pieces of scrambled information included in the first service, and ii) descramble all the pieces of scrambled information included in the second service.

8. The broadcast receiving apparatus according to claim 7, wherein, after instructing the descrambling unit to terminate descrambling of said one or more pieces of scrambled information included in the first service, the descrambling control unit notifies the first application that descrambling of said one or more pieces of scrambled information included in the first service is terminated.

9. The broadcast receiving apparatus according to claim 1, wherein, when the descrambling control unit instructs the descrambling unit to descramble a piece of information included in a second service in a situation where the descrambling unit is in the process of descrambling one or more pieces of scrambled information included in a first service as instructed by the descrambling control unit, the descrambling unit terminates descrambling of said one or more pieces of scrambled information included in the first service, and starts descrambling the piece of information included in the second service.

10. The broadcast receiving apparatus according to claim 1, wherein, one of the pieces of the scrambled information is an elementary stream.

11. The broadcast receiving apparatus according to claim 1, wherein, at least one of the pieces of scrambled information included in the service contains video information to be reproduced upon execution of said service.

12. The broadcast receiving apparatus according to claim 1, wherein, at least one of the pieces of scrambled information included in the service contains audio information to be reproduced upon execution of said service.

13. The broadcast receiving apparatus according to claim 1, wherein, at least one of the pieces of scrambled information included in the service contains an application.

14. The broadcast receiving apparatus according to claim 1, wherein, at least one of the pieces of scrambled information included in the service contains data used by an application included in said service.

* * * * *